(12) United States Patent
Ramasubramanian et al.

(10) Patent No.: US 10,707,466 B2
(45) Date of Patent: Jul. 7, 2020

(54) SEPARATORS FOR THREE-DIMENSIONAL BATTERIES

(71) Applicant: Enovix Corporation, Fremont, CA (US)

(72) Inventors: Murali Ramasubramanian, Fremont, CA (US); Michael Armstrong, Danville, CA (US); Brian E. Brusca, Tracey, CA (US); Vladimir Dioumaev, San Jose, CA (US); Gunther A. Koblmiller, Oakley, CA (US); Ashok Lahiri, Cupertino, CA (US); Laurie J. Lauchlan, Saratoga, CA (US); Harrold J. Rust, III, Alamo, CA (US); Nirav S. Shah, Pleasanton, CA (US); Robert M. Spotnitz, Pleasanton, CA (US); James D. Wilcox, Pleasanton, CA (US)

(73) Assignee: Enovix Corporation, Fremont, CA (US)

( * ) Notice: Subject to any disclaimer, the term of this patent is extended or adjusted under 35 U.S.C. 154(b) by 61 days.

(21) Appl. No.: 15/997,252

(22) Filed: Jun. 4, 2018

(65) Prior Publication Data

US 2019/0148695 A1    May 16, 2019

Related U.S. Application Data

(63) Continuation of application No. 14/207,808, filed on Mar. 13, 2014, now Pat. No. 9,991,490.

(Continued)

(51) Int. Cl.
*H01M 2/16*    (2006.01)
*H01M 4/13*    (2010.01)
(Continued)

(52) U.S. Cl.
CPC ......... *H01M 2/166* (2013.01); *H01M 2/1606* (2013.01); *H01M 2/1673* (2013.01);
(Continued)

(58) Field of Classification Search
CPC .. H01M 2/166; H01M 2/1606; H01M 2/1673; H01M 4/13; H01M 4/134; H01M 4/386; H01M 10/0472
See application file for complete search history.

(56) References Cited

U.S. PATENT DOCUMENTS

| 5,238,759 A | 8/1993 | Plichta et al. |
| 5,294,504 A | 3/1994 | Otagawa |

(Continued)

FOREIGN PATENT DOCUMENTS

| CA | 02388711 | 5/2001 |
| CN | 1286811 | 9/1993 |

(Continued)

OTHER PUBLICATIONS

Long et al., Three-Dimensional battery Architectures, Chemical Reviews, 2004, 104, 4463-4492.

(Continued)

*Primary Examiner* — Jonathan G Jelsma
(74) *Attorney, Agent, or Firm* — Bryan Cave Leighton Paisner LLP

(57) ABSTRACT

An electrode structure for use in an energy storage device, the electrode structure comprising a population of electrodes, a population of counter-electrodes and an electrically insulating material layer separating members of the electrode population from members of the counter-electrode population, each member of the electrode population having a longitudinal axis $A_E$ that is surrounded by the electrically insulating separator layer.

25 Claims, 24 Drawing Sheets

Related U.S. Application Data

(60) Provisional application No. 61/800,235, filed on Mar. 15, 2013.

(51) Int. Cl.
| | |
|---|---|
| H01M 4/134 | (2010.01) |
| H01M 4/38 | (2006.01) |
| H01M 10/04 | (2006.01) |
| H01M 10/052 | (2010.01) |
| H01M 10/0585 | (2010.01) |
| H01M 2/14 | (2006.01) |
| H01M 4/02 | (2006.01) |

(52) U.S. Cl.
CPC ............ *H01M 4/13* (2013.01); *H01M 4/134* (2013.01); *H01M 4/386* (2013.01); *H01M 10/0472* (2013.01); *H01M 10/052* (2013.01); *H01M 10/0585* (2013.01); *H01M 2/145* (2013.01); *H01M 2004/021* (2013.01)

(56) References Cited

U.S. PATENT DOCUMENTS

| | | |
|---|---|---|
| 5,709,962 A | 1/1998 | Bailey |
| 6,090,505 A | 7/2000 | Shimamura et al. |
| 6,235,427 B1 | 5/2001 | Idota et al. |
| 6,287,371 B1 | 9/2001 | Ota et al. |
| 6,383,234 B1 | 5/2002 | Noh |
| 6,432,579 B1 | 8/2002 | Tsuji et al. |
| 6,432,585 B1 | 8/2002 | Kawakami |
| 6,525,391 B1 | 2/2003 | Bertrand et al. |
| 6,679,925 B1 | 1/2004 | Tanizaki et al. |
| 6,791,737 B2 | 9/2004 | Giron |
| 7,066,971 B1 | 6/2006 | Carlson |
| 7,309,548 B2 | 12/2007 | Ota et al. |
| 7,402,829 B2 | 7/2008 | Green |
| 8,101,298 B2 | 1/2012 | Green et al. |
| 8,192,788 B1 | 6/2012 | Shah et al. |
| 8,475,957 B2 | 7/2013 | Rust, III et al. |
| 8,527,395 B2 | 9/2013 | Ramasubramanian et al. |
| 8,580,439 B1 | 11/2013 | Kaiser et al. |
| 8,841,030 B2 | 9/2014 | Lahriri et al. |
| 9,356,271 B2 | 5/2016 | Ramasubramanian et al. |
| 9,362,553 B2 | 6/2016 | Lahiri et al. |
| 9,660,292 B2 | 5/2017 | Rust, III et al. |
| 9,806,331 B2 | 10/2017 | Lahiri et al. |
| 9,991,490 B2 | 6/2018 | Ramasubramanian et al. |
| 10,020,514 B2 | 7/2018 | Ramasubramanian et al. |
| 10,038,214 B2 | 7/2018 | Rust, III |
| 2002/0013986 A1 | 2/2002 | Ahn et al. |
| 2003/0082446 A1 | 5/2003 | Chiang et al. |
| 2004/0185336 A1 | 9/2004 | Ito et al. |
| 2004/0214085 A1 | 10/2004 | Sheem et al. |
| 2004/0234861 A1 | 11/2004 | Kawase et al. |
| 2004/0241540 A1 | 12/2004 | Tsutsumi et al. |
| 2005/0008939 A1 | 1/2005 | Ota et al. |
| 2005/0095503 A1 | 5/2005 | Adachi et al. |
| 2005/0130383 A1 | 6/2005 | Divakaruni et al. |
| 2005/0208379 A1 | 9/2005 | Musha et al. |
| 2006/0093871 A1 | 5/2006 | Howard |
| 2007/0002523 A1 | 1/2007 | Ando et al. |
| 2007/0097481 A1 | 5/2007 | Burdis et al. |
| 2007/0172732 A1 | 7/2007 | Jung et al. |
| 2007/0285051 A1 | 12/2007 | Jeon et al. |
| 2008/0003490 A1 | 1/2008 | Christensen |
| 2008/0081256 A1 | 4/2008 | Madou et al. |
| 2008/0081257 A1 | 4/2008 | Yoshida et al. |
| 2008/0233455 A1 | 9/2008 | Deimede |
| 2009/0035664 A1 | 2/2009 | Chiang et al. |
| 2009/0068567 A1 | 3/2009 | Konishiike et al. |
| 2009/0123847 A1 | 5/2009 | Okada et al. |
| 2009/0142656 A1 | 6/2009 | Nathan et al. |
| 2009/0263716 A1 | 10/2009 | Ramasubramanian et al. |
| 2009/0303660 A1 | 12/2009 | Nair et al. |
| 2010/0040951 A1 | 2/2010 | Yamamoto et al. |
| 2010/0051856 A1 | 3/2010 | Kim et al. |
| 2010/0209775 A1 | 8/2010 | Kim |
| 2010/0266907 A1 | 10/2010 | Yazami |
| 2010/0285368 A1 | 11/2010 | Yamamato et al. |
| 2011/0008656 A1 | 1/2011 | Takayuki et al. |
| 2011/0014522 A1 | 1/2011 | Visco et al. |
| 2011/0020701 A1 | 1/2011 | Park et al. |
| 2011/0020713 A1 | 1/2011 | Cui et al. |
| 2011/0020719 A1 | 1/2011 | Manabe et al. |
| 2011/0067228 A1 | 3/2011 | Green |
| 2011/0111283 A1 | 5/2011 | Rust, III et al. |
| 2011/0129732 A1 | 6/2011 | Bachrach et al. |
| 2011/0171518 A1 | 7/2011 | Dunn et al. |
| 2011/0200862 A1 | 8/2011 | Kurosawa |
| 2012/0100438 A1 | 4/2012 | Fasching et al. |
| 2012/0176093 A1 | 7/2012 | Ramasubramanian et al. |
| 2012/0202113 A1 | 8/2012 | Hodge et al. |
| 2012/0288742 A1 | 11/2012 | Tanaka et al. |
| 2013/0143120 A1 | 6/2013 | Ramasubramanian et al. |
| 2013/0189602 A1 | 7/2013 | Lahiri et al. |
| 2013/0230751 A1 | 9/2013 | Shaw |
| 2014/0050969 A1 | 2/2014 | Rush, III et al. |
| 2014/0272547 A1 | 9/2014 | Ramasubramanian et al. |
| 2014/0335395 A1 | 11/2014 | Ramasubramanian et al. |
| 2015/0024253 A1 | 1/2015 | Noh |
| 2015/0079452 A1 | 3/2015 | Park et al. |
| 2015/0104686 A1 | 4/2015 | Brommer et al. |
| 2018/0040876 A1 | 2/2018 | Lahiri et al. |
| 2018/0145367 A1 | 5/2018 | Busacca et al. |

FOREIGN PATENT DOCUMENTS

| | | |
|---|---|---|
| CN | 1555588 | 12/2004 |
| CN | 102007625 | 6/2011 |
| CN | 102569758 | 7/2012 |
| EP | 0883199 | 12/1998 |
| EP | 1028476 | 8/2000 |
| EP | 1100134 | 5/2001 |
| EP | 1102340 | 5/2001 |
| EP | 2048262 | 4/2009 |
| EP | 2277214 | 10/2009 |
| EP | 3295507 | 3/2018 |
| JP | H01132064 | 5/1989 |
| JP | H06236768 A | 8/1994 |
| JP | 2003323882 | 11/2003 |
| JP | 2006100280 | 4/2006 |
| JP | 2006173001 | 6/2006 |
| JP | 2006286427 | 10/2006 |
| JP | 2007258160 | 10/2007 |
| JP | 2008171732 | 7/2008 |
| JP | 2009170258 A | 7/2009 |
| JP | 2010146732 A | 7/2010 |
| JP | 2010225552 A | 10/2010 |
| JP | 2010262752 A | 11/2010 |
| JP | 2012516941 A | 7/2012 |
| JP | 2015064959 A | 4/2015 |
| KR | 20030044508 | 6/2003 |
| KR | 1020060050988 | 5/2006 |
| NL | 1015956 | 2/2002 |
| TW | 201225385 A | 6/2012 |
| WO | 0243168 A2 | 5/2002 |
| WO | 03105258 | 12/2003 |
| WO | 2008030215 | 3/2008 |
| WO | 2008089110 | 7/2008 |
| WO | 2009129490 | 10/2009 |
| WO | 2009140300 | 11/2009 |
| WO | 2010090956 A2 | 8/2010 |
| WO | 2010092059 | 8/2010 |
| WO | 2010138176 | 12/2010 |
| WO | 2011154862 | 12/2011 |

(56) References Cited

FOREIGN PATENT DOCUMENTS

| WO | 2013112670 | | 8/2013 |
|----|------------|---|--------|
| WO | 2014028230 | A1 | 2/2014 |

OTHER PUBLICATIONS

Whitehead et al., Current Collectors for positive electrodes of lithium-based batteries, Journal of the Electrochemical Society, 2005, A5105-A2113, 152(11).
Patent Cooperation Treaty, International Search Report issued for PCT/US2014/025200, dated Jul. 29, 2014, 4 pages.
European Patent Office, Extended European Search Report for 14768734.7, EP 2973785, 10 pages dated Jul. 15, 2016.
Patent Cooperation Treaty, International Search Report issued on PCT/US2012/022393, dated Oct. 10, 2012, 4 pages.
Patent Cooperation Treaty, Written Opinion of the International Searching Authority issued on PCT/US2012/022393, dated Oct. 9, 2012, 5 pages.
Golodnitsky et al., Advanced materials for the 3D microbattery, Journal of Power Sources, 2006, 153, 281-287.
Broussely et al., Li-ion batteries and portable power source prospects for the next 5-10 years, Journal of Power Sources, 136, 2004, 386-394.
United Kingdom Search Report dated Dec. 18, 2012, 4 pages.
Patent Cooperation Treaty, International Search report issued for PCT/US2013/022868, dated May 15, 2013, 3 pages.
Harraz et al., Different behavior in immersion plating of nickel on porous silicon from acidic and alkaline fuoride media, J. Electrochem. Soc, 150, 5, 2003, pp. C277-C284.
Waidmann, S. et al., Tuning nickel silicide properties using a lamp based RTA, a heat conduction based RTA or a furnace anneal, Microelectronic Engineering 83, 2006, 2282-2286.
Xu et al., Nickel Displacement Deposition of Porous Silicon with Ultrahigh Aspect Ratio, Journal of the Electrochemical Society, 2007,170-174,154(3).
Xu, Chengkun et al., Theorectical studies of displacement disposition of nickel into porous silicon with ultrahigh aspect ratio, Electrochimica Acta, Dec. 4, 2006, 3901-3909, 52.
Zhang Xi et al., High aspect ratio nickel structures fabricated by electrochemical replication of hydrofluoric acid etched silicon, Electrochem and Solid-State Letters, vol. 9, 9, 2006, pp. C150-C152.
Patent Cooperation Treaty, International Search Report for PCT/US2009/041012, dated Sep. 8, 2009, 4 pages.
Liu, C., Bulk Micromachining and Silicon Anisotropic Etching, Foundations of MEMS, Prentice Hall Inc. Chapter 10, pp. 326-370; Prentice Hall.
Shin et al. Porous Silicon Negative Electrodes for Rachargeable Lithium Batteries, Journal of Power Sources, 139 (2005) 314-320.
Vyatkin et al., Random and Ordered Macropore in p-type silicon J. Electrochem. Soc. 149, 1, G70-G76 (2002).
Arora, P. et al., "Battery Separators", Chem. Reviews, 2004, 104, 4419-4462.
Bourderau et al., "Amorphous Silicon as a Possible Anode Material for Li-Ion Batteries," Journal of Power Sources, 1999, 81-82, 233-236.

Li et al., "The Crystal Structural Evolution of Nano-Si Anode Caused by Lithium Insertion and Extraction at Room Temperature," Solid State Ionics, 2000, 135, 181-191.
Kasavajjula et al., Nano- and Bulk-Silicon-Based Insertion Anodes for Lithium-Ion Secondary Cells, Journal of Power Sources, 2007, 1003-1039, 163.
Green et al., Structured silicon anodes for lithium battery applications, Electrochemical and Solid State Letters, 6, 2003, A75-A79.
Patent Cooperation Treaty, International Search Report for PCT/US2013/053235, dated Jan. 28, 2014, 5 pages.
Mu et al., Silicon nanotube array/gold electrode for direct electrochemistry of cytochrome C, J. Phys. Chem. B, 2007, 111(6), 1491-1495.
European Patent Office, Extended Search Report for EP 13 74 0825, App. No. 13740825.8, dated Aug. 8, 2015, 9 pages.
Harraz et al., Immersion plating of nickel onto a porous silicon layer from fluoride solutions, Phys. Stat. Sol., 2003, 197(1): 51-56.
Harraz et al., Different behavior in immersion plating of nickel on porous silicon from acidic and and alkaline fluoride media, J. Elect. Soc., 2003, 150(5): C277-284.
Obrovac et al., Reversible cycling of crystalline silicon powder, J. Elect. Soc., 2007, 154(2): A103-A108.
Waidmann et al., Tuning nickel silicide properties using a lamp based RTA, a heat conduction based RTA or a furnace anneal, Microelectronic Engineering, 2006, 83, 2282-2286.
Xu et al., Theoretical studies of displacement disposition of nickel into porous silicon with ultrahigh aspect ration, Electrochimica Acta, 2006, 52, 3901-3909.
Xu et al., Nickel displacement deposition of porous silicon with ultrahigh aspect ratio, J. Elect. Soc., 2007, 154(3): 170-174.
Zhang et al., High aspect ration nickel structions fabricated by electrochemical replication of hydrofluoric acid etched silicon, Electrochemical and Solid-State Letters, 2006, 9(9): C150-C152.
European Patent Office, Extended European Search Report for 12866772.2, EP 2807698, dated Oct. 8, 2015, 3 pages.
Su et al., Silicon-Based Nanomaterials for Lithium-Ion Batteries: A Review, Advanced Energy Materials, 2013, 1-23.
Maranchi et al., High capacity, reversible silicon thin-film anodes for lithium-ion batteries, Electrochemical and Solid-State Letters, 2001, 6(9), A198-A201.
Iaboni et al., Li15SI4 Formation in silicon thin film negative electrodes, Journal of the Electrochemical Society, 2016, 163(2), A255-A261.
European Patent Office, Extended European Search Report for 13829954.0, EP 2885830, dated Feb. 19, 2016, 7 pages.
Patent Cooperation Treaty, International Search Report for PCT/US2016/032284, dated Aug. 26, 2016, 4 pages.
Roberts et al., 3D lithium ion batteries—from fundamentals to fabrication, Journal of Materials Chemistry, Royal Society of Chemistry, 2011, 21: 9876-9890.
Taiwan Search Report for App. No. 102129550, dated Sep. 9, 2016, 1 page.
Patent Cooperation Treaty, International Search Report for PCT/US2017/032355, 4 pages.
Patent Cooperation Treaty, International Search Report for PCT/US2016/032255, dated Aug. 25, 2017, 4 pages.
European Patent Office, Extended European Search Report for Application No. 16793590.7, publication EP 3295507, 7 pages.

SEPARATORS FOR THREE-DIMENSIONAL BATTERIES

FIELD OF THE INVENTION

The present invention generally relates to structures for use in energy storage devices, to energy storage devices incorporating such structures, and to methods for producing such structures and energy devices.

BACKGROUND OF THE INVENTION

Rocking chair or insertion secondary batteries are a type of energy storage device in which carrier ions, such as lithium, sodium, potassium, calcium or magnesium ions, move between a positive electrode and a negative electrode through an electrolyte. The secondary battery may comprise a single battery cell, or two more battery cells that have been electrically coupled to form the battery, with each battery cell comprising a positive electrode, a negative electrode, a microporous separator and an electrolyte.

In rocking chair battery cells, both the positive and negative electrodes comprise materials into which a carrier ion inserts and extracts. As a cell is discharged, carrier ions are extracted from the negative electrode and inserted into the positive electrode. As a cell is charged, the reverse process occurs: the carrier ion is extracted from the positive and inserted into the negative electrode.

FIG. 1 shows a cross sectional view of an electrochemical stack of an existing energy storage device, such as a non-aqueous, lithium-ion battery. The electrochemical stack 1 includes a positive electrode current collector 12, on top of which a positive electrode active material layer 13 is assembled. This layer is covered by a microporous separator 14, over which an assembly of a negative electrode current collector 15 and a negative electrode active material layer 16 are placed. This stack is sometimes covered with another separator layer (not shown) above the negative electrode current collector 15, rolled and stuffed into a can, and filled with a non-aqueous electrolyte to assemble a secondary battery.

The positive and negative electrode current collectors pool electric current from the respective active electrochemical electrodes and enable transfer of the current to the environment outside the battery. A portion of a negative electrode current collector is in physical contact with the negative electrode active material while a portion of a positive electrode current collector is in physical contact with the positive electrode active material. The current collectors do not participate in the electrochemical reaction and are therefore restricted to materials that are electrochemically stable in the respective electrochemical potential ranges for the anode and cathode.

To bring current from the current collectors to the environment outside the battery, the negative electrode and positive electrode current collectors are typically each connected to an electrode bus, tab, tag, package feed-through or housing feed-through, typically collectively referred to as contacts. One end of a contact is connected to one or more current collectors while the other end passes through the battery packaging for electrical connection to the environment outside the battery. The negative electrode contact is connected to the negative electrode current collectors and the positive electrode contact is connected to the positive electrode current collectors by welding, crimping, or ultrasonic bonding or is glued in place with an electrically conductive glue.

Conventional wound batteries (see, e.g., U.S. Pat. Nos. 6,090,505 and 6,235,427) typically have electrode materials (active materials, binder, conductivity aid) coated onto a single foil and compressed prior to cell assembly. The foil onto which the electrode is coated onto is typically part of the current collection path. In single jellyroll batteries such as the 18650 or prismatic cells, the current collector foil is ultrasonically welded to electrode buses, tabs, tags etc., that carry the current from the active materials, through the current collector foils and the tabs, to the outside of the battery. Depending on the design, there may be tabs in multiple places along a single jellyroll, or along one place in one or both ends of the current collector foil. Conventional stacked battery pouch cells have multiple plates (or foils) of active material with areas on top of each foil that are subsequently gathered and welded together to a tab; which then carries the current to the outside of the battery pouch (see, e.g., U.S. Patent Publication No. 2005/0008939).

Referring again to FIG. 1, during a charging process, lithium leaves the positive electrode cathode layer 13 and travels through the separator 14 as lithium ions into negative electrode active material layer 16. Depending upon the negative electrode active material used, the lithium ions either intercalate (e.g., sit in a matrix of the negative electrode active material without forming an alloy) or form an alloy. During a discharge process, the lithium leaves negative electrode active material layer 16, travels through the separator 14 and enters positive electrode active material layer 13. The current conductors conduct electrons from the battery contacts (not shown) to the electrodes or vice versa.

Battery separators are used to separate the anode and cathode during assembly and battery operations. Separators for existing lithium ion batteries typically use thin porous insulating materials with high ion permeability, good mechanical stability, and good chemical compatibility to the battery chemistries. Structurally, the separator should have sufficient porosity to absorb liquid electrolyte for the high ionic conductivity. It mostly is a microporous layer consisting of either a polymeric membrane or a non-woven fabric mat.

Existing energy storage devices, such as batteries, fuel cells, and electrochemical capacitors, typically have two-dimensional laminar architectures (e.g., planar or spiral-wound laminates) as illustrated in FIG. 1 with a surface area of each laminate being roughly equal to its geometrical footprint (ignoring porosity and surface roughness).

Three-dimensional batteries have been proposed in the literature as ways to improve battery capacity and active material utilization. It has been proposed that a three-dimensional architecture may be used to provide higher surface area and higher energy as compared to a two dimensional, laminar battery architecture. There is a benefit to making a three-dimensional energy storage device due to the increased amount of energy that may be obtained out of a small geometric area. See, e.g., Rust et al., WO2008/089110 and Long et. al, "Three-Dimensional Battery Architectures," *Chemical Reviews*, (2004), 104, 4463-4492.

Despite the advances made to-date, a need remains for secondary batteries and other energy storage devices having increased energy density.

SUMMARY OF THE INVENTION

Among the various aspects of the present invention is the provision of three-dimensional structures for use in energy storage devices such as batteries, fuel cells, and electrochemical capacitors. Advantageously, and in accordance with one aspect of the present invention, the proportion of electrode active material relative to the other components of the energy storage device, i.e., the non-active material components of the energy storage device may be increased. As a result, energy storage devices comprising three-dimensional structures of the present invention may have increased energy density. They may also provide a higher rate of energy retrieval than two-dimensional energy storage devices for a specific amount of energy stored, such as by minimizing or reducing transport distances for electron and ion transfer between a positive electrode and negative electrode. These devices may be more suitable for miniaturization and for applications where a geometrical area available for a device is limited and/or where energy density requirement is higher than what may be achieved with a laminar device.

Briefly, therefore, one aspect of the present invention is an electrode structure for use in an energy storage device. The electrode structure comprises a population of electrodes having an electrode active material layer and a population of counter-electrodes having a counter-electrode active material layer. The population of electrodes is arranged in alternating sequence with the population of counter-electrodes along a first direction. Each member of the electrode population has a bottom, a top, a length $L_E$, a width $W_E$, a height $H_E$, and a longitudinal axis $A_E$ extending from the bottom to the top of each such member and in a direction that is transverse to the first direction, the length $L_E$ of each member of the electrode population being measured in the direction of its longitudinal axis $A_E$, the width $W_E$ of each member of the electrode population being measured in the first direction, and the height $H_E$ of each member of the electrode population being measured in a direction that is perpendicular to the longitudinal axis $A_E$ of each such member and the first direction. The ratio of $L_E$ to each of $W_E$ and $H_E$ of each member of the electrode population is at least 5:1, respectively, and the ratio of $H_E$ to $W_E$ for each member of the electrode population is between 0.4:1 and 1000:1, respectively. The longitudinal axis $A_E$ of each member of the population of electrodes is surrounded by an electrically insulating separator layer, and the electrically insulating separator layer comprises a microporous separator material layer comprising a particulate material and a binder between members of the electrode and counter-electrode populations, the microporous separator material layer having a void fraction of at least 20 vol. %.

Another aspect of the present invention is an electrode stack comprising at least two electrode structures. Each of the electrode structures comprises an electrode structure comprises a population of electrodes having an electrode active material layer and a population of counter-electrodes having a counter-electrode active material layer. The population of electrodes is arranged in alternating sequence with the population of counter-electrodes along a first direction. Each member of the electrode population has a bottom, a top, a length $L_E$, a width $W_E$, a height $H_E$, and a longitudinal axis $A_E$ extending from the bottom to the top of each such member and in a direction that is transverse to the first direction, the length $L_E$ of each member of the electrode population being measured in the direction of its longitudinal axis $A_E$, the width $W_E$ of each member of the electrode population being measured in the first direction, and the height $H_E$ of each member of the electrode population being measured in a direction that is perpendicular to the longitudinal axis $A_E$ of each such member and the first direction. The ratio of $L_E$ to each of $W_E$ and $H_E$ of each member of the electrode population is at least 5:1, respectively, and the ratio of $H_E$ to $W_E$ for each member of the electrode population is between 0.4:1 and 1000:1, respectively. The longitudinal axis $A_E$ of each member of the population of electrodes is surrounded by an electrically insulating separator layer, and the electrically insulating separator layer comprises a microporous separator material layer comprising a particulate material and a binder between members of the electrode and counter-electrode populations, the microporous separator material layer having a void fraction of at least 20 vol. %.

Another aspect of the present invention is a secondary battery comprising a battery enclosure, a non-aqueous electrolyte and an electrode structure. The electrode structure comprises a population of electrodes having an electrode active material layer and a population of counter-electrodes having a counter-electrode active material layer. The population of electrodes is arranged in alternating sequence with the population of counter-electrodes along a first direction. Each member of the electrode population has a bottom, a top, a length $L_E$, a width $W_E$, a height $H_E$, and a longitudinal axis $A_E$ extending from the bottom to the top of each such member and in a direction that is transverse to the first direction, the length $L_E$ of each member of the electrode population being measured in the direction of its longitudinal axis $A_E$, the width $W_E$ of each member of the electrode population being measured in the first direction, and the height $H_E$ of each member of the electrode population being measured in a direction that is perpendicular to the longitudinal axis $A_E$ of each such member and the first direction. The ratio of $L_E$ to each of $W_E$ and $H_E$ of each member of the electrode population is at least 5:1, respectively, and the ratio of $H_E$ to $W_E$ for each member of the electrode population is between 0.4:1 and 1000:1, respectively. The longitudinal axis $A_E$ of each member of the population of electrodes is surrounded by an electrically insulating separator layer, and the electrically insulating separator layer comprises a microporous separator material layer comprising a particulate material and a binder between members of the electrode and counter-electrode populations, the microporous separator material layer having a void fraction of at least 20 vol. %.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
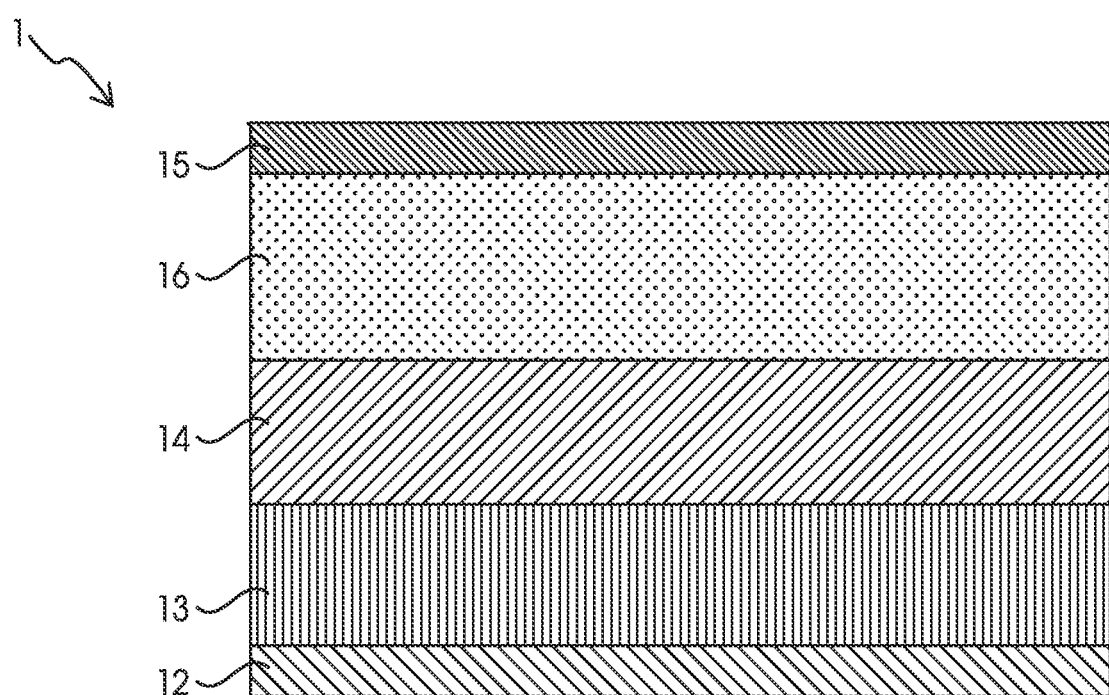
FIG. 1 is a cross-section of a cell of an electrochemical stack of a typical, prior art, two-dimensional energy storage device such as a lithium ion battery.

Among the various aspects of the present invention may be noted three-dimensional structures offering particular advantages when incorporated into energy storage devices such as batteries, capacitors, and fuel cells. For example, such structures may be incorporated into secondary batteries in which the positive electrode, negative electrode, and/or a separator are non-laminar in nature. In one preferred exemplary embodiment, such structures are incorporated into secondary batteries in which carrier ions (selected, for example, from lithium, sodium, potassium, calcium and magnesium ions) move between the positive and negative electrodes.

In general, the three-dimensional structure comprises a population of electrodes, a population of counter-electrodes and a separator material to electrically isolate members of the electrode population from members of the counter-electrode population. The populations of electrodes and counter-electrodes are arranged in an alternating sequence, with substantially each member of the electrode population being between two members of the counter-electrode population and substantially each member of the counter-electrode population being between two members of the electrode population. For example, with the exception of the first and last electrode or counter-electrode in the alternating series, in one embodiment each electrode in the alternating series is between two counter-electrodes and each counter-electrode in the series is between two electrodes.

In one embodiment, members of the electrode population comprise an electrode active material layer, an electrode current collector and an electrode backbone that supports the electrode active material layer and the electrode current collector. Similarly, in one embodiment, members of the counter-electrode population comprise a counter-electrode active material layer, a counter-electrode current collector and a counter-electrode backbone that supports the counter-electrode active material layer and the counter-electrode current collector.

Each member of the electrode population has a bottom, a top, and a longitudinal axis ($A_E$) extending from the bottom to the top thereof and in a direction generally perpendicular to the direction in which the alternating sequence of electrodes and counter-electrodes progresses. Additionally, each member of the electrode population has a length ($L_E$) measured along the longitudinal axis ($A_E$), a width ($W_E$) measured in the direction in which the alternating sequence of electrodes and counter-electrodes progresses, and a height ($H_E$) measured in a direction that is perpendicular to each of the directions of measurement of the length ($L_E$) and the width ($W_E$). Each member of the electrode population also has a perimeter ($P_E$) that corresponds to the sum of the length(s) of the side(s) of a projection of the electrode in a plane that is normal to its longitudinal axis.

The length ($L_E$) of the members of the electrode population will vary depending upon the energy storage device and its intended use. In general, however, the members of the electrode population will typically have a length ($L_E$) in the range of about 5 mm to about 500 mm. For example, in one such embodiment, the members of the electrode population have a length ($L_E$) of about 10 mm to about 250 mm. By way of further example, in one such embodiment the members of the electrode population have a length ($L_E$) of about 25 mm to about 100 mm.

The width ($W_E$) of the members of the electrode population will also vary depending upon the energy storage device and its intended use. In general, however, each member of the electrode population will typically have a width ($W_E$) within the range of about 0.01 mm to 2.5 mm. For example, in one embodiment, the width ($W_E$) of each member of the electrode population will be in the range of about 0.025 mm to about 2 mm. By way of further example, in one embodiment, the width ($W_E$) of each member of the electrode population will be in the range of about 0.05 mm to about 1 mm.

The height ($H_E$) of the members of the electrode population will also vary depending upon the energy storage device and its intended use. In general, however, members of the electrode population will typically have a height ($H_E$) within the range of about 0.05 mm to about 10 mm. For example, in one embodiment, the height ($H_E$) of each member of the electrode population will be in the range of about 0.05 mm to about 5 mm. By way of further example, in one embodiment, the height ($H_E$) of each member of the electrode population will be in the range of about 0.1 mm to about 1 mm.

The perimeter ($P_E$) of the members of the electrode population will similarly vary depending upon the energy storage device and its intended use. In general, however, members of the electrode population will typically have a perimeter ($P_E$) within the range of about 0.025 mm to about 25 mm. For example, in one embodiment, the perimeter ($P_E$) of each member of the electrode population will be in the range of about 0.1 mm to about 15 mm. By way of further example, in one embodiment, the perimeter ($P_E$) of each member of the electrode population will be in the range of about 0.5 mm to about 10 mm.

In general, members of the electrode population have a length ($L_E$) that is substantially greater than each of its width ($W_E$) and its height ($H_E$). For example, in one embodiment, the ratio of $L_E$ to each of $W_E$ and $H_E$ is at least 5:1, respectively (that is, the ratio of $L_E$ to $W_E$ is at least 5:1, respectively and the ratio of $L_E$ to $H_E$ is at least 5:1, respectively), for each member of the electrode population. By way of further example, in one embodiment the ratio of $L_E$ to each of $W_E$ and $H_E$ is at least 10:1. By way of further example, in one embodiment, the ratio of $L_E$ to each of $W_E$ and $H_E$ is at least 15:1. By way of further example, in one embodiment, the ratio of $L_E$ to each of $W_E$ and $H_E$ is at least 20:1, for each member of the electrode population.

Additionally, it is generally preferred that members of the electrode population have a length ($L_E$) that is substantially greater than its perimeter ($P_E$); for example, in one embodiment, the ratio of $L_E$ to $P_E$ is at least 1.25:1, respectively, for each member of the electrode population. By way of further example, in one embodiment the ratio of $L_E$ to $P_E$ is at least 2.5:1, respectively, for each member of the electrode population. By way of further example, in one embodiment, the ratio of $L_E$ to $P_E$ is at least 3.75:1, respectively, for each member of the electrode population.

In one embodiment, the ratio of the height ($H_E$) to the width ($W_E$) of the members of the electrode population is at least 0.4:1, respectively. For example, in one embodiment, the ratio of $H_E$ to $W_E$ will be at least 2:1, respectively, for each member of the electrode population. By way of further example, in one embodiment the ratio of $H_E$ to $W_E$ will be at least 10:1, respectively. By way of further example, in one embodiment the ratio of $H_E$ to $W_E$ will be at least 20:1, respectively. Typically, however, the ratio of $H_E$ to $W_E$ will generally be less than 1,000:1, respectively. For example, in one embodiment the ratio of $H_E$ to $W_E$ will be less than 500:1, respectively. By way of further example, in one embodiment the ratio of $H_E$ to $W_E$ will be less than 100:1, respectively. By way of further example, in one embodiment the ratio of $H_E$ to $W_E$ will be less than 10:1, respectively. By way of further example, in one embodiment the ratio of $H_E$ to $W_E$ will be in the range of about 2:1 to about 100:1, respectively, for each member of the electrode population.

Each member of the counter-electrode population has a bottom, a top, and a longitudinal axis ($A_{CE}$) extending from the bottom to the top thereof and in a direction generally perpendicular to the direction in which the alternating sequence of electrodes and counter-electrodes progresses. Additionally, each member of the counter-electrode population has a length ($L_{CE}$) measured along the longitudinal axis ($A_{CE}$), a width ($W_{CE}$) measured in the direction in which the alternating sequence of electrodes and counter-electrodes progresses, and a height ($H_{CE}$) measured in a direction that is perpendicular to each of the directions of measurement of the length ($L_{CE}$) and the width ($W_{CE}$). Each member of the counter-electrode population also has a perimeter ($P_{CE}$) that corresponds to the sum of the length(s) of the side(s) of a projection of the counter-electrode in a plane that is normal to its longitudinal axis.

The length ($L_{CE}$) of the members of the counter-electrode population will vary depending upon the energy storage device and its intended use. In general, however, each member of the counter-electrode population will typically have a length ($L_{CE}$) in the range of about 5 mm to about 500 mm. For example, in one such embodiment, each member of the counter-electrode population has a length ($L_{CE}$) of about 10 mm to about 250 mm. By way of further example, in one such embodiment each member of the counter-electrode population has a length ($L_{CE}$) of about 25 mm to about 100 mm.

The width ($W_{CE}$) of the members of the counter-electrode population will also vary depending upon the energy storage device and its intended use. In general, however, members of the counter-electrode population will typically have a width ($W_{CE}$) within the range of about 0.01 mm to 2.5 mm. For example, in one embodiment, the width ($W_{CE}$) of each member of the counter-electrode population will be in the range of about 0.025 mm to about 2 mm. By way of further example, in one embodiment, the width ($W_{CE}$) of each member of the counter-electrode population will be in the range of about 0.05 mm to about 1 mm.

The height ($H_{CE}$) of the members of the counter-electrode population will also vary depending upon the energy storage device and its intended use. In general, however, members of the counter-electrode population will typically have a height ($H_{CE}$) within the range of about 0.05 mm to about 10 mm. For example, in one embodiment, the height ($H_{CE}$) of each member of the counter-electrode population will be in the range of about 0.05 mm to about 5 mm. By way of further example, in one embodiment, the height ($H_{CE}$) of each member of the counter-electrode population will be in the range of about 0.1 mm to about 1 mm.

The perimeter ($P_{CE}$) of the members of the counter-electrode population will also vary depending upon the energy storage device and its intended use. In general, however, members of the counter-electrode population will typically have a perimeter ($P_{SE}$) within the range of about 0.025 mm to about 25 mm. For example, in one embodiment, the perimeter ($P_{CE}$) of each member of the counter-electrode population will be in the range of about 0.1 mm to about 15 mm. By way of further example, in one embodiment, the perimeter ($P_{CE}$) of each member of the counter-electrode population will be in the range of about 0.5 mm to about 10 mm.

In general, each member of the counter-electrode population has a length ($L_{CE}$) that is substantially greater than width ($W_{CE}$) and substantially greater than its height ($H_{CE}$). For example, in one embodiment, the ratio of $L_{CE}$ to each of $W_{CE}$ and $H_{CE}$ is at least 5:1, respectively (that is, the ratio of $L_{CE}$ to $W_{CE}$ is at least 5:1, respectively and the ratio of $L_{CE}$ to $H_{CE}$ is at least 5:1, respectively), for each member of the counter-electrode population. By way of further example, in one embodiment the ratio of $L_{CE}$ to each of $W_{CE}$ and $H_{CE}$ is at least 10:1 for each member of the counter-electrode population. By way of further example, in one embodiment, the ratio of $L_{CE}$ to each of $W_{CE}$ and $H_{CE}$ is at least 15:1 for each member of the counter-electrode population. By way of further example, in one embodiment, the ratio of $L_{CE}$ to each of $W_{CE}$ and $H_{CE}$ is at least 20:1 for each member of the counter-electrode population.

Additionally, it is generally preferred that members of the counter-electrode population have a length ($L_{CE}$) that is substantially greater than its perimeter ($P_{CE}$); for example, in one embodiment, the ratio of $L_{CE}$ to $P_{CE}$ is at least 1.25:1, respectively, for each member of the counter-electrode population. By way of further example, in one embodiment the ratio of $L_{CE}$ to $P_{CE}$ is at least 2.5:1, respectively, for each member of the counter-electrode population. By way of further example, in one embodiment, the ratio of $L_{CE}$ to $P_{CE}$ is at least 3.75:1, respectively, for each member of the counter-electrode population.

In one embodiment, the ratio of the height ($H_{CE}$) to the width ($W_{CE}$) of the members of the counter-electrode population is at least 0.4:1, respectively. For example, in one embodiment, the ratio of $H_{CE}$ to $W_{CE}$ will be at least 2:1, respectively, for each member of the counter-electrode population. By way of further example, in one embodiment the ratio of $H_{CE}$ to $W_{CE}$ will be at least 10:1, respectively, for each member of the counter-electrode population. By way of further example, in one embodiment the ratio of $H_{CE}$ to $W_{CE}$ will be at least 20:1, respectively, for each member of the counter-electrode population. Typically, however, the ratio of $H_{CE}$ to $W_{CE}$ will generally be less than 1,000:1, respectively, for each member of the electrode population. For example, in one embodiment the ratio of $H_{CE}$ to $W_{CE}$ will be less than 500:1, respectively, for each member of the counter-electrode population. By way of further example, in one embodiment the ratio of $H_{CE}$ to $W_{CE}$ will be less than 100:1, respectively. By way of further example, in one embodiment the ratio of $H_{CE}$ to $W_{CE}$ will be less than 10:1, respectively. By way of further example, in one embodiment the ratio of $H_{CE}$ to $W_{CE}$ will be in the range of about 2:1 to about 100:1, respectively, for each member of the counter-electrode population.

To electrically isolate members of the population of electrodes from the population of counter-electrodes, (i) members of the electrode population are surrounded by an electrically insulating separator material layer along their longitudinal axes ($A_E$), (ii) members of the counter-electrode population are surrounded by a layer of an electrically insulating separator material along their longitudinal axes ($A_{CE}$), or (iii) members of the electrode population and members of the counter-electrode population are each surrounded by a layer of an electrically insulating material along their respective longitudinal axes. For example, in one embodiment the longitudinal axes ($A_E$) of each member of the population of electrodes is surrounded by a layer of an electrically insulating material. By way of further example, in one embodiment the longitudinal axes ($A_{CE}$) of each member of the population of counter-electrodes is surrounded by a layer of an electrically insulating material. By way of further example, in one embodiment the longitudinal axes ($A_{CE}$) of each member of the population of electrodes and the longitudinal axes ($A_{CE}$) of each member of the population of counter-electrodes are surrounded by a layer of an electrically insulating material.

In one embodiment, the electrically insulating material layer will have a thickness of at least about 5 micrometers. In general, however, the electrically insulating material layer will have a thickness (at least in those areas separating a member of the population of electrodes from the nearest member of the population of counter-electrodes) that does not exceed about 100 micrometers. For example, in certain embodiments the electrically insulating material layer will have a thickness (at least in those areas separating a member of the population of electrodes from the nearest member of the population of counter-electrodes) in the range of about 5 to about 50 micrometers. By way of further example, in certain embodiments the electrically insulating material layer will have a thickness (at least in those areas separating a member of the population of electrodes from the nearest member of the population of counter-electrodes) in the range of about 10 to about 35 micrometers. By way of further example, in certain embodiments the electrically insulating material layer will have a thickness (at least in those areas separating a member of the population of electrodes from the nearest member of the population of counter-electrodes) in the range of about 15 to about 30 micrometers.

To permit carrier ion exchange between members of the electrode population and members of the counter-electrode population during a charging or discharging operation, the electrically insulating material layer separating the electrode active material layers of members of the electrode population and the counter-electrode active material layers of members of the counter-electrode population comprises a microporous separator material. In one embodiment, for example, and ignoring the porosity of the microporous separator material, the microporous separator material constitutes at least 70 vol % of the electrically insulating separator material layer between members of the electrode population and members of the counter-electrode population. By way of further example, in one embodiment and ignoring the porosity of the microporous separator material, the microporous separator material constitutes at least 75 vol % of the electrically insulating separator material layer between members of the electrode population and members of the counter-electrode population. By way of further example, in one embodiment and ignoring the porosity of the microporous separator material, the microporous separator material constitutes at least 80 vol % of the electrically insulating separator material layer between members of the electrode population and members of the counter-electrode population. By way of further example, in one embodiment and ignoring the porosity of the microporous separator material, the microporous separator material constitutes at least 85 vol % of the electrically insulating separator material layer between members of the electrode population and members of the counter-electrode population. By way of further example, in one embodiment and ignoring the porosity of the microporous separator material, the microporous separator material constitutes at least 90 vol % of the electrically insulating separator material layer between members of the electrode population and members of the counter-electrode population. By way of further example, in one embodiment and ignoring the porosity of the microporous separator material, the microporous separator material constitutes at least 95 vol % of the electrically insulating separator material layer between members of the electrode population and members of the counter-electrode population. By way of further example, in one embodiment and ignoring the porosity of the microporous separator material, the microporous separator material constitutes at least 99 vol % of the electrically insulating separator material layer between members of the electrode population and members of the counter-electrode population.

In one embodiment, the microporous separator material comprises a particulate material and a binder, and has a porosity (void fraction) of at least about 20 vol. % The pores of the microporous separator material will have a diameter of at least 50 Å and will typically fall within the range of about 250 to 2,500 Å. The microporous separator material will typically have a porosity of less than about 75%. In one embodiment, the microporous separator material has a porosity (void fraction) of at least about 25 vol. %. In one embodiment, the microporous separator material will have a porosity of about 35-55%.

The binder for the microporous separator material may be selected from a wide range of inorganic or polymeric materials. For example, in one embodiment the binder is an organic material selected from the group consisting of silicates, phosphates, aluminates, aluminosilicates, and hydroxides such as magnesium hydroxide, calcium hydroxide etc. For example, in one embodiment the binder is a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, and polyethylene oxide. In another embodiment, the binder is selected from the group consisting of acrylates, styrenes, epoxies, and silicones. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment the particulate material has a conductivity for carrier ions (e.g., lithium) of less than $1 \times 10^{-4}$ S/cm. By way of further example in one embodiment the particulate material has a conductivity for carrier ions of less than $1 \times 10^{-5}$ S/cm. By way of further example in one embodiment the particulate material has a conductivity for carrier ions of less than $1 \times 10^{-6}$ S/cm. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment the particulate material comprises a particulate oxide or nitride such as $TiO_2$, $SiO_2$, $Al_2O_3$, $GeO_2$, $B_2O_3$, $Bi_2O_3$, $BaO$, $ZnO$, $ZrO_2$, $BN$, $Si_3N_4$, $Ge_3N_4$. See, e.g., P. Arora and J. Zhang, "Battery Separators" Chemical Reviews 2004, 104, 4419-4462). In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

In an alternative embodiment, the particulate material comprised by the microporous separator material may be bound by techniques such as sintering, binding, curing etc while maintaining the void fraction desired for electrolyte ingress to provide the ionic conductivity for the functioning of the battery.

Microporous separator materials may be deposited, for example, by electrophoretic deposition of a particulate separator material in which particles are coalesced by surface energy such as electrostatic attraction or van der Waals forces, slurry deposition (including spin or spray coating) of a particulate separator material, screen printing, dip coating, and electrostatic spray deposition. Binders may be included in the deposition process; for example, the particulate material may be slurry deposited with a dissolved binder that precipitates upon solvent evaporation, electrophoretically deposited in the presence of a dissolved binder material, or co-electrophoretically deposited with a binder and insulating particles etc. Alternatively, or additionally, binders may be added after the particles are deposited into or onto the electrode structure; for example, the particulate material may be dispersed in an organic binder solution and dip coated or spray-coated, followed by drying, melting, or cross-linking the binder material to provide adhesion strength.

In an assembled energy storage device, the microporous separator material is permeated with a non-aqueous electrolyte suitable for use as a secondary battery electrolyte. Typically, the non-aqueous electrolyte comprises a lithium salt dissolved in an organic solvent. Exemplary lithium salts include inorganic lithium salts such as $LiClO_4$, $LiBF_4$, $LiPF_6$, $LiAsF_6$, $LiCl$, and $LiBr$; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxyethane, diethyl ether, ethylene glycol dialkyl ethers, diethylene glycol dialkyl ethers, triethylene glycol dialkyl ethers, and tetraethylene glycol dialkyl ethers.

In one embodiment, the population of electrodes is a population of negative electrodes and the population of counter-electrodes is a population of positive electrodes. In this embodiment, longitudinal axis $A_E$, length $L_E$, width $W_E$, height $H_E$ and perimeter $P_E$ of members of the electrode population correspond to longitudinal axis $A_{NE}$, length $L_{NE}$, width $W_{NE}$, height $H_{NE}$ and perimeter $P_{NE}$, respectively, of members of the negative electrode population and longitudinal axis $A_{CE}$, length $L_{CE}$, width $W_{CE}$, height $H_{CE}$ and perimeter $P_{CE}$ of members of the counter-electrode population correspond to longitudinal axis $A_{PE}$, length $L_{PE}$, width $W_{PE}$, height $H_{PE}$, and perimeter $P_{PE}$, respectively, of members of the positive electrode population.

In an alternative embodiment, the population of electrodes is a population of positive electrodes, and the population of counter-electrodes is a population of negative electrodes. In this embodiment, therefore, longitudinal axis $A_E$, length $L_E$, width $W_E$, height $H_E$, and perimeter $P_E$ of members of the electrode population correspond to longitudinal axis $A_{PE}$, length $L_{PE}$, width $W_{PE}$, height $H_{PE}$, and perimeter $P_{PE}$, respectively, of members of the positive electrode population and longitudinal axis $A_{CE}$, length $L_{CE}$, width $W_{CE}$, height $H_{CE}$ and perimeter $P_{CE}$ of members of the counter-electrode population correspond to longitudinal axis $A_{NE}$, length $L_{NE}$, width $W_{NE}$, height $H_{NE}$ and perimeter $P_{NE}$, respectively, of members of the negative electrode population.

Figure 2:
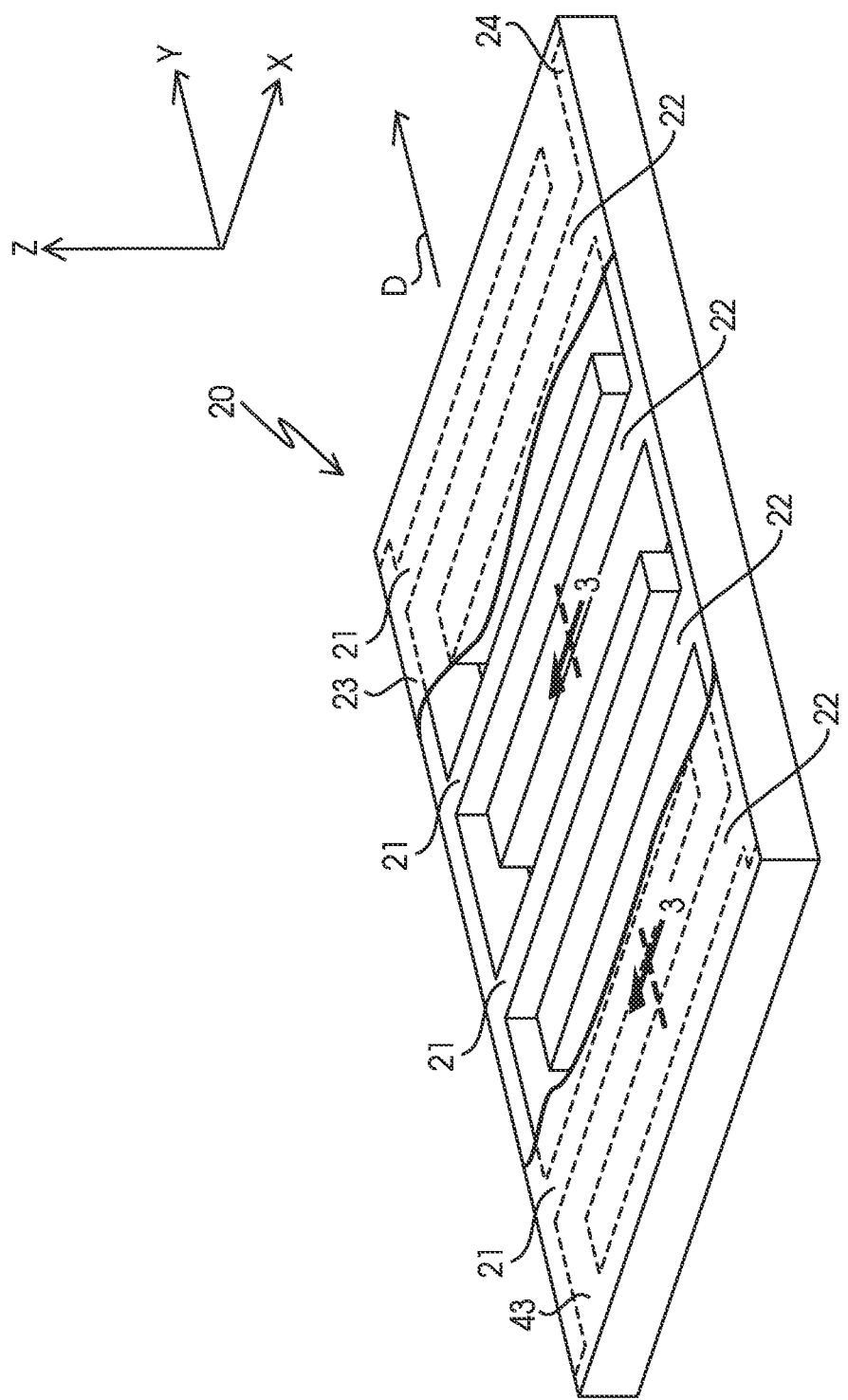
FIG. 2 is a perspective view of one embodiment of an electrode structure of the present invention with parts broken away to show internal construction.

Referring now to FIG. 2, and in one embodiment of the present invention, electrode structure 20 comprises population of negative electrodes 21 and population of positive electrodes 22. For ease of illustration, the population of negative electrodes includes four members 21 and the population of positive electrodes includes four members 22 in FIG. 2; in practice, however, the population of negative electrodes and the population of positive electrodes may each comprise a greater or lesser number of members. For example, in one embodiment the population of negative electrodes and the population of positive electrodes comprised by an electrode structure of the present invention may each include at least 5 members. By way of further example, in one embodiment the population of negative electrodes and the population of positive electrodes each include at least 10 members. By way of further example, in one embodiment the population of negative electrodes and the population of positive electrodes each include at least 50 members. By way of further example, in one embodiment the population of negative electrodes and the population of positive electrodes each include at least 100 members.

Irrespective of the number of members, members 21 of the population of negative electrodes and members 22 of the population of positive electrodes are interdigitated and arranged in an alternating series proceeding in direction D. As illustrated in FIG. 2, with one exception, each member 21 of the population of negative electrodes is between two members 22 of the positive electrode population and, with one exception, each member 22 of the population of positive electrodes is between two members 21 of the population of negative electrodes. Stated more generally, in one embodiment the positive electrode population and the negative electrode population each have N members, each of N−1 positive electrode population members is between two negative electrodes, each of N−1 negative electrode population members is between two positive electrodes, and N is at least 2. For example, in one embodiment, N is at least 4 (as illustrated in FIG. 2), at least 5, at least 10, at least 25, at least 50 or even at least 100.

In one alternative embodiment, each member 21 of the negative electrode population is between two members 22 of the population of positive electrodes such that the interdigitated series begins and ends with a positive electrode 22 and each negative electrode 21 is between two positive electrodes 22 (e.g., a series of electrodes having the following repeat sequence: positive electrode, negative electrode, positive electrode, negative electrode, positive electrode . . . ) with the interdigitated series progressing in direction D. For example, in one such embodiment, the negative electrode population has N members, the positive electrode population has N+1 members, each negative electrode is between two positive electrodes, and N is at least 5, at least 10, at least 25, at least 50 or even at least 100.

In another alternative embodiment, for example, each member 22 of the population of positive electrodes is between two members 21 of the population of negative electrodes such that the interdigitated series begins and ends with a negative electrode 21 and each positive electrode 22 is between two negative electrodes 21 (e.g., a series of electrodes having the following repeat sequence: negative electrode, positive electrode, negative electrode, positive electrode, negative electrode . . . ) with the interdigitated series progressing in direction D. In one such embodiment, the positive electrode population has N members, the negative electrode population has N+1 members, each positive electrode is between two negative electrodes, and N is at least 5, at least 10, at least 25, at least 50 or even at least 100.

Referring again to FIG. 2, each member 21 of the population of negative electrodes is directly connected to and extends from negative electrode bus 23 which pools current from each member 21 of the population of negative electrodes. Negative electrode bus 23, in turn, may be used to electrically connect each member 21 of the population of negative electrodes to the negative terminal of an energy storage device (not shown) or to an external energy supply (not shown) or an external energy consumer (not shown).

Each member 22 of the population of positive electrodes extends from and is electrically connected to positive electrode bus 24 which pools current from each member 22 of the population of positive electrodes. Positive electrode bus 24, in turn, may be used to electrically connect each member 22 of the population of positive electrodes to the positive terminal of an energy storage device (not shown) or to an external energy supply (not shown) or an external energy consumer (not shown).

Negative electrode bus 23 and positive electrode bus 24 may comprise any of a wide range of electrically conductive materials. For example, negative electrode bus 23 and positive electrode bus 24 may independently comprise an electrically conductive ceramic, glass, polymer, semiconductor, or metal for electrically connecting the members of the negative and positive electrode populations to the negative and positive electrically conductive pathways 25, 26, respectively. By way of further example, in one embodiment, negative electrode bus 23 and positive electrode bus 24 each independently comprise an electrically conductive material such as silicon, carbon, carbon composites, metal silicides, and the like. Exemplary materials for the positive electrode bus include aluminum, carbon, chromium, gold, nickel, NiP, palladium, platinum, rhodium, ruthenium, an alloy of silicon and nickel, titanium, an alloy of one or more thereof, and combinations thereof. Exemplary materials for the negative electrode bus include copper, nickel, chromium, titanium, tungsten, cobalt, carbon, an alloy of one or more thereof, and combinations thereof. The materials for the positive and negative electrode bus may be deposited by any of a range of well-known, metal deposition processes such as evaporation, sputtering, electroless plating, immersion plating, electroplating and the like. In certain embodiments, the conductive portions of the positive and negative electrode buses may comprise the same material. In other embodiments, the conductive portions of the positive and negative electrode buses may comprise compositionally different materials. In certain embodiments, the positive and/or negative electrode bus comprises a non-conductive core partially or completely covered by a conductive material shell; additionally, in such embodiments in which the positive and negative electrode buses comprise a non-conductive core partially or completely covered by a conductive material shell, the non-conductive cores of the positive and negative electrode buses may have the same composition while the conductive shells are compositionally different.

Electrically insulating separator layer 43 surrounds and electrically isolates each member 21 of the negative electrode population from each member 22 of the positive electrode population and electrically isolates negative electrode bus 23 from positive electrode bus 24. Between adjacent negative electrode/positive electrode pairs (i.e., negative electrode/positive electrode pairs that provide the shortest distance for a carrier ion to travel from a given member of the negative electrode population to a member of the positive electrode population or vice versa during a charging or discharging operation) electrically insulating separator layer 43 comprises a microporous separator material that can be permeated with a non-aqueous electrolyte as previously described; for example, as previously described in greater detail, in one embodiment the microporous separator material comprises pores having a diameter of at least 50 Å, more typically in the range of about 2,500 Å, and a porosity in the range of about 25% to about 75%, more typically in the range of about 35-55%.

In one embodiment, for example, and ignoring the porosity of the microporous separator material, at least 70 vol % of electrically insulating separator material layer 43 between a member 21 of the negative electrode population and the nearest member(s) 22 of the positive electrode population (i.e., an "adjacent pair") for ion exchange during a charging or discharging cycle is a microporous separator material; stated differently, microporous separator material constitutes at least 70 vol. % of the electrically insulating material between a negative electrode member 21 and a positive electrode member 22. By way of further example, in one embodiment and ignoring the porosity of the microporous separator material, microporous separator material constitutes at least 75 vol % of the electrically insulating separator material layer between adjacent pairs of members 21 and members 22 of the negative electrode population and positive electrode population, respectively. By way of further example, in one embodiment and ignoring the porosity of the microporous separator material, the microporous separator material constitutes at least 80 vol % of the electrically insulating separator material layer between adjacent pairs of members 21 and members 22 of the negative electrode population and positive electrode population, respectively. By way of further example, in one embodiment and ignoring the porosity of the microporous separator material, the microporous separator material constitutes at least 85 vol % of the electrically insulating separator material layer between adjacent pairs of members 21 and members 22 of the negative electrode population and positive electrode population, respectively. By way of further example, in one embodiment and ignoring the porosity of the microporous separator material, the microporous separator material constitutes at least 90 vol % of the electrically insulating separator material layer between adjacent pairs of members 21 and members 22 of the negative electrode population and positive electrode population, respectively. By way of further example, in one embodiment and ignoring the porosity of the microporous separator material, the microporous separator material constitutes at least 95 vol % of the electrically insulating separator material layer between adjacent adjacent pairs of members 21 and members 22 of the negative electrode population and positive electrode population, respectively. By way of further example, in one embodiment and ignoring the porosity of the microporous separator material, the microporous separator material constitutes at least 99 vol % of the electrically insulating separator material layer between adjacent pairs of members 21 and members 22 of the negative electrode population and positive electrode population, respectively.

Figure 3:
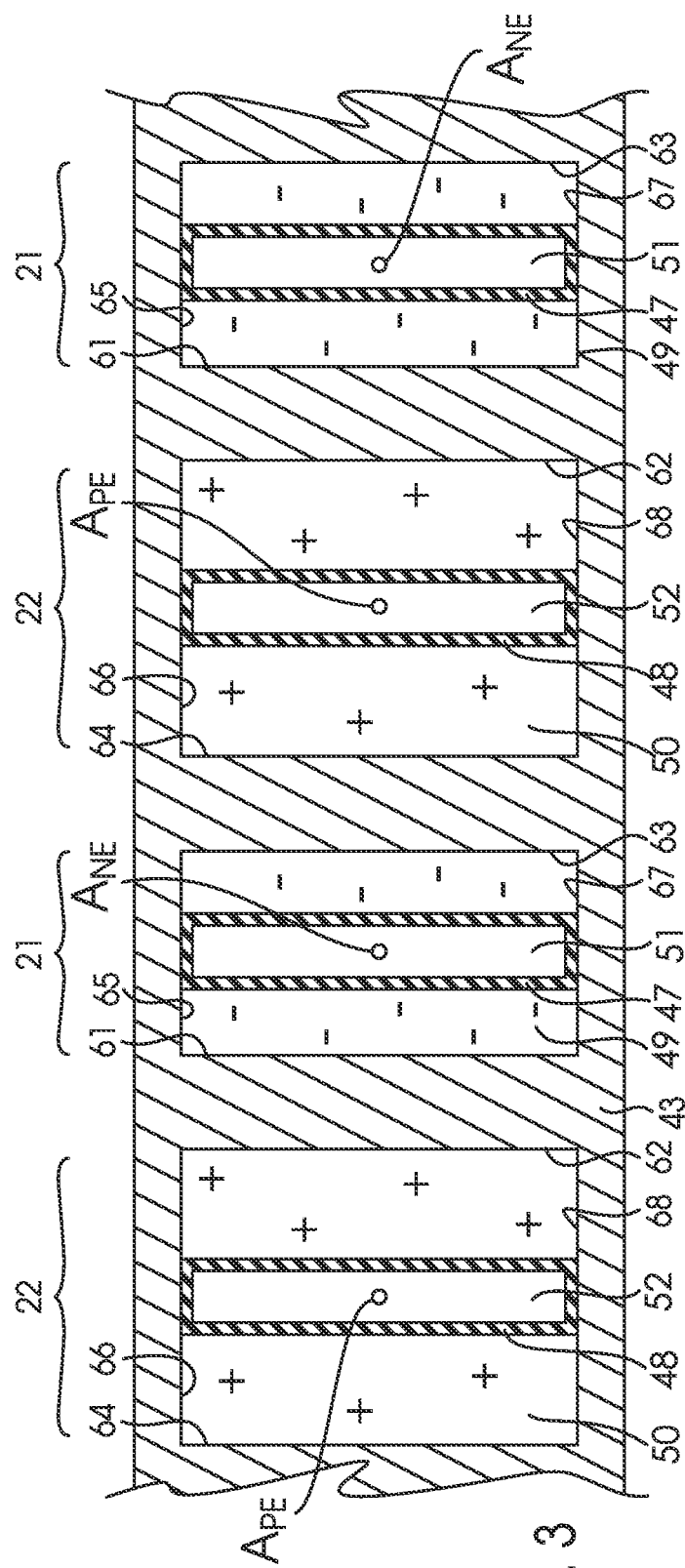
FIG. 3 is a fragmentary cross-section of the electrode structure of FIG. 2 taken in the plane containing the line 3-3.

Referring now to FIG. 3, in one embodiment each member 21 of the population of negative electrodes comprises negative electrode backbone 51, negative electrode current collector layer 47, and negative electrode active material layer 49. Negative electrode active material layer 49 is bounded by lateral surfaces 61, 63, front surface 65 and back surface 67. Similarly, each member 22 of the population of positive electrodes comprises positive electrode backbone 52, positive electrode current collector layer 48, and positive electrode active material layer 50. Positive electrode active material layer 50 is bounded by lateral surfaces 61, 63, front surface 65 and back surface 67. Each member 21 of the population of negative electrodes is separated from each member 22 of the population of positive electrodes by electrically insulating separator layer 43 which surrounds longitudinal axis $A_{NE}$ of each member 21 and longitudinal axis $A_{PE}$ each member 22 of the populations of negative and positive electrodes along at least a portion of their respective lengths.

Between opposing lateral surfaces 61, 62 and opposing lateral surfaces 63, 64 of members 21, 22, respectively, electrically insulating material layer 43 comprises microporous separator material (as previously described). In one embodiment, for example, and ignoring the porosity of the microporous separator material, at least 70 vol % of electrically insulating separator material layer 43 between opposing lateral surfaces 61, 62 and opposing lateral surfaces 63, 64 of members 21, 22, respectively, comprises microporous separator material (as previously described). By way of further example, in one embodiment and ignoring the porosity of the microporous separator material, microporous separator material constitutes at least 75 vol % of the electrically insulating separator material layer between opposing lateral surfaces 61, 62 and opposing lateral surfaces 63, 64 of members 21, 22, respectively, comprises microporous separator material (as previously described). By way of further example, in one embodiment and ignoring the porosity of the microporous separator material, the microporous separator material constitutes at least 80 vol % of the electrically insulating separator material layer between opposing lateral surfaces 61, 62 and opposing lateral surfaces 63, 64 of members 21, 22, respectively, comprises microporous separator material (as previously described). By way of further example, in one embodiment and ignoring the porosity of the microporous separator material, the microporous separator material constitutes at least 85 vol % of the electrically insulating separator material layer between opposing lateral surfaces 61, 62 and opposing lateral surfaces 63, 64 of members 21, 22, respectively, comprises microporous separator material (as previously described). By way of further example, in one embodiment and ignoring the porosity of the microporous separator material, the microporous separator material constitutes at least 90 vol % of the electrically insulating separator material layer between opposing lateral surfaces 61, 62 and opposing lateral surfaces 63, 64 of members 21, 22, respectively, comprises microporous separator material (as previously described). By way of further example, in one embodiment and ignoring the porosity of the microporous separator material, the microporous separator material constitutes at least 95 vol % of the electrically insulating separator material layer between opposing lateral surfaces 61, 62 and opposing lateral surfaces 63, 64 of members 21, 22, respectively, comprises microporous separator material (as previously described). By way of further example, in one embodiment and ignoring the porosity of the microporous separator material, the microporous separator material constitutes at least 99 vol % of the electrically insulating separator material layer between opposing lateral surfaces 61, 62 and opposing lateral surfaces 63, 64 of members 21, 22, respectively, comprises microporous separator material (as previously described).

During a discharge process, lithium ions (or other carrier ions such as sodium, potassium, calcium or magnesium ions) leave the negative electrode active material layer 49 via lateral surfaces 61, 63 and travel through the microporous separator material comprised by electrically insulating separator layer 43 and into positive electrode active material layer 50 via lateral surfaces 62, 64. During a charging process, lithium ions (or other carrier ions) leave positive electrode active material layer 50 through lateral surfaces 62, 64 and travel through the microporous separator material comprised by electrically insulating separator layer 43 and into negative electrode active material layer 49 via lateral surfaces 61, 63. Depending on the negative electrode active material used, the lithium ions (or other carrier ions) either intercalate (e.g., sit in a matrix of negative electrode active material without forming an alloy) or form an alloy. Coincident with the movement of lithium ions (or other carrier ions) between the positive and negative electrodes, electrons are carried by negative electrode current collector 47 and positive electrode current collector 48 to (or from) negative and positive electrode buses 23, 24, respectively (see FIG. 2). Negative and positive electrode buses 23, 24, in turn, are electrically connected to the negative and positive terminals of an energy storage device (not shown) comprising electrode structure 20 or to an external energy supply (not shown) or an external energy consumer (not shown).

Negative electrode backbone 51 provides mechanical stability for negative electrode active material layer 49. In general, negative electrode backbone 51 may comprise any material that may be shaped, such as metals, semiconductors, organics, ceramics, and glasses. Presently preferred materials include semiconductor materials such as silicon and germanium. Alternatively, however, carbon-based organic materials or metals, such as aluminum, copper, nickel, cobalt, titanium, and tungsten, may also be incorporated into negative electrode backbones. In one exemplary embodiment, negative electrode backbone 51 comprises silicon. The silicon, for example, may be single crystal silicon, polycrystalline silicon, amorphous silicon or a combination thereof.

Depending upon the application, negative electrode backbone 51 may be electrically conductive or insulating. For example, in one embodiment negative electrode backbone 51 has an electrical conductivity of less than 10 Siemens/cm. By way of further example, in one embodiment negative electrode backbone 51 has an electrical conductivity of less than 1 Siemens/cm. By way of further example, in one embodiment negative electrode backbone 51 has an electrical conductivity of less than $10^{-1}$ Siemens/cm. In other embodiments, negative electrode backbone 51 may have an electrical conductivity of at least 10 Siemens/cm. By way of further example, in some embodiments negative electrode backbone 51 may have an electrical conductivity of at least $10^2$ Siemens/cm. By way of further example, in some embodiments negative electrode backbone 51 may have an electrical conductivity of at least $10^3$ Siemens/cm.

Negative electrode current collector layer 47 will typically have a conductivity of at least about $10^3$ Siemens/cm. For example, in one such embodiment, negative electrode current collector layer 47 has a conductivity of at least about $10^4$ Siemens/cm. By way of further example, in one such embodiment negative electrode current collector layer 47 has a conductivity of at least about $10^5$ Siemens/cm. In general, negative electrode current collector layer 47 may comprise any metal or other conductor conventionally used as a current collector material for negative electrodes such as carbon, cobalt, chromium, copper, nickel, titanium, or an alloy of one or more thereof. Negative electrode current collector 47 and may be fabricated by processes such as electrodeposition, electroless deposition, immersion deposition, physical vapor deposition, chemical vapor deposition, and the like.

The thickness of negative electrode current collector layer 47 (i.e., the shortest distance between the negative electrode backbone and the negative electrode active material layer) in this embodiment will depend upon the composition of the layer and the performance specifications for the electrochemical stack. In general, however, the thickness will range from about 1 micrometer to about 100 micrometers.

Negative electrode active material layer 49 may comprise a negative electrode active material capable of absorbing and releasing a carrier ion such as lithium, sodium, potassium, calcium or magnesium ions. Such materials include carbon materials such as graphite and soft or hard carbons, or any of a range of metals, semi-metals, alloys, oxides and compounds capable of forming an alloy with lithium. Specific examples of the metals or semi-metals capable of constituting the anode material include tin, lead, magnesium, aluminum, boron, gallium, silicon, indium, zirconium, germanium, bismuth, cadmium, antimony, silver, zinc, arsenic, hafnium, yttrium, and palladium. In one exemplary embodiment, negative electrode active material layer 49 comprises aluminum, tin, or silicon, or an oxide thereof, a nitride thereof, a fluoride thereof, or other alloy thereof. In another exemplary embodiment, negative electrode active material layer 49 comprises silicon or an alloy thereof. In each of the embodiments and examples recited in this paragraph, negative electrode active material layer 49 may be a particulate agglomerate electrode or a monolithic electrode.

Positive electrode backbone 52 provides mechanical stability for positive electrode active material layer 50. In general, positive electrode backbone 52 may comprise any material that may be shaped, such as metals, semiconductors, organics, ceramics, and glasses. Presently preferred materials include semiconductor materials such as silicon and germanium. Alternatively, however, carbon-based organic materials or metals, such as aluminum, copper, nickel, cobalt, titanium, and tungsten, may also be incorporated into positive electrode backbones. In one exemplary embodiment, positive electrode backbone 52 comprises silicon. The silicon, for example, may be single crystal silicon, polycrystalline silicon, amorphous silicon or a combination thereof.

Depending upon the application, positive electrode backbone 52 may be electrically conductive or insulating. For example, in one embodiment, positive electrode backbone 52 has an electrical conductivity of less than 10 Siemens/cm. By way of further example, in one embodiment positive electrode backbone 52 has an electrical conductivity of less than 1 Siemens/cm. By way of further example, in one embodiment positive electrode backbone 52 has an electrical conductivity of less than $10^{-1}$ Siemens/cm. In other embodiments, positive electrode backbone 52 may have an electrical conductivity of at least 10 Siemens/cm. By way of further example, in some embodiments positive electrode backbone 52 may have an electrical conductivity of at least $10^2$ Siemens/cm. By way of further example, in some embodiments positive electrode backbone 52 may have an electrical conductivity of at least $10^3$ Siemens/cm.

In the embodiment illustrated in FIG. 3, positive electrode current collector layer 48 is located between positive electrode backbone 52 and positive electrode material layer 50 and will typically have a conductivity of at least about $10^3$ Siemens/cm. For example, in one such embodiment, positive electrode current collector layer 48 has a conductivity of at least about $10^4$ Siemens/cm. By way of further example, in one such embodiment positive electrode current collector layer 48 has a conductivity of at least about $10^5$ Siemens/cm. Positive electrode current collector 48 may comprise any of the metals previously identified for the negative electrode current collector; for example, in one embodiment, positive electrode current collector 48 comprises aluminum, carbon, chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, positive electrode current collector 48 comprises gold or an alloy thereof such as gold silicide. By way of further example, in one embodiment, positive electrode current collector 48 comprises nickel or an alloy thereof such as nickel silicide. Positive electrode current collector 48 may be fabricated by processes such as electrodeposition, electroless deposition, immersion deposition, physical vapor deposition, chemical vapor deposition, and the like. The positive electrode and negative electrode current collectors may be simultaneously deposited, or sequentially fabricated using known patterning and metal deposition techniques.

Positive electrode active material layer 50 may comprise any of a range of cathode active materials, including mixtures of cathode active materials. For example, for a lithium-ion battery, positive electrode active material layer 50 may comprise a cathode material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, and combinations thereof. The positive electrode active material layer may be deposited to form the positive electrode structure by any of a range of techniques including, for example, electrophoretic deposition, electrodeposition, co-deposition or slurry deposition. In one exemplary embodiment, one of the aforementioned positive electrode active materials, or a combination thereof, in particulate form is electrophoretically deposited. In another exemplary embodiment, a positive electrode active material such as $V_2O_5$ is electrodeposited. In another exemplary embodiment, one of the aforementioned positive electrode active materials, or a combination thereof, in particulate form is co-deposited in a conductive matrix such as polyaniline. In another exemplary embodiment, one of the aforementioned positive electrode active materials, or a combination thereof, in particulate form is slurry deposited.

Negative electrode backbone 51 and the positive electrode backbone 52 may be fabricated in any method known in the art for fabricating three-dimensional structures. For example, a silicon backbone for the positive electrode (cathode) and a silicon backbone for the negative electrode (anode) may be manufactured simultaneously by using a wafer that is bonded to a base by a temporary, permanent, or semi-permanent bond. Non-exhaustive methods of bonding a base to a wafer include, gluing using inorganic or organic gluing agents, anodic oxidation bonding, compression bonding, thermal bonding, and the like. Silicon-on-insulator wafers, anodic glass bonded wafers, temporary carrier mounted wafers, are examples of a base bonded on to the active substrate. Subsequently, the wafer can be patterned and the silicon can be removed in unwanted areas to leave behind structures that can act as the backbone for the electrodes. In some embodiments, the backbones may be manufactured in a negative fashion by removing materials from a planar substrate in unwanted areas by laser machining, electrical discharge machining, high precision machining, ablation, and drilling. In other embodiments, each backbone can individually or separately be created in a positive fashion by building up layers using methods like 3D printing, stencil printing and layering, gravure printing, injection molding, pressure molding and sintering, gel-casting and sintering, slurry-casting, tape-casting etc, with or without sintering, microforming, electroforming, etc. Other exemplary processes that may be used to make the backbones include growing pillars, rods, waves etc, using vacuum based deposition processes such as sputtering through a mask, evaporation, etc. Still further exemplary methods for manufacturing include the use of nanowire or nanostructure growth on a patterned base material.

Negative electrode active material layer 49 may be formed or otherwise assembled using methods such as electrodeposition, electrophoretic deposition, vapor deposition, catalyst based growth such as Vapor-Liquid-Solid deposition, gel-casting, tape casting, patterning and slurry deposition followed by densification by methods such as sintering, binding etc. In some embodiments, the negative electrode material layer and the negative backbone may comprise the same material, such as silicon, aluminum, and tin, and the negative electrode material layer and the negative electrode backbone may be fabricated simultaneously. Similarly, positive electrode material layer 50 may be assembled using methods such as electrodeposition, electrophoretic deposition, vapor deposition, catalyst based growth such as Vapor-Liquid-Solid deposition, gel casting, tape casting, patterning and slurry deposition followed by densification by methods such as pressing, sintering, binding, curing, etc.

In one embodiment, negative electrode active material layer 49 is microstructured to provide a significant void volume fraction to accommodate volume expansion and contraction as lithium ions (or other carrier ions) are incorporated into or leave the negative electrode active material layer 49 during charging and discharging processes. In general, the void volume fraction of the negative electrode active material layer is at least 0.1. Typically, however, the void volume fraction of the negative electrode active material layer is not greater than 0.8. For example, in one embodiment, the void volume fraction of the negative electrode active material layer is about 0.15 to about 0.75. By way of the further example, in one embodiment, the void volume fraction of the negative electrode active material layer is about 0.2 to about 0.7. By way of the further example, in one embodiment, the void volume fraction of the negative electrode active material layer is about 0.25 to about 0.6.

Depending upon the composition of the microstructured negative electrode active material layer and the method of its formation, the microstructured negative electrode active material layer may comprise macroporous, microporous or mesoporous material layers or a combination thereof such as a combination of microporous and mesoporous or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched or dendritic, and smooth or rough-walled. Additionally, the void volume may comprise open or closed voids, or a combination thereof. In one embodiment, the void volume comprises open voids, that is, the negative electrode active material layer contains voids having openings at the lateral surface of the negative electrode active material layer (that is, the surface facing the separator and the positive electrode active material layer) through which lithium ions (or other carrier ions) can enter or leave the negative electrode active material layer; for example, lithium ions may enter the negative electrode active material layer through the void openings after leaving the positive electrode active material layer. In another embodiment, the void volume comprises closed voids, that is, the negative electrode active material layer contains voids that are enclosed by negative electrode active material. In general, open voids can provide greater interfacial surface area for the carrier ions whereas closed voids tend to be less susceptible to solid electrolyte interface ("SEI") while each provides room for expansion of the negative electrode active material layer upon the entry of carrier ions. In certain embodiments, therefore, it is preferred that the negative electrode active material layer comprise a combination of open and closed voids.

In one embodiment, negative electrode active material layer 49 comprises porous aluminum, tin or silicon or an alloy thereof. Porous silicon layers may be formed, for example, by anodization, by etching (e.g., by depositing precious metals such as gold, platinum, silver or gold/palladium on the (100) surface of single crystal silicon and etching the surface with a mixture of hydrofluoric acid and hydrogen peroxide), or by other methods known in the art such as patterned chemical etching. Additionally, the porous negative electrode active material layer will generally have a porosity fraction of at least about 0.1 but less than 0.8 and have a thickness of about 1 to about 100 micrometers. For example, in one embodiment negative electrode active material layer 49 comprises porous silicon, has a thickness of about 5 to about 100 micrometers, and has a porosity fraction of about 0.15 to about 0.75. By way of further example, in one embodiment, negative electrode active material layer 49 comprises porous silicon, has a thickness of about 10 to about 80 micrometers, and has a porosity fraction of about 0.15 to about 0.7. By way of further example, in one such embodiment negative electrode active material layer 49 comprises porous silicon, has a thickness of about 20 to about 50 micrometers, and has a porosity fraction of about 0.25 to about 0.6. By way of further example, in one embodiment negative electrode active material layer 49 comprises a porous silicon alloy (such as nickel silicide), has a thickness of about 5 to about 100 micrometers, and has a porosity fraction of about 0.15 to about 0.75.

In another embodiment, negative electrode active material layer 49 comprises fibers of aluminum, tin or silicon, or an alloy thereof. Individual fibers may have a diameter (thickness dimension) of about 5 nm to about 10,000 nm and a length generally corresponding to the thickness of the negative electrode active material layer 49. Fibers (nanowires) of silicon may be formed, for example, by chemical vapor deposition or other techniques known in the art such as vapor liquid solid (VLS) growth and solid liquid solid (SLS) growth. Additionally, the negative electrode active material layer 49 will generally have a porosity fraction of at least about 0.1 but less than 0.8 and have a thickness of about 1 to about 200 micrometers. For example, in one embodiment negative electrode active material layer 49 comprises silicon nanowires, has a thickness of about 5 to about 100 micrometers, and has a porosity fraction of about 0.15 to about 0.75. By way of further example, in one embodiment, negative electrode active material layer 49 comprises silicon nanowires, has a thickness of about 10 to about 80 micrometers, and has a porosity fraction of about 0.15 to about 0.7. By way of further example, in one such embodiment negative electrode active material layer 49 comprises silicon nanowires, has a thickness of about 20 to about 50 micrometers, and has a porosity fraction of about 0.25 to about 0.6. By way of further example, in one embodiment negative electrode active material layer 49 comprises nanowires of a silicon alloy (such as nickel silicide), has a thickness of about 5 to about 100 micrometers, and has a porosity fraction of about 0.15 to about 0.75.

Although there may be significant fiber-to-fiber variation, nanowires of aluminum, tin or silicon (or an alloy thereof) have major axes (sometimes referred to as a central axis) which are predominantly perpendicular to the negative electrode backbone 51 (at the point of attachment of the nanowire to the negative electrode active material layer).

In another embodiment, negative electrode active material layer 49 comprises nanowires of silicon or an alloy thereof and porous silicon or an alloy thereof. In such embodiments, the negative electrode active material layer will generally have a porosity fraction of at least about 0.1 but less than 0.8 and have a thickness of about 1 to about 100 micrometers as previously described in connection with porous silicon and silicon nanowires.

Figure 4:
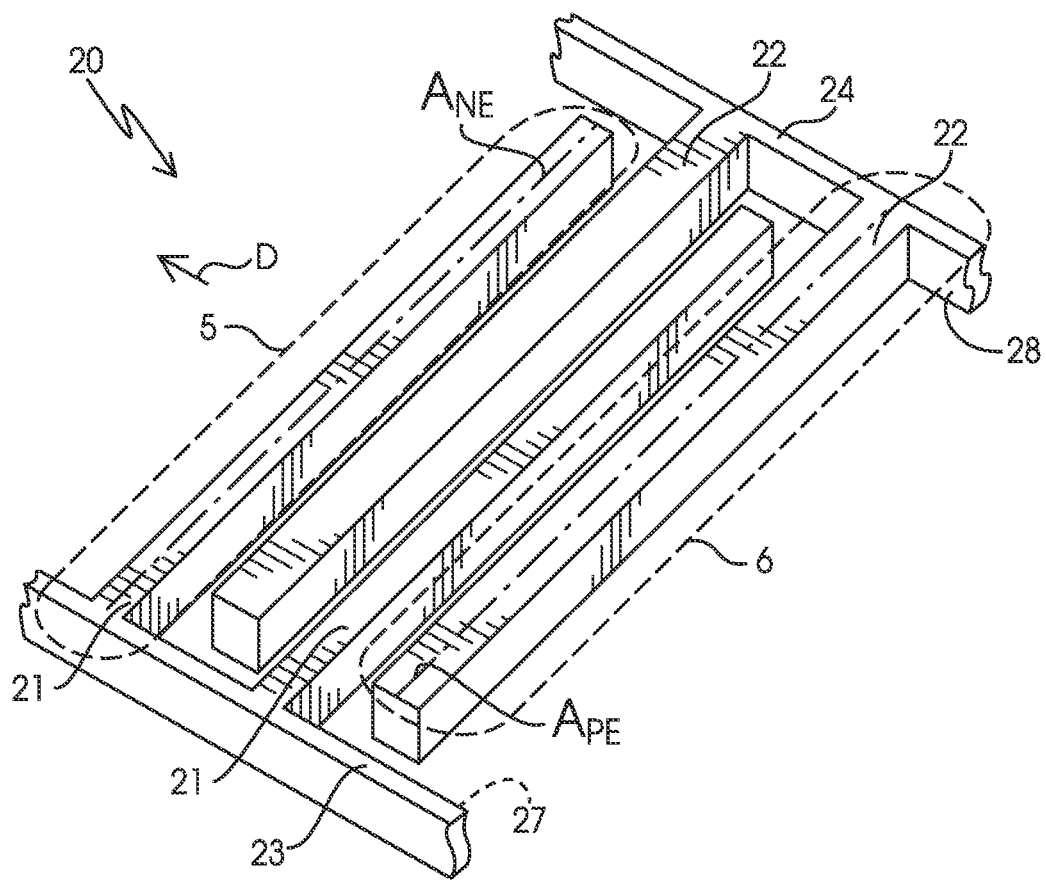
FIG. 4 is a fragmentary perspective view of a subassembly of the electrode structure of FIG. 2.

Referring now to FIG. 4, each member 21 of the population of negative electrodes extends from inner surface 27 of negative electrode bus 23 and each member 22 of the population of positive electrodes extends from inner surface 28 of positive electrode bus 24 with inner surfaces 27, 28 facing or opposing each other. Negative electrode bus 23 comprises an electrically conductive material electrically connecting each member 21 of the negative electrode population to other members of the negative electrode population. Similarly, positive electrode bus 24 comprises an electrically conductive material electrically connecting each member 22 of the positive electrode population to each other. For ease of illustration, electrically insulating separator material layer 43 (see FIGS. 2 and 3) has been omitted.

Figure 5:
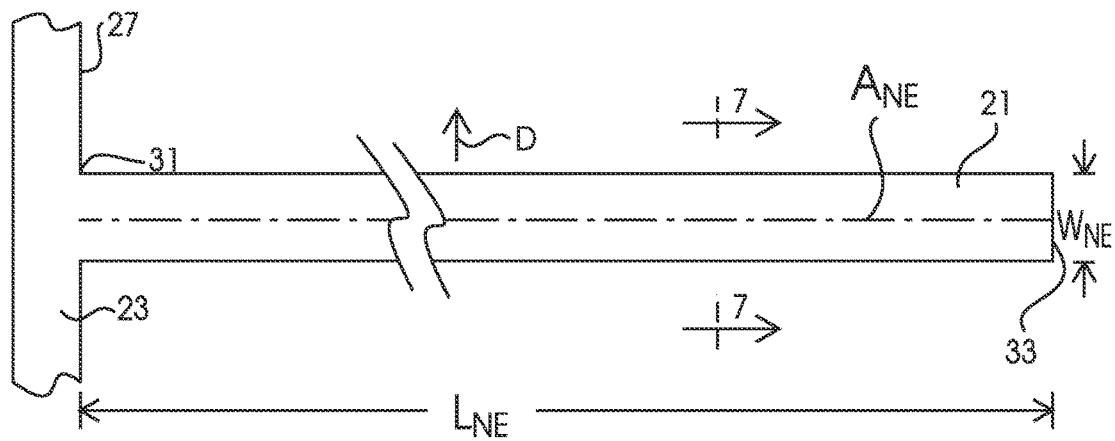
FIG. 5 is a top plan view of a subassembly of the electrode structure of FIG. 4 taken along line 5.

Referring now to FIG. 5, each member 21 of the population of negative electrodes has bottom 31 proximate inner surface 27 of negative electrode bus 23, top 33 distal to inner surface 27, width $W_{NE}$, length $L_{NE}$ and longitudinal axis $A_{NE}$. Length $L_{NE}$ corresponds to the distance between bottom 31 and top 33 and is measured in a direction from inner surface 27 along longitudinal axis $A_{NE}$ that is substantially perpendicular to direction D. In the context of the X-Y-Z coordinate system depicted in FIG. 2, length $L_{NE}$ is measured along the "X" axis (and perpendicular to direction D).

Figure 7:
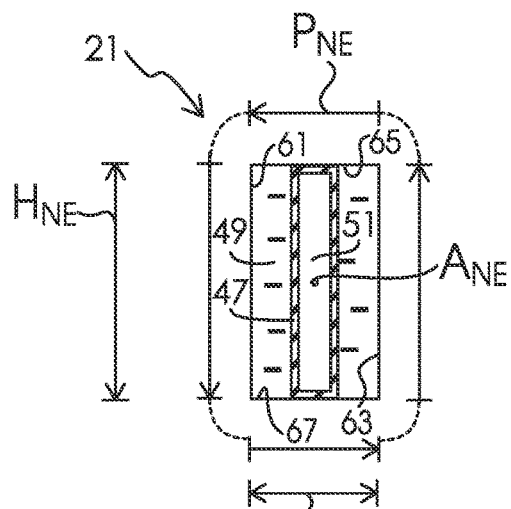
FIG. 7 is a cross-section of a subassembly of the electrode structure taken in the plane containing line 7-7 of FIG. 5.

Referring now to FIG. 7, each member 21 of the population of negative electrodes has width $W_{NE}$, height $H_{NE}$ and perimeter $P_{NE}$ wherein width $W_{NE}$ and height $H_{NE}$ are measured in directions that are perpendicular to each other and to the direction in which length $L_{NE}$ is measured. In this embodiment, perimeter $P_{NE}$ has a value that is equal to $2W_{NE}+2H_{NE}$. Width $W_{NE}$ and height $H_{NE}$ will vary depending upon the energy storage device and its intended use, but in many embodiments the value of $W_{NE}$ will be within the range of about 0.01 mm to 2.5 mm and the value of $H_{NE}$ will be within the range of about 0.05 mm to 10 mm. For example, in one embodiment $W_{NE}$ will be in the range of about 0.025 mm to about 2 mm. By way of further example, in one embodiment $W_{NE}$ will be in the range of about 0.05 mm to about 1 mm. By way of further example, in one embodiment $H_{NE}$ will be in the range of about 0.05 mm to about 5 mm. By way of further example, in one embodiment $H_{NE}$ will be in the range of about 0.05 mm to about 1 mm. In general, $L_{NE}$ (see FIG. 5) will be substantially greater than each of $W_{NE}$ and $H_{NE}$; for example, in one embodiment, the ratio of $L_{NE}$ to each of $W_{NE}$ and $H_{NE}$ is at least 5:1, respectively (that is, the ratio of $L_{NE}$ to $W_{NE}$ is at least 5:1, respectively and the ratio of $L_{NE}$ to $H_{NE}$ is at least 5:1, respectively). By way of further example, in one embodiment the ratio of $L_{NE}$ to each of $W_{NE}$ and $H_{NE}$ is at least 10:1. By way of further example, in one embodiment, the ratio of $L_{NE}$ to each of $W_{NE}$ and $H_{NE}$ is at least 15:1. By way of further example, in one embodiment, the ratio of $L_{NE}$ to each of $W_{NE}$ and $H_{NE}$ is at least 20:1. Additionally, it is generally preferred that $L_{NE}$ be substantially greater than the perimeter $P_{NE}$; for example, in one embodiment, the ratio of $L_{NE}$ to $P_{NE}$ is at least 1.25:1, respectively. By way of further example, in one embodiment the ratio of $L_{NE}$ to $P_{NE}$ is at least 2.5:1, respectively. By way of further example, in one embodiment, the ratio of $L_{NE}$ to $P_{NE}$ is at least 3.75:1, respectively. Additionally, the ratio of $H_{NE}$ to $W_{NE}$ will generally be at least 0.4:1, respectively. For example, in one embodiment, the ratio of $H_{NE}$ to $W_{NE}$ will be at least 2:1, respectively. By way of further example, in one embodiment the ratio of $H_{NE}$ to $W_{NE}$ will be at least 10:1, respectively. By way of further example, in one embodiment the ratio of $H_{NE}$ to $W_{NE}$ will be at least 20:1, respectively. Typically, however, the ratio of $H_{NE}$ to $W_{NE}$ will generally be less than 1,000:1, respectively. For example, in one embodiment the ratio of $H_{NE}$ to $W_{NE}$ will be less than 500:1, respectively. By way of further example, in one embodiment the ratio of $H_{NE}$ to $W_{NE}$ will be less than 100:1, respectively. By way of further example, in one embodiment the ratio of $H_{NE}$ to $W_{NE}$ will be less than 10:1, respectively. By way of further example, in one embodiment the ratio of $H_{NE}$ to $W_{NE}$ will be in the range of about 2:1 to about 100:1, respectively. In the context of the X-Y-Z coordinate system depicted in FIG. 2, length $L_{NE}$ is measured along the "X" axis (and perpendicular to direction D), $W_{NE}$ is measured along the "Y" axis, and $H_{NE}$ is measured along the "Z" axis.

Typically, negative electrode backbone 51 will have a thickness of at least 1 micrometer when measured in the same direction as width $W_{NE}$ of the negative electrode (see FIG. 7). Negative electrode backbone 51 may be substantially thicker, but typically will not have a thickness in excess of 100 micrometers; greater thickness are feasible but may negatively impact energy density. For example, in one embodiment, negative electrode backbone 51 will have a thickness of about 1 to about 50 micrometers. In general, negative electrode backbone 51 will have height $H_{NB}$ (when measured in the same direction as height $FI_{NE}$ of the negative electrode) of at least about 50 micrometers, more typically at least about 100 micrometers. In general, however, negative electrode backbone 51 will typically have a height of no more than about 10,000 micrometers, and more typically no more than about 5,000 micrometers. By way of example, in one embodiment, negative electrode backbone 51 will have a thickness of about 5 to about 50 micrometers and a height of about 50 to about 5,000 micrometers. By way of further example, in one embodiment, negative electrode backbone 51 will have a thickness of about 5 to about 20 micrometers and a height of about 100 to about 1,000 micrometers. By way of further example, in one embodiment, negative electrode backbone 51 will have a thickness of about 5 to about 20 micrometers and a height of about 100 to about 2,000 micrometers.

Negative electrode active material layer 49 will have a thickness (e.g., the shortest distance between current collector layer 47 and electrically insulating separator layer 43 as illustrated in FIG. 3 and when measured in the same direction as width $W_{NE}$ of the negative electrode) of at least 1 micrometer. In general, however, negative electrode active material layer 49 will typically have a thickness that does not exceed 200 micrometers. For example, in one embodiment, negative electrode active material layer 49 will have a thickness of about 1 to about 100 micrometers. By way of further example, in one embodiment, negative electrode active material layer 49 will have a thickness of about 2 to about 75 micrometers. By way of further example, in one embodiment, negative electrode active material layer 49 will have a thickness of about 10 to about 100 micrometers. By way of further example, in one embodiment, negative electrode active material layer 49 will have a thickness of about 5 to about 50 micrometers. Additionally, the layer of negative electrode active material 49 on each of the lateral surfaces of negative electrode backbone 51 will have a height (when measured in a direction corresponding to the height $H_{NE}$ of the negative electrode as illustrated in FIG. 5) of at least about 50 micrometers, more typically at least about 100 micrometers. In general, however, negative electrode active material layer 49 will typically have a height of no more than about 10,000 micrometers, and more typically no more than about 7,500 micrometers. By way of example, in one embodiment, negative electrode active material layer 49 will have a thickness of about 1 to about 200 micrometers and a height of about 50 to about 7,500 micrometers. By way of further example, in one embodiment, negative electrode active material layer 49 will have a thickness of about 1 to about 50 micrometers and a height of about 100 to about 1,000 micrometers. By way of further example, in one embodiment, negative electrode active material layer 49 will have a thickness of about 5 to about 20 micrometers and a height of about 100 to about 1,000 micrometers. By way of further example, in one embodiment, negative electrode active material layer 49 will have a thickness of about 10 to about 100 micrometers and a height of about 100 to about 1,000 micrometers. By way of further example, in one embodiment, negative electrode active material layer 49 will have a thickness of about 5 to about 50 micrometers and a height of about 100 to about 1,000 micrometers.

Figure 6:
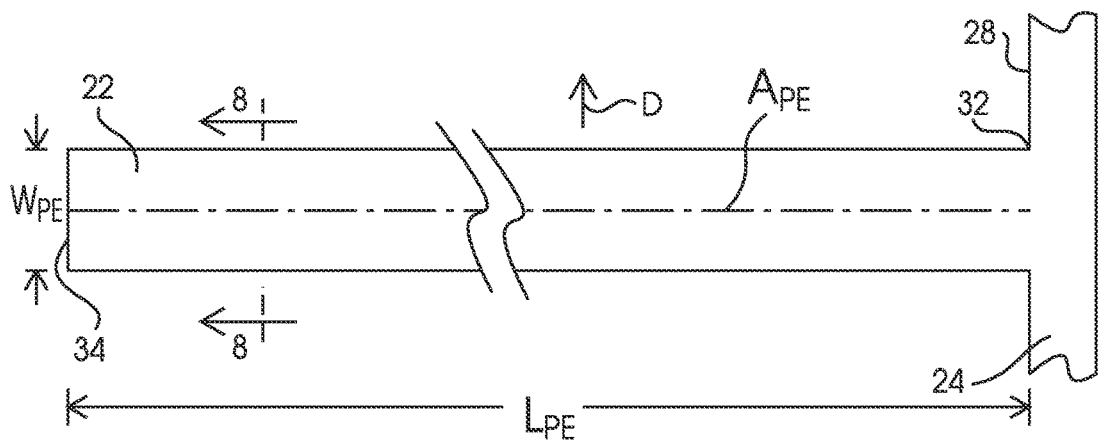
FIG. 6 is a top plan view of a subassembly of the electrode structure of FIG. 4 taken along line 6.

Referring now to FIG. 6, each member 22 of the population of positive electrodes has bottom 32 proximate inner surface 28 of positive electrode bus 24, top 34 distal to positive electrode substrate surface 26, width $W_{PE}$, length $L_{PE}$ and longitudinal axis $A_{PE}$. Length $L_{PE}$ corresponds to the distance between bottom 32 and top 34 and is measured in a direction along longitudinal axis $A_{PE}$ from inner surface 28 that is substantially perpendicular to direction D. In the context of the X-Y-Z coordinate system depicted in FIG. 2, length $L_{PE}$ is measured along the "X" axis (and perpendicular to direction D).

Figure 8:
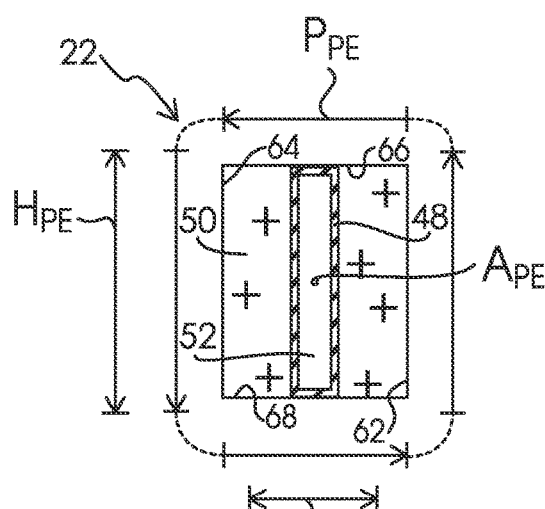
FIG. 8 is a cross-section of a subassembly of the electrode structure taken in the plane containing line 8-8 of FIG. 6.

Referring now to FIG. 8, each member 22 of the population of positive electrodes has width $W_{PE}$, height $H_{PE}$ and perimeter $P_{PE}$ wherein width $W_{PE}$ and height $H_{PE}$ are measured in directions that are perpendicular to each other and to the direction in which length $L_{PE}$ is measured. In this embodiment, perimeter $P_{PE}$ has a value that is equal to $2W_{PE}+2H_{PE}$. Width $W_{PE}$ and height $H_{PE}$ will vary depending upon the energy storage device and its intended use, but in many embodiments $W_{PE}$ will be within the range of about 0.01 mm to 2.5 mm and the value of $H_{PE}$ will be within the range of about 0.05 mm to 10 mm. For example, in one embodiment $W_{PE}$ will be in the range of about 0.025 mm to about 2 mm. By way of further example, in one embodiment $W_{PE}$ will be in the range of about 0.05 mm to about 1 mm. By way of further example, in one embodiment $H_{PE}$ will be in the range of about 0.05 mm to about 5 mm. By way of further example, in one embodiment $H_{PE}$ will be in the range of about 0.05 mm to about 1 mm. In general, $L_{PE}$ (see FIG. 6) will be substantially greater than each of $W_{PE}$ and $H_{PE}$; for example, in one embodiment, the ratio of $L_{PE}$ to each of $W_{PE}$ and $H_{PE}$ is at least 5:1, respectively (that is, the ratio of $L_{PE}$ to $W_{PE}$ is at least 5:1, respectively and the ratio of $L_{PE}$ to $H_{PE}$ is at least 5:1, respectively). By way of further example, in one embodiment the ratio of $L_{PE}$ to each of $W_{PE}$ and $H_{PE}$ is at least 10:1. By way of further example, in one embodiment, the ratio of $L_{PE}$ to each of $W_{PE}$ and $H_{PE}$ is at least 15:1. By way of further example, in one embodiment, the ratio of $L_{PE}$ to each of $W_{PE}$ and $H_{PE}$ is at least 20:1. Additionally, it is generally preferred that $L_{PE}$ be substantially greater than the perimeter $P_{PE}$; for example, in one embodiment, the ratio of $L_{PE}$ to $P_{PE}$ is at least 1.25:1, respectively. By way of further example, in one embodiment the ratio of $L_{PE}$ to $P_{PE}$ is at least 2.5:1, respectively. By way of further example, in one embodiment, the ratio of $L_{PE}$ to $P_{PE}$ is at least 3.75:1, respectively. Additionally, the ratio of $H_{PE}$ to $W_{PE}$ will generally be at least 0.4:1, respectively. For example, in one embodiment, the ratio of $H_{PE}$ to $W_{PE}$ will be at least 2:1, respectively. By way of further example, in one embodiment the ratio of $H_{PE}$ to $W_{PE}$ will be at least 10:1, respectively. By way of further example, in one embodiment the ratio of $H_{PE}$ to $W_{PE}$ will be at least 20:1, respectively. Typically, however, the ratio of $H_{PE}$ to $W_{PE}$ will generally be less than 1,000:1, respectively. For example, in one embodiment the ratio of $H_{PE}$ to $W_{PE}$ will be less than 500:1, respectively. By way of further example, in one embodiment the ratio of $H_{PE}$ to $W_{PE}$ will be less than 100:1, respectively. By way of further example, in one embodiment the ratio of $H_{PE}$ to $W_{PE}$ will be less than 10:1, respectively. By way of further example, in one embodiment the ratio of $H_{PE}$ to $W_{PE}$ will be in the range of about 2:1 to about 100:1, respectively. In the context of the X-Y-Z coordinate system depicted in FIG. 2, in a preferred embodiment length $L_{PE}$ is measured along the "X" axis (and perpendicular to direction D), $W_{PE}$ is measured along the "Y" axis, and $H_{PE}$ is measured along the "Z" axis.

Typically, positive electrode backbone 52 will have a thickness of at least 1 micrometer when measured in the same direction as width $W_{PE}$ of the positive electrode (see FIG. 8). Positive electrode backbone 52 may be substantially thicker, but generally will not have a thickness in excess of 100 micrometers. For example, in one embodiment, positive backbone 52 will have a thickness of about 1 to about 50 micrometers. In general, positive electrode backbone 52 will have a height $H_{PE}$ (when measured in the same direction as height $H_{NE}$ of the negative electrode) of at least about 50 micrometers, more typically at least about 100 micrometers. In general, however, positive electrode backbone 52 will typically have a height of no more than about 10,000 micrometers, and more typically no more than about 5,000 micrometers. By way of example, in one embodiment, positive electrode backbone 52 will have a thickness of about 5 to about 50 micrometers and a height of about 50 to about 5,000 micrometers. By way of further example, in one embodiment, positive electrode backbone 52 will have a thickness of about 5 to about 20 micrometers and a height of about 100 to about 1,000 micrometers. By way of further example, in one embodiment, positive electrode backbone 52 will have a thickness of about 5 to about 20 micrometers and a height of about 100 to about 2,000 micrometers.

Positive electrode active material layer 50 will have a thickness (e.g., the shortest distance between current collector layer 48 and electrically insulating separator layer 43 as illustrated in FIG. 3 and when measured in the same direction as width $W_{PE}$ of the positive electrode) of at least 1 micrometer. In general, however, positive electrode active material layer 50 will typically have a thickness that does not exceed 500 micrometers. For example, in one embodiment, positive electrode active material layer 50 will have a thickness of about 1 to about 200 micrometers. By way of further example, in one embodiment, positive electrode active material layer 50 will have a thickness of about 2 to about 100 micrometers. By way of further example, in one embodiment, positive electrode active material layer 50 will have a thickness of about 10 to about 100 micrometers. By way of further example, in one embodiment, positive electrode active material layer 50 will have a thickness of about 5 to about 50 micrometers. Additionally, the layer of positive electrode active material 50 on each of the lateral surfaces of positive electrode backbone 51 will have a height (when measured in a direction corresponding to the height $H_{PE}$ of the positive electrode as illustrated in FIG. 6) of at least about 50 micrometers, more typically at least about 100 micrometers. In general, however, positive electrode active material layer 50 will typically have a height of no more than about 10,000 micrometers, and more typically no more than about 7,500 micrometers. By way of example, in one embodiment, positive electrode active material layer 50 will have a thickness of about 1 to about 200 micrometers and a height of about 50 to about 7,500 micrometers. By way of further example, in one embodiment, positive electrode active material layer 50 will have a thickness of about 1 to about 50 micrometers and a height of about 100 to about 1,000 micrometers. By way of further example, in one embodiment, positive electrode active material layer 50 will have a thickness of about 5 to about 20 micrometers and a height of about 100 to about 1,000 micrometers. By way of further example, in one embodiment, positive electrode active material layer 50 will have a thickness of about 10 to about 100 micrometers and a height of about 100 to about 1,000 micrometers. By way of further example, in one embodiment, positive electrode active material layer 50 will have a thickness of about 5 to about 50 micrometers and a height of about 100 to about 1,000 micrometers.

Figure 9:
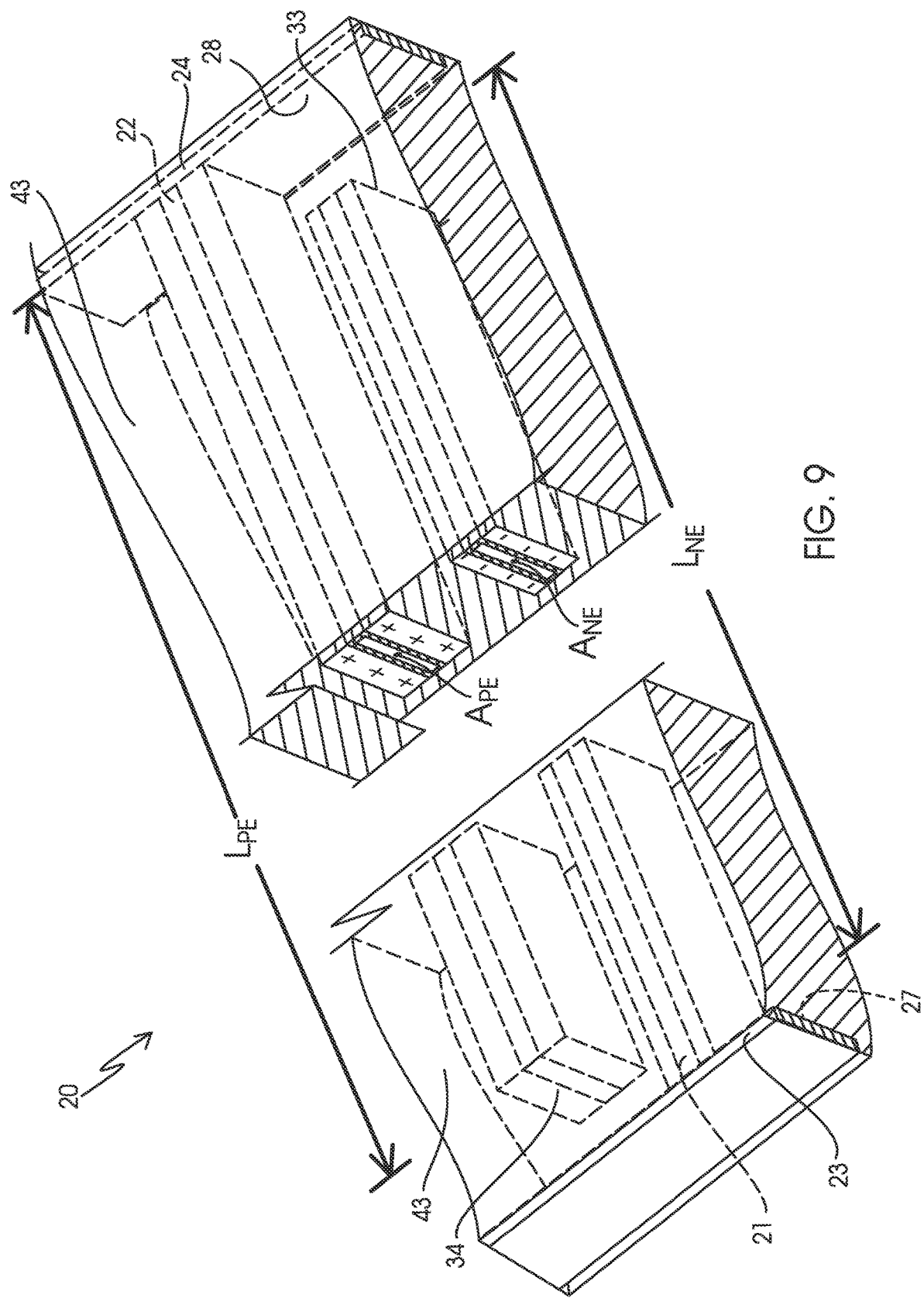
FIG. 9 is a fragmentary perspective view of a subassembly of the electrode structure of FIG. 2 with parts broken away to show internal construction.

Referring now to FIG. 9, in one embodiment, electrically insulating separator layer 43 extends from surface 28 of positive electrode bus 24 to surface 27 of negative electrode bus 23 and surrounds axes $A_{PE}$ and $A_{NE}$ of members 22 and member 21, respectively, for the entirety of lengths $L_{PE}$ and $L_{NE}$ of members 22 and 21, respectively. In one such embodiment, electrically insulating separator layer 43 comprises microporous separator material (as previously described) and the microporous separator material surrounds axes $A_{PE}$ and $A_{NE}$ of members 22 and member 21, respectively, for the entirety of lengths $L_{PE}$ and $L_{NE}$ of members 22 and 21, respectively. Electrically insulating material layer 43 also comprises microporous separator material (as previously described) in the region between top 33 of negative electrode 21 and surface 28 of positive electrode bus 24. In this embodiment, therefore, electrically insulating material layer 43 surrounds each member 21 of the population of negative electrodes and each member 22 of the population of positive electrodes; stated differently, in this embodiment, electrically insulating material layer 43 (i) surrounds longitudinal axis $A_{NE}$ of each member 21 for the full length $L_{NE}$ of each member 21 of the population of negative electrodes and top 33 of each member 21 of the population of negative electrodes and (ii) surrounds longitudinal axis $A_{PE}$ of each member 22 for the full length $L_{PE}$ of each member 22 of the population of positive electrodes and top 34 of each member 22 of the population of positive electrodes.

Figure 10:
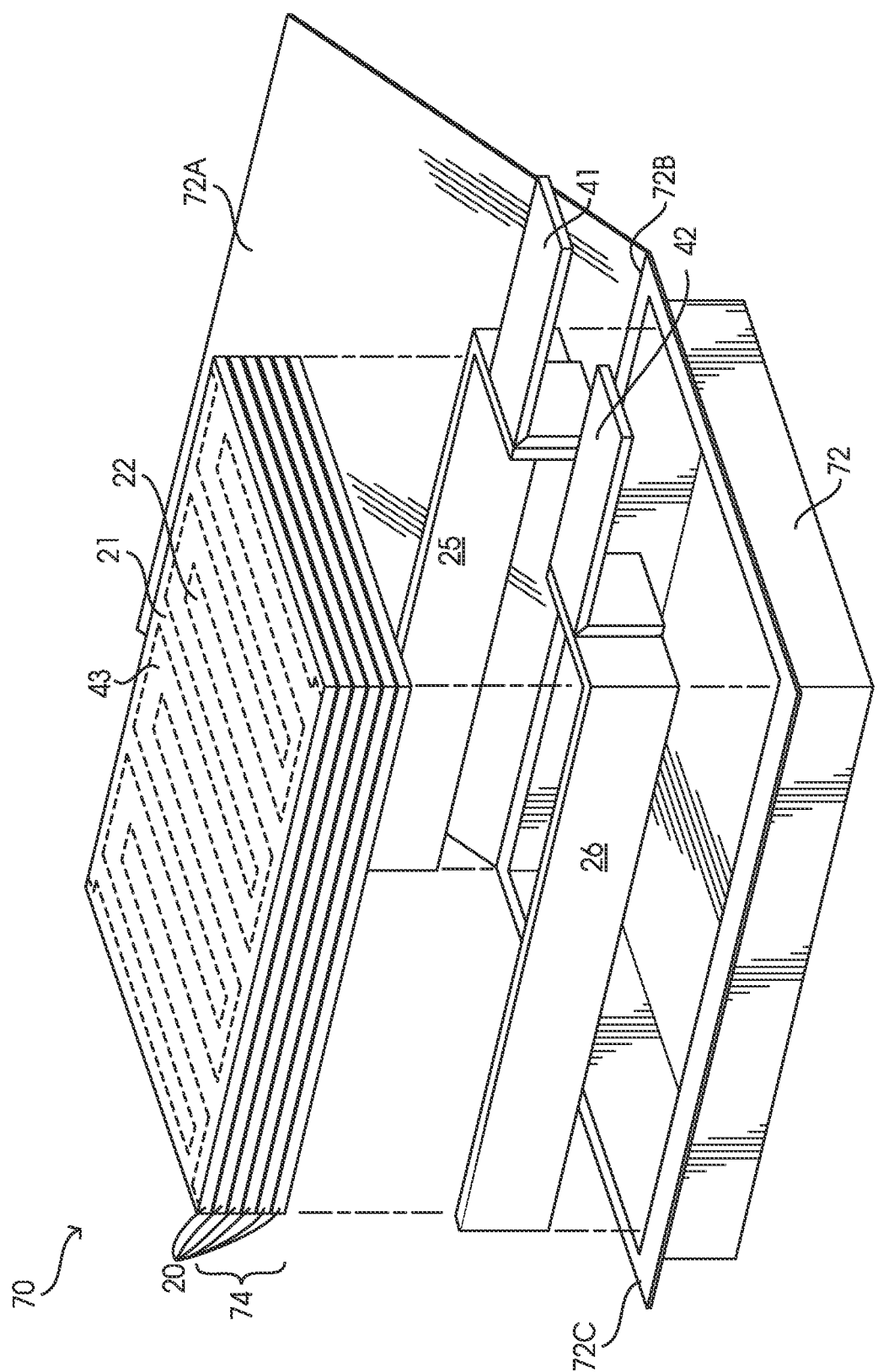
FIG. 10 is an exploded view of a three-dimensional secondary battery of the present invention.

Referring now to FIG. 10, in one embodiment three-dimensional battery 70 of the present invention comprises battery enclosure 72, electrode stack 74, negative electrode tab 41 and positive electrode tab 42 for electrically connecting electrode stack 74 to an external energy supply or consumer (not shown). Electrode stack 74 comprises six electrode structures 20 (see FIG. 2) stacked in a direction that is perpendicular to the direction of the progression of the series of interdigitated electrodes within each electrode structure 20; referring again to FIG. 2, the direction of stacking of the six electrode structures in this embodiment is in the "Z" direction relative to the X-Y-Z coordinate system illustrated in FIG. 2 and perpendicular to direction D. The number of electrode structures in an electrode stack 74 is not critical and may range, for example, from 1 to 50, with 2 to 20 electrode structures in an electrode stack being typical. After filling the battery enclosure with a non-aqueous electrolyte, battery enclosure 72 may be sealed by folding lid 72A at hinge 72B and gluing lid 72A to upper surface 72C.

In one embodiment, negative electrode tab extension 25 is electrically connected to the negative electrode bus 23 of each electrode structure 20 in stack 74 (using, for example, an electrically conductive glue) and positive electrode tab extension 26 is electrically connected to the positive electrode bus 24 of each electrode structure 20 in stack 74 (using, for example, an electrically conductive glue). As illustrated, negative electrode tab extension 25 is electrically connected to the negative electrode bus 23 and positive electrode tab extension 26 is electrically connected to the positive electrode bus 24 of each of six electrode structures 20; in other embodiments, negative and positive electrode tab extensions 25, 26 may be electrically connected to a greater or lesser number of negative and positive electrode buses within an electrode stack 74 and may range, for example, from 1 to 50, with 2 to 20 being typical. In one alternative embodiment, and independent of the number of electrode structures in a stack, stack 74 may comprise two or more negative electrode tab extensions 25 and two or more positive electrode tab extensions 26.

Negative electrode tab 41 and negative electrode tab extension 25 and positive electrode tab 42 and positive electrode tab extension 42 may comprise any of a wide range of electrically conductive materials. For example, in one embodiment, negative electrode tab 41, negative electrode tab extension 25, positive electrode tab 42 and positive electrode tab extension 42 independently comprise an electrically conductive material such as silicon, carbon, carbon composites, metal silicides, and the like. Exemplary materials for the positive electrode tab and positive electrode tab extension include the same materials as those identified for the positive electrode bus and exemplary materials for the negative electrode tab and negative electrode tab extension include the same materials as those identified for the negative electrode bus.

Negative electrode tab 41, negative electrode tab extension 25, positive electrode tab 42 and positive electrode tab extension 26 may be attached to negative electrode bus 23 and positive electrode bus 24, respectively, by a range of techniques. Methods for attachment of the tabs, tab extensions, and the buses may include gluing, soldering, bonding, sintering, press contacting, brazing, thermal spraying joining, clamping or combinations thereof. Gluing may include joining the materials with conductive materials such as conducting epoxies, conducting elastomers, mixtures of insulating organic glue filled with conducting metals, such as nickel filled epoxy, carbon filled epoxy etc. Conductive pastes may be used to join the materials together and the joining strength could be tailored by temperature (sintering), light (UV curing, cross-linking), chemical curing (catalyst based cross linking). Bonding processes may include wire bonding, ribbon bonding, ultrasonic bonding. Welding processes may include ultrasonic welding, resistance welding, laser beam welding, electron beam welding, induction welding, and cold welding. Joining of these materials can also be performed by using a coating process such as a thermal spray coating such as plasma spraying, flame spraying, arc spraying, to join materials together. By way of example, a nickel or copper mesh can be joined onto a nickel bus using a thermal spray of nickel as a glue.

Figure 11:
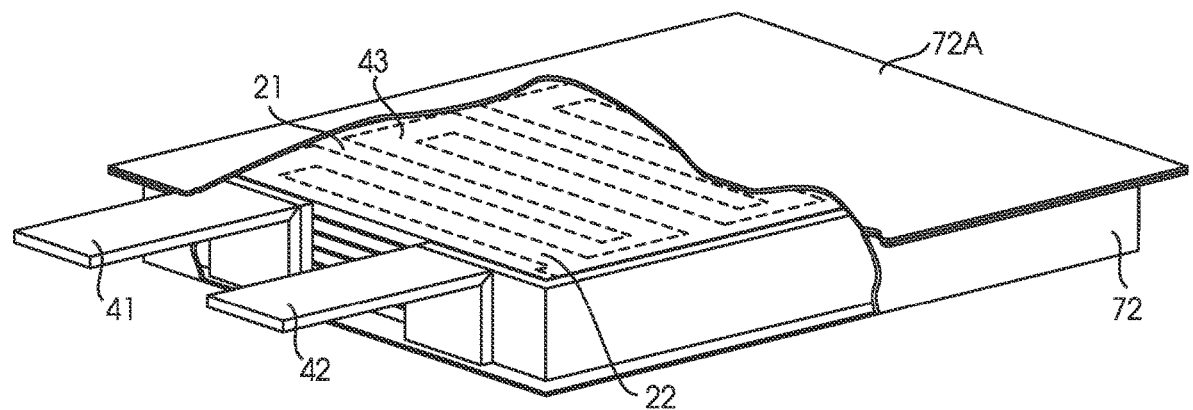
FIG. 11 is a fragmentary perspective view of the assembled three-dimensional secondary battery of FIG. 10.

Referring now to FIG. 11, battery enclosure 72 is filled with non-aqueous electrolyte (not shown) and lid 72A may be folded over and sealed to upper surface (see FIG. 10)) to enclose electrode stack 74. To permit connection to an energy supply or consumer (not shown), tabs 41, 42 extend out of the sealed enclosure in a direction that is perpendicular to the direction of stacking of the individual electrode structures 20 in electrode stack 74 and parallel to the direction of the progression of the series of interdigitated electrodes in each electrode structure 20 in electrode stack 74.

In certain embodiments, a battery enclosure may contain two or more electrode structures (sometimes also referred to as dies) stacked vertically, horizontally or vertically and horizontally, relative to each other, and the tab extensions are connected to each of the electrode in order to provide electrical connection to the environment outside the battery. When dies are stacked vertically, the bottoms of the populations of negative electrodes in different electrode structures (or the negative electrode buses, whichever is present) are vertically positioned relative to each other and the bottoms of the populations of positive electrodes in different electrode structures (or the positive electrode buses, whichever is present) are vertically positioned relative to each other. In certain embodiments, each electrode structure in a stack has a top and bottom coating of separator material as illustrated in FIG. 2. In other embodiments, however, the top, bottom or top and bottom coating of separator material may be omitted, and a free-standing separator layer may be inserted between the electrode structures (dies) to provide electrical isolation. Commercially available battery separators may be cut to the desired size and used for this purpose. Once the dies are stacked, in some embodiments, the tab extension(s) for the positive and negative electrode populations in the electrode structures are electrically connected to the ends of the electrode buses (if present) or the electrode ends of the respective populations by gluing, plasma spraying, welding, etc. Depending upon the intended application, each tab extension may be connected to an individual electrode structure (die) in the electrode stack. Alternatively, a single tab extension may be electrically connected to two or more electrode structures (die) in the stack; in one such embodiment, the tab extension spans the height of the stack (see, e.g., 26 in FIG. 10) and makes electrical connection to all electrode structures (die) in the stack.

Instead of stacking dies vertically one on top of another, in one embodiment dies are tiled next to each other in the X plane. The tiling can occur along only one axis (for example X only) or along both axis. In one such embodiment the polarity of the electrode buses on each die are alternately reversed so that the cathode bus from one die is adjacent the cathode bus from the next die and the anode bus of one die is next to the anode bus of the next die. In this manner, a common tab can be used to connect to two adjacent die saving weight and volume. When tiling in the XY plane, multiple anode and/or cathode tabs may need to be connected together to form a single anode connection and a single cathode connection. This can be achieved inside the battery enclosure or outside the battery enclosure. In certain embodiments multiple anode tabs and/or multiple cathode tabs may remain unconnected and come out of the battery enclosure. Alternatively, a single anode and cathode connection may be brought outside the battery enclosure. In this embodiment, the cathode tabs are initially shaped in a T configuration. The top of the T connects to two adjacent cathode buses. The bottom of the T is bent at 90 degrees and runs along the bottom of the tiled dies. The bottom portion of multiple cathode tabs lay on top of each other along the bottom of the tiled dies. These multiple tabs can then be electrically connected together by resistance welding, laser welding, spot welding or connected with conductive glue. Only one of these cathode tabs is then brought outside the battery enclosure. Similarly, multiple anode tabs are initially shaped in a T configuration. The top of the T connects to two adjacent anode buses. The bottom of the T is bent at 90 degrees and runs along the bottom of the tiled dies. The bottom portion of multiple anode tabs lay on top of each other along the bottom of the tiled dies. These multiple tabs can then be electrically connected together by resistance welding, laser welding, spot welding or connected with conductive glue. Only one of these anode tabs is then brought outside the battery enclosure. Tiling in the XY plane can also be combined with stacking die in the Z plane. In this manner, batteries can be manufactured that are much larger than each individual die.

For lithium ion batteries for portable electronics such as mobile phones and computers, for example, a pouch or other conventional battery enclosure may be substituted for battery enclosure 72.

Figure 12:
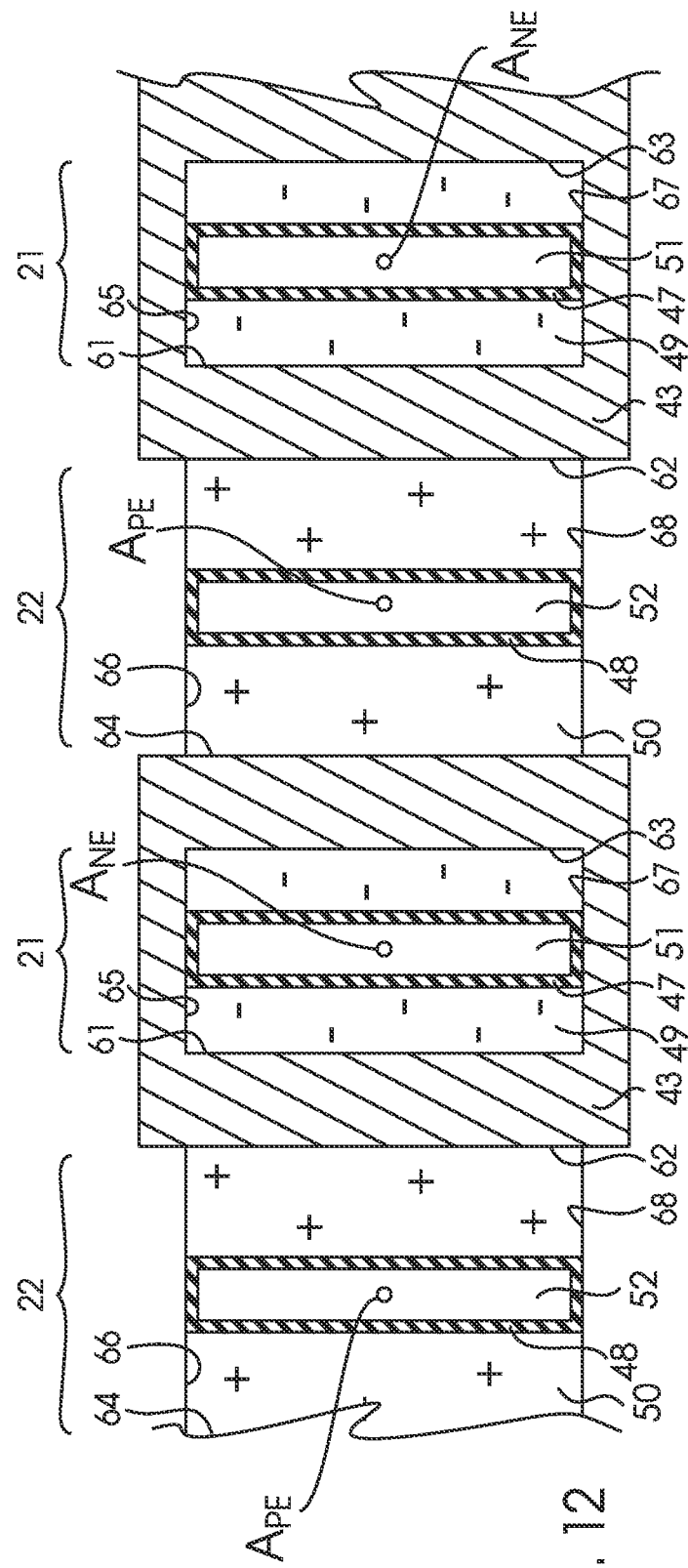
FIG. 12 is a cross-section of an alternative embodiment of the electrode structure of FIG. 2 taken in the plane containing the line 3-3.

Referring now to FIG. 12, in one alternative embodiment, electrically insulating separator layer 43 surrounds axis $A_{NE}$ of each member 21 of the population of negative electrodes; in this embodiment electrically insulating separator layer 43 is between adjacent pairs of negative electrode members 21 and positive electrode members 22 but does not surround axis $A_{PE}$ of each member 22 of the population of positive electrodes. Between opposing lateral surfaces 61, 62 of members 21, 22, respectively and between opposing lateral surfaces 63, 64 of members 21, 22, respectively, electrically insulating separator layer 43 comprises microporous separator material (as previously described). For example, in one such embodiment, electrically insulating separator layer 43 comprises microporous separator material (as previously described) and the microporous separator material surrounds axis $A_{NE}$ of each member 21 for at least 70% of length $L_{NE}$ of each member 21. By way of further example, in one such embodiment electrically insulating separator layer 43 comprises microporous separator material (as previously described) and the microporous separator material surrounds axis $A_{NE}$ of each member 21 for at least 75% of length $L_{NE}$ of each member 21. By way of further example, in one such embodiment electrically insulating separator layer 43 comprises microporous separator material (as previously described) and the microporous separator material surrounds axis $A_{NE}$ of each member 21 for at least 80% of length $L_{NE}$ of each member 21. By way of further example, in one such embodiment electrically insulating separator layer 43 comprises microporous separator material (as previously described) and the microporous separator material surrounds axis $A_{NE}$ of each member 21 for at least 85% of length $L_{NE}$ of each member 21. By way of further example, in one such embodiment electrically insulating separator layer 43 comprises microporous separator material (as previously described) and the microporous separator material surrounds axis $A_{NE}$ of each member 21 for at least 90% of length $L_{NE}$ of each member 21. By way of further example, in one such embodiment electrically insulating separator layer 43 comprises microporous separator material (as previously described) and the microporous separator material surrounds axis $A_{NE}$ of each member 21 for at least 95% of length $L_{NE}$ of each member 21. By way of further example, in one such embodiment electrically insulating separator layer 43 comprises microporous separator material (as previously described) and the microporous separator material surrounds axis $A_{NE}$ of each member 21 for the entirety of length $L_{NE}$ of each member 21. In each of the foregoing exemplary embodiments, electrically insulating separator layer 43 also comprises microporous separator material (as previously described) in the region surrounding front surface 65 and back surface 67 of members 21.

Figure 13:
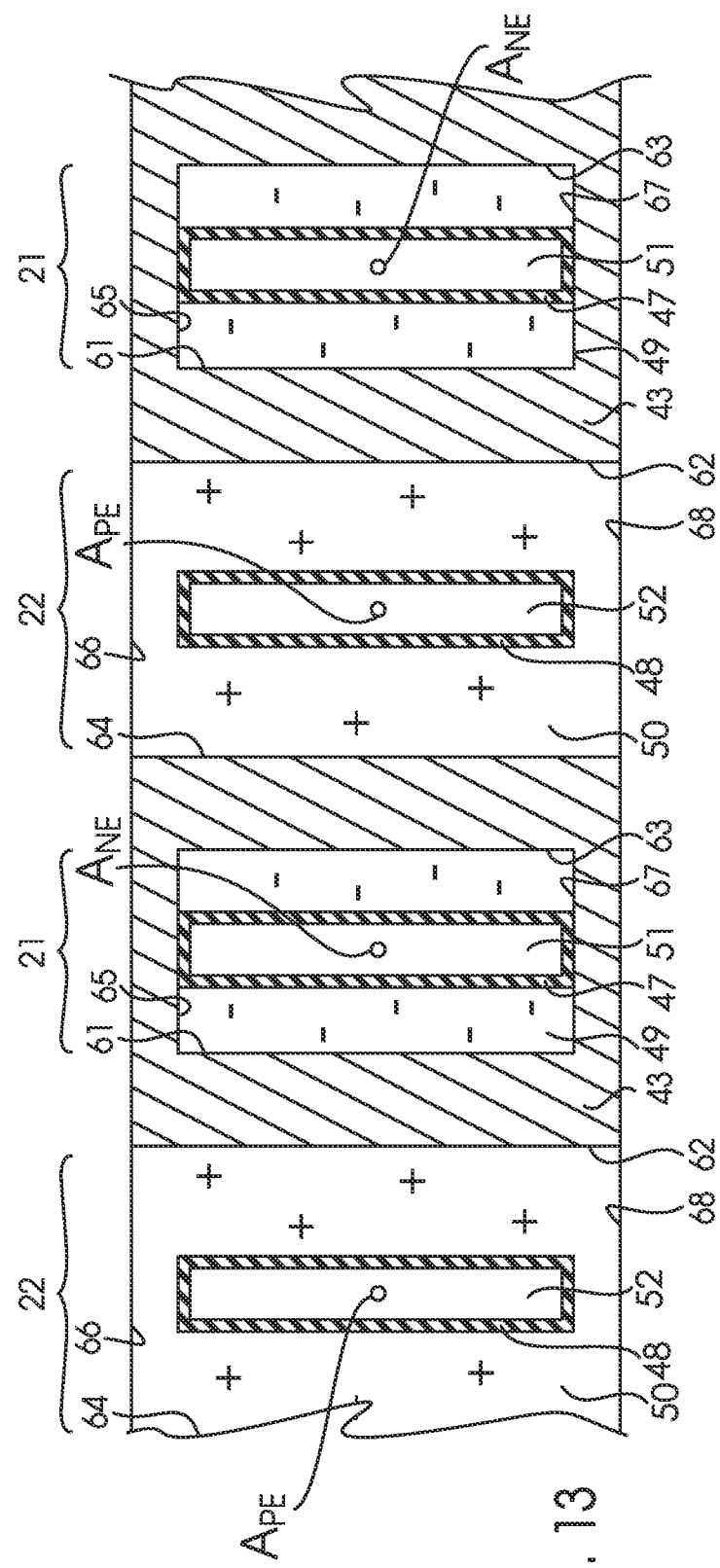
FIG. 13 is a cross-section of an alternative embodiment of the electrode structure of FIG. 2 taken in the plane containing the line 3-3.

Referring now to FIG. 13, in an alternative embodiment height $H_{NE}$ of each member 21 of the population of negative electrodes may be less than height $H_{PE}$ of each member 22 of the population of positive electrodes. In this embodiment, and as more fully described in connection with FIG. 12, electrically insulating separator layer 43 surrounds axis $A_{NE}$ of each member 21 of the population of negative electrodes for at least a majority (e.g., at least 70%, at least 75%, at least 80%, at least 85%, at least 90%, at least 95%, or even the entirety) of length $L_{NE}$ of each member 21 of the negative electrode population. Electrically insulating separator layer 43 also comprises microporous separator material (as previously described) in the region surrounding front surface 65 and back surface 67 of members 21.

Figure 14:
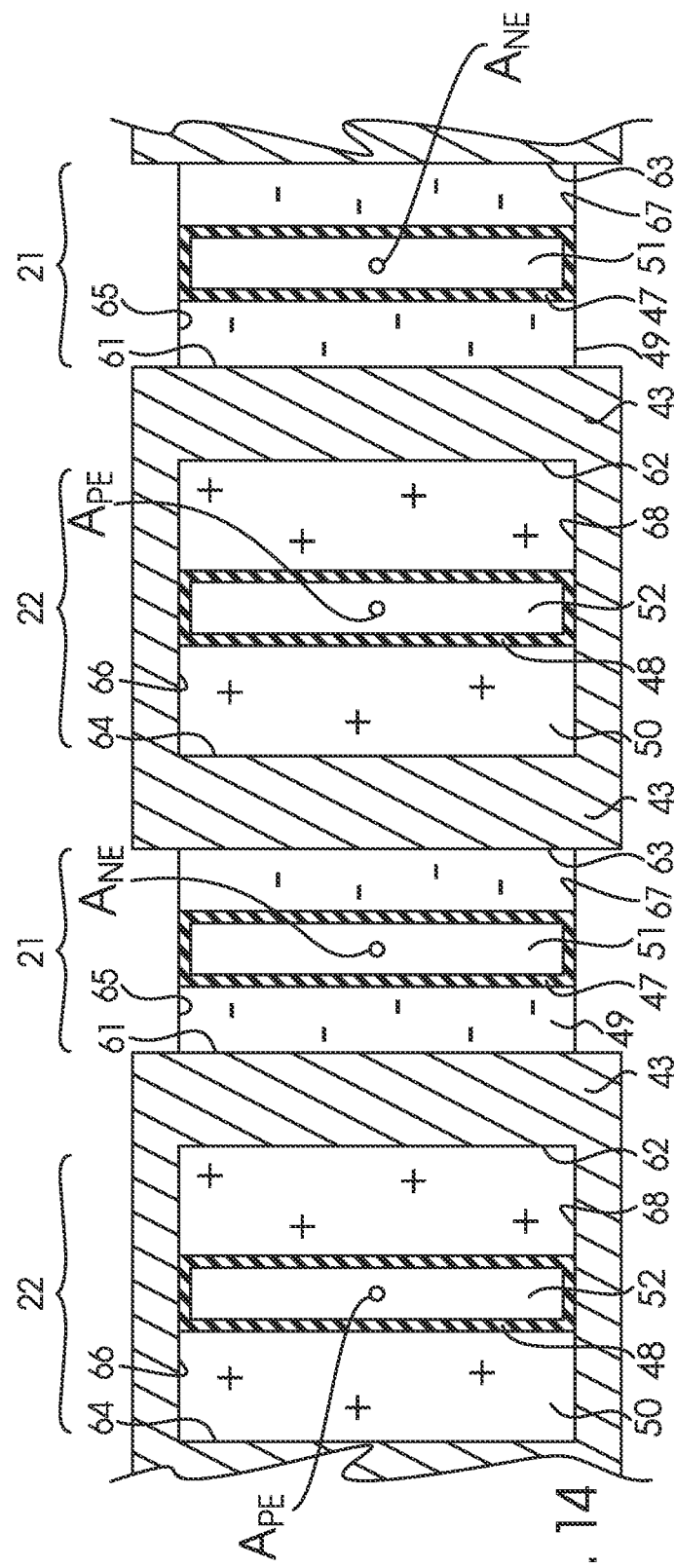
FIG. 14 is a cross-section of an alternative embodiment of the electrode structure of FIG. 2 taken in the plane containing the line 3-3.

Referring now to FIG. 14, in one alternative embodiment, electrically insulating separator layer 43 surrounds axis $A_{PE}$ of each member 22 of the population of positive electrodes; in this embodiment electrically insulating separator layer 43 is between adjacent pairs of negative electrode members 21 and positive electrode members 22 but does not surround axis $A_{NE}$ of each member 21 of the population of negative electrodes. Between opposing lateral surfaces 61, 62 of members 21, 22, respectively, and between opposing lateral surfaces 63, 64 of members 21, 22, respectively, electrically insulating separator layer 43 comprises microporous separator material (as previously described). For example, in one such embodiment, electrically insulating separator layer 43 comprises microporous separator material (as previously described) and the microporous separator material surrounds axis $A_{PE}$ of each member 22 for at least 70% of length $L_{PE}$ of each member 22. By way of further example, in one such embodiment electrically insulating separator layer 43 comprises microporous separator material (as previously described) and the microporous separator material surrounds axis $A_{PE}$ of each member 22 for at least 75% of length $L_{PE}$ of each member 22. By way of further example, in one such embodiment electrically insulating separator layer 43 comprises microporous separator material (as previously described) and the microporous separator material surrounds axis $A_{PE}$ of each member 22 for at least 80% of length $L_{PE}$ of each member 22. By way of further example, in one such embodiment electrically insulating separator layer 43 comprises microporous separator material (as previously described) and the microporous separator material surrounds axis $A_{PE}$ of each member 22 for at least 85% of length $L_{PE}$ of each member 22. By way of further example, in one such embodiment electrically insulating separator layer 43 comprises microporous separator material (as previously described) and the microporous separator material surrounds axis $A_{PE}$ of each member 22 for at least 90% of length $L_{PE}$ of each member 22. By way of further example, in one such embodiment electrically insulating separator layer 43 comprises microporous separator material (as previously described) and the microporous separator material surrounds axis $A_{PE}$ of each member 22 for at least 95% of length $L_{PE}$ of each member 22. By way of further example, in one such embodiment electrically insulating separator layer 43 comprises microporous separator material (as previously described) and the microporous separator material surrounds axis $A_{PE}$ of each member 22 for the entirety of length $L_{PE}$ of each member 22. In each of the foregoing exemplary embodiments, electrically insulating separator layer 43 also comprises microporous separator material (as previously described) in the region surrounding front surface 66 and back surface 68 of members 22.

In an alternative embodiment, electrically insulating separator layer 43 surrounds axis $A_{PE}$ of each member 22 of the population of positive electrodes as described in connection with FIG. 14, but height $H_{NE}$ of each member 21 of the population of negative electrodes is greater than height $H_{PE}$ of each member 22 of the population of positive electrodes. In this alternative embodiment electrically insulating separator layer 43 surrounds axis $A_{PE}$ of each member 22 of the population of positive electrodes for at least a majority (e.g., at least 70%, at least 75%, at least 80%, at least 85%, at least 90%, at least 95%, or even the entirety) of length $L_{PE}$ of each member 22 of the positive electrode population. Electrically insulating separator layer 43 also comprises microporous separator material (as previously described) in the region surrounding front surface 66 and back surface 68 of members 22.

Figure 15:
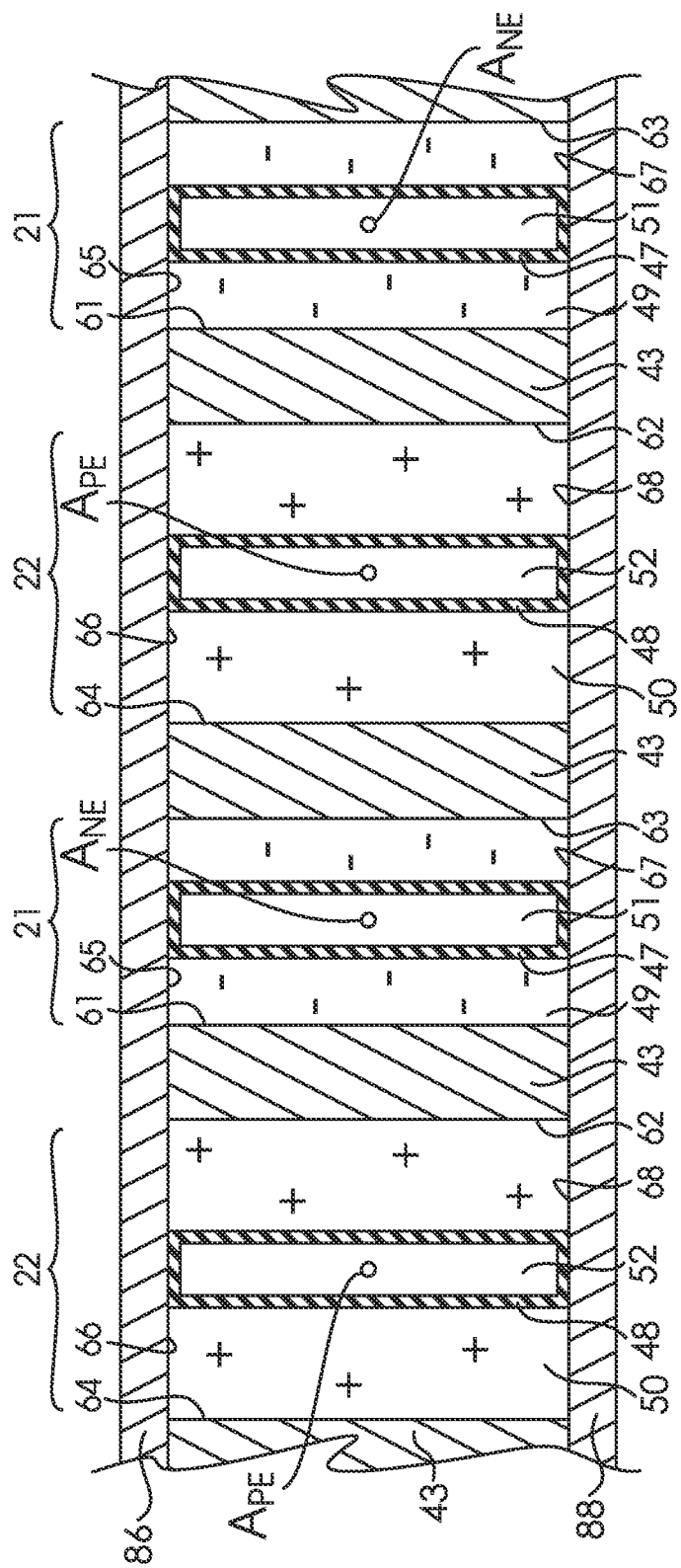
FIG. 15 is a cross-section of an alternative embodiment of the electrode structure of FIG. 2 taken in the plane containing the line 3-3.

Referring now to FIG. 15, in one embodiment electrically insulating separator layers 43, 86, and 88, in combination, surround (i) axis $A_{NE}$ of each member 21 of the population of negative electrodes and (ii) axis $A_{PE}$ of each member 22 of the population of positive electrodes. Electrically insulating separator layer 43 comprises microporous separator material (as previously described) in the region between opposing lateral surfaces 61, 62 of members 21, 22, respectively and between opposing lateral surfaces 63, 64 of members 21, 22, respectively. Because the primary route for ion transfer between members 21 and members 22 occurs between the lateral surfaces of these members, electrically insulating separator layers 86, 88 may comprise any electrically insulating material suitable for use in a secondary battery; in one such embodiment, electrically insulating separator layers 86, 88 comprise an electrically insulating material that has low electronic and ionic conductivity for carrier ions (e.g., lithium ions). For example, in one embodiment the electrically insulating material has a conductivity for carrier ions (e.g., lithium) of less than $1 \times 10^{-4}$ S/cm. By way of further example in one embodiment the particulate material has a conductivity for carrier ions of less than $1 \times 10^{-5}$ S/cm. By way of further example in one embodiment the particulate material has a conductivity for carrier ions of less than $1 \times 10^{-6}$ S/cm. Exemplary particulate materials include any of the materials previously identified as exemplary particulate material for the microporous separator material. In one exemplary embodiment, electrically insulating separator layers 43, 86, and 88, in combination surround axis $A_{NE}$ of each member 21 for at least 70% of length $L_{NE}$ of each member 21 and surround axis $A_{PE}$ of each member 22 for at least 70% of length $L_{PE}$ of each member 22. By way of further example, in one such embodiment electrically insulating separator layers 43, 86, and 88, in combination surround axis $A_{NE}$ of each member 21 for at least 75% of length $L_{NE}$ of each member 21 and surround axis $A_{PE}$ of each member 22 for at least 75% of length $L_{PE}$ of each member 22. By way of further example, in one such embodiment electrically insulating separator layers 43, 86, and 88, in combination, surround axis $A_{NE}$ of each member 21 for at least 80% of length $L_{NE}$ of each member 21 and surround axis $A_{PE}$ of each member 22 for at least 80% of length $L_{PE}$ of each member 22. By way of further example, in one such embodiment electrically insulating separator layers 43, 86, and 88, in combination, surround axis $A_{NE}$ of each member 21 for at least 85% of length $L_{NE}$ of each member 21 and surround axis $A_{PE}$ of each member 22 for at least 85% of length $L_{PE}$ of each member 22. By way of further example, in one such embodiment electrically insulating separator layers 43, 86, and 88, in combination, surround axis $A_{NE}$ of each member 21 for at least 90% of length $L_{NE}$ of each member 21 and surround axis $A_{PE}$ of each member 22 for at least 90% of length $L_{PE}$ of each member 22. By way of further example, in one such embodiment electrically insulating separator layers 43, 86, and 88, in combination, surround axis $A_{NE}$ of each member 21 for at least 95% of length $L_{NE}$ of each member 21 and surround axis $A_{PE}$ of each member 22 for at least 95% of length $L_{PE}$ of each member 22. By way of further example, in one such embodiment electrically insulating separator layers 43, 86, and 88, in combination, surround axis $A_{NE}$ of each member 21 for the entirety of length $L_{NE}$ of each member 21 and surround axis $A_{PE}$ of each member 22 for the entirety of length $L_{PE}$ of each member 22.

Figure 16:
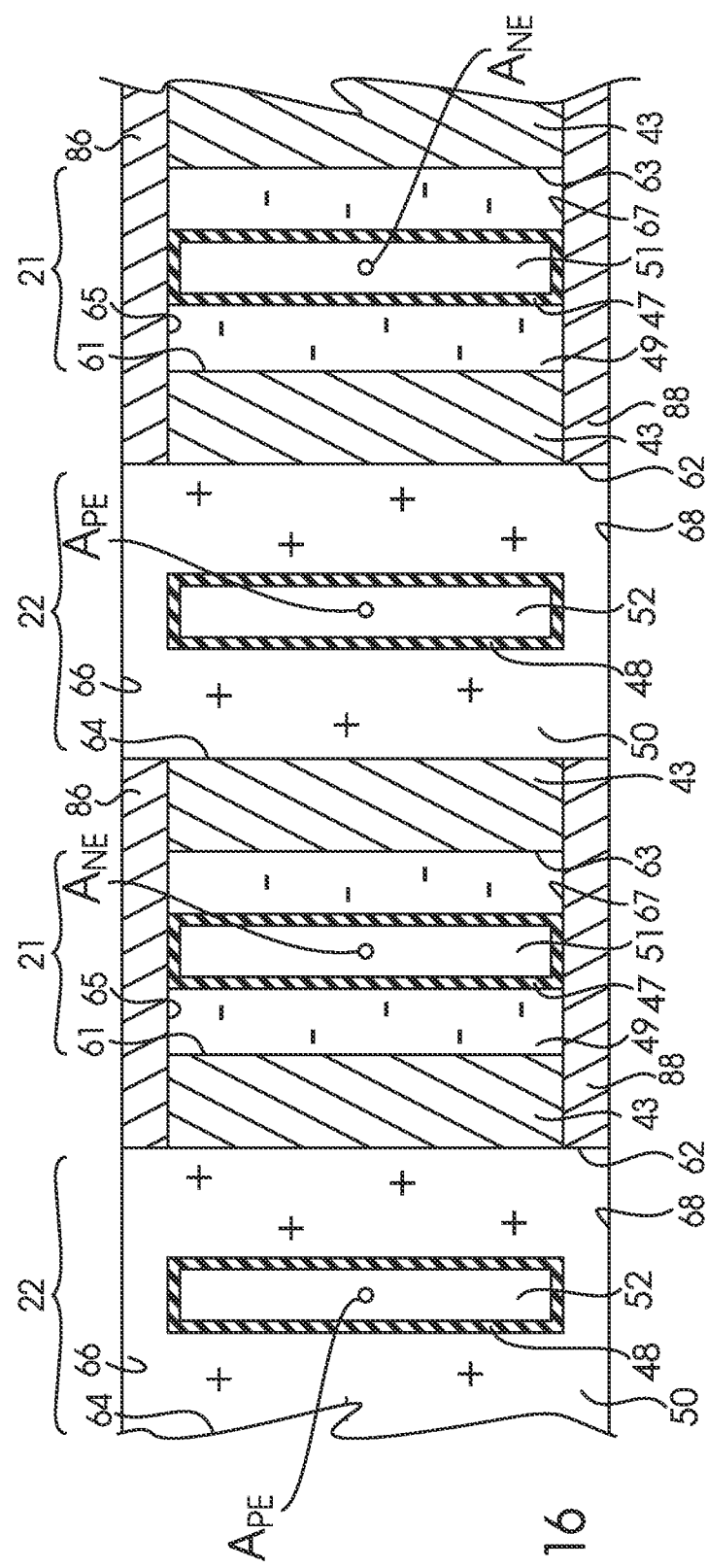
FIG. 16 is a cross-section of an alternative embodiment of the electrode structure of FIG. 2 taken in the plane containing the line 3-3.

Referring now to FIG. 16, in one alternative embodiment electrically insulating separator layers 43, 86, and 88, in combination, surround axis $A_{NE}$ of each member 21 of the population of negative electrodes. In this embodiment electrically insulating separator layer 43 is between members 22 of the population of positive electrodes and members 21 of the population of negative electrodes and electrically insulating separator layers 86 and 88 are elsewhere. For example, in this embodiment electrically insulating separator layer 43 comprises microporous separator material in the region between opposing lateral surfaces 61, 62 of members 21, 22, respectively and between opposing lateral surfaces 63, 64 of members 21, 22, respectively. Because the primary route for ion transfer between members 21 and members 22 occurs between the lateral surfaces of these members, however, electrically insulating separator layers 86, 88 need not comprise microporous separator material; instead, electrically insulating separator layers 86, 88 may optionally comprise an electrically insulating material that is substantially impermeable to carrier ions (e.g., lithium ions) as more fully described in connection with FIG. 15. In one such exemplary embodiment, electrically insulating separator layers 43, 86, and 88, in combination, surround axis $A_{NE}$ of each member 21 for at least 70% of length $L_{NE}$ of each member 21. By way of further example, in one such embodiment electrically insulating separator layers 43, 86, and 88, in combination, surround axis $A_{NE}$ of each member 21 for at least 75% of length $L_{NE}$ of each member 21. By way of further example, in one such embodiment electrically insulating separator layers 43, 86, and 88, in combination, surround axis $A_{NE}$ of each member 21 for at least 80% of length $L_{NE}$ of each member 21. By way of further example, in one such embodiment electrically insulating separator layers 43, 86, and 88, in combination, surround axis $A_{NE}$ of each member 21 for at least 85% of length $L_{NE}$ of each member 21. By way of further example, in one such embodiment electrically insulating separator layers 43, 86, and 88, in combination, surround axis $A_{NE}$ of each member 21 for at least 90% of length $L_{NE}$ of each member 21. By way of further example, in one such embodiment electrically insulating separator layers 43, 86, and 88, in combination, surround axis $A_{NE}$ of each member 21 for at least 95% of length $L_{NE}$ of each member 21. By way of further example, in one such embodiment electrically insulating separator layers 43, 86, and 88, in combination, surround axis $A_{NE}$ of each member 21 for the entirety of length $L_{NE}$ of each member 21.

Figure 17:
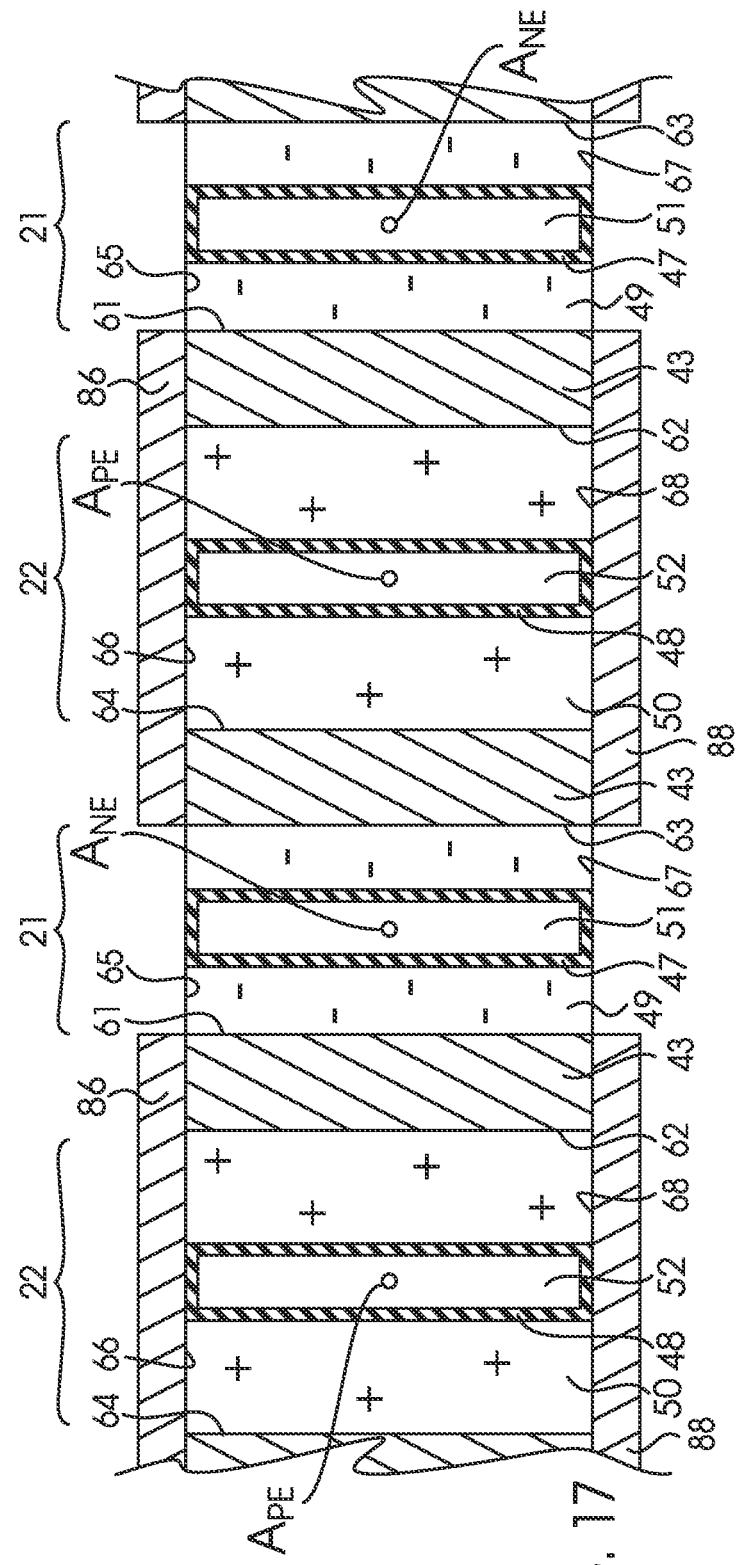
FIG. 17 is a cross-section of an alternative embodiment of the electrode structure of FIG. 2 taken in the plane containing the line 3-3.

Referring now to FIG. 17, in one alternative embodiment electrically insulating separator layers 43, 86, and 88, in combination, surround axis $A_{PE}$ of each member 22 of the population of positive electrodes. In this embodiment electrically insulating separator layer 43 is between members 22 of the population of positive electrodes and members 21 of the population of negative electrodes and electrically insulating separator layers 86 and 88 are elsewhere. For example, in this embodiment electrically insulating separator layer 43 comprises microporous separator material in the region between opposing lateral surfaces 61, 62 of members 21, 22, respectively and between opposing lateral surfaces 63, 64 of members 21, 22, respectively. Because the primary route for ion transfer between members 21 and members 22 occurs between the lateral surfaces of these members, however, electrically insulating separator layers 86, 88 need not comprise microporous separator material; instead, electrically insulating separator layers 86, 88 may optionally comprise an electrically insulating material that is substantially impermeable to carrier ions (e.g., lithium ions) as more fully described in connection with FIG. 15. In one such exemplary embodiment, electrically insulating separator layers 43, 86, and 88, in combination, surround axis $A_{PE}$ of each member 22 for at least 70% of length $L_{PE}$ of each member 22. By way of further example, in one such embodiment electrically insulating separator layers 43, 86, and 88, in combination, surround axis $A_{PE}$ of each member 22 for at least 75% of length $L_{PE}$ of each member 22. By way of further example, in one such embodiment electrically insulating separator layers 43, 86, and 88, in combination, surround axis $A_{PE}$ of each member 22 for at least 80% of length $L_{PE}$ of each member 22. By way of further example, in one such embodiment electrically insulating separator layers 43, 86, and 88, in combination, surround axis $A_{PE}$ of each member 22 for at least 85% of length $L_{PE}$ of each member 22. By way of further example, in one such embodiment electrically insulating separator layers 43, 86, and 88, in combination, surround axis $A_{PE}$ of each member 22 for at least 90% of length $L_{PE}$ of each member 22. By way of further example, in one such embodiment electrically insulating separator layers 43, 86, and 88, in combination, surround axis $A_{PE}$ of each member 22 for at least 95% of length $L_{PE}$ of each member 22. By way of further example, in one such embodiment electrically insulating separator layers 43, 86, and 88, in combination, surround axis $A_{PE}$ of each member 22 for the entirety of length $L_{PE}$ of each member 22.

Figure 18:
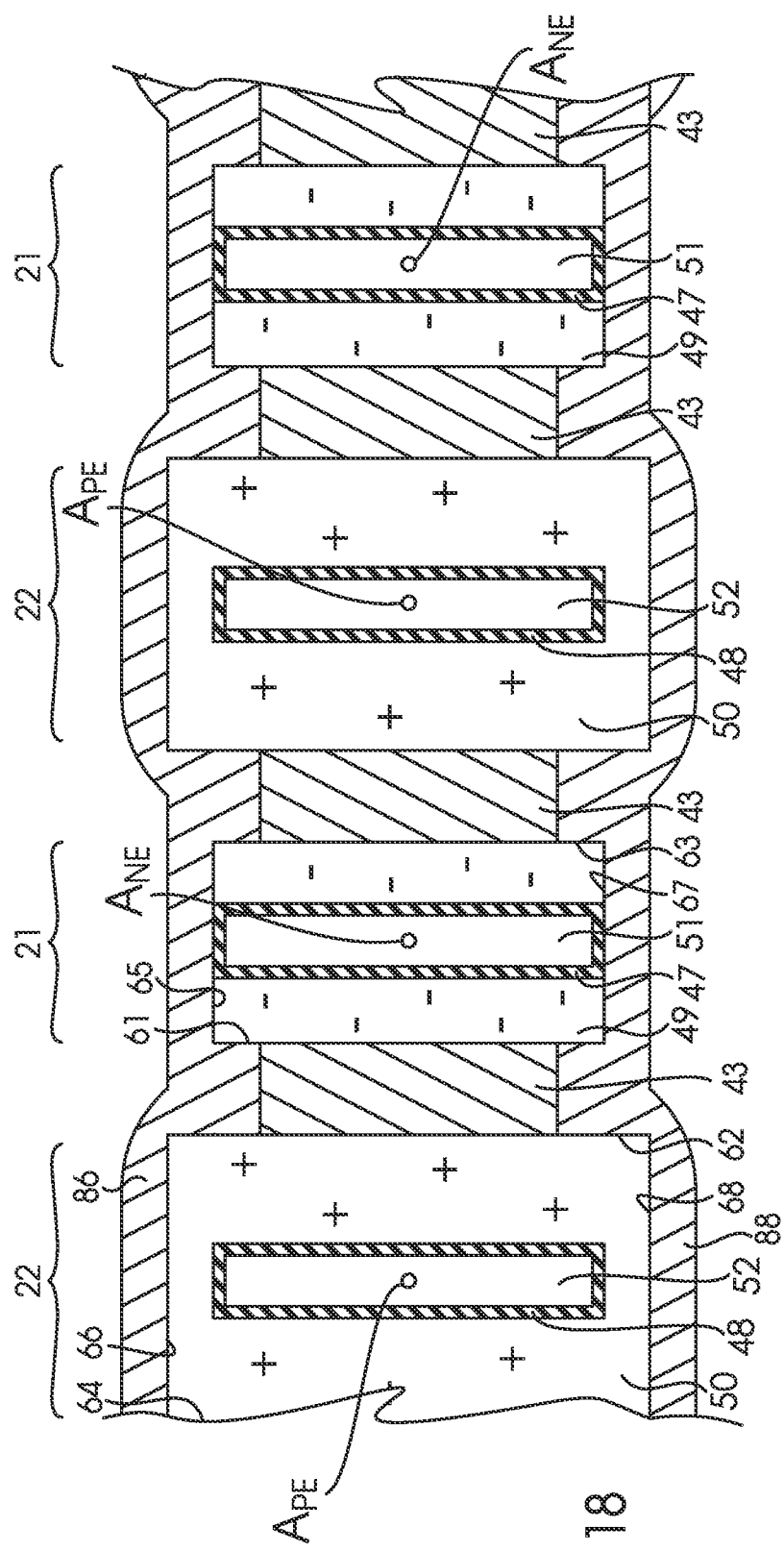
FIG. 18 is a cross-section of an alternative embodiment of the electrode structure of FIG. 2 taken in the plane containing the line 3-3.

Referring now to FIG. 18, in one alternative embodiment electrically insulating separator layers 43, 86, and 88, in combination, surround (i) axis $A_{NE}$ of each member 21 of the population of negative electrodes and (ii) axis $A_{PE}$ of each member 22 of the population of positive electrodes. As described in connection with FIG. 15, electrically insulating separator layer 43 comprises microporous separator material in the region between opposing lateral surfaces 61, 62 of members 21, 22, respectively and between opposing lateral surfaces 63, 64 of members 21, 22, respectively. Because the primary route for ion transfer between members 21 and members 22 occurs between the lateral surfaces of these members, electrically insulating separator layers 86, 88 may comprise any electrically insulating material suitable for use in a secondary battery; in one such embodiment, electrically insulating separator layers 86, 88 comprise an electrically insulating material that is substantially impermeable to carrier ions (e.g., lithium ions) as described in connection with FIG. 15. In this embodiment, electrically insulating separator layer 86 extends beyond front surfaces 65, 66 of members 21, 22, respectively, and into the region between opposing lateral surfaces 61, 62 and opposing lateral surfaces 63, 64 of members 21 and 22, respectively. Electrically insulating separator layer 88 also extends beyond back surfaces 67, 68 of members 21, 22, respectively, and into the region between opposing lateral surfaces 61, 62 and opposing lateral surfaces 63, 64 of members 21 and 22, respectively. In one such embodiment, for example, and ignoring the porosity of the microporous separator material, the microporous separator material constitutes at least 70 vol % of electrically insulating separator material layer 43 between opposing lateral surfaces 61, 62 and opposing lateral surfaces 63, 64 of members 21 and 22, respectively. By way of further example, in one embodiment and ignoring the porosity of the microporous separator material, the microporous separator material constitutes at least 75 vol % of electrically insulating separator material layer 43 between opposing lateral surfaces 61, 62 and opposing lateral surfaces 63, 64 of members 21 and 22, respectively. By way of further example, in one embodiment and ignoring the porosity of the microporous separator material, the microporous separator material constitutes at least 80 vol % of electrically insulating separator material layer 43 between opposing lateral surfaces 61, 62 and opposing lateral surfaces 63, 64 of members 21 and 22, respectively. By way of further example, in one embodiment and ignoring the porosity of the microporous separator material, the microporous separator material constitutes at least 85 vol % of electrically insulating separator material layer 43 between opposing lateral surfaces 61, 62 and opposing lateral surfaces 63, 64 of members 21 and 22, respectively. By way of further example, in one embodiment and ignoring the porosity of the microporous separator material, the microporous separator material constitutes at least 90 vol % of electrically insulating separator material layer 43 between opposing lateral surfaces 61, 62 and opposing lateral surfaces 63, 64 of members 21 and 22, respectively. By way of further example, in one embodiment and ignoring the porosity of the microporous separator material, the microporous separator material constitutes at least 95 vol % of electrically insulating separator material layer 43 between opposing lateral surfaces 61, 62 and opposing lateral surfaces 63, 64 of members 21 and 22, respectively.

Figure 19:
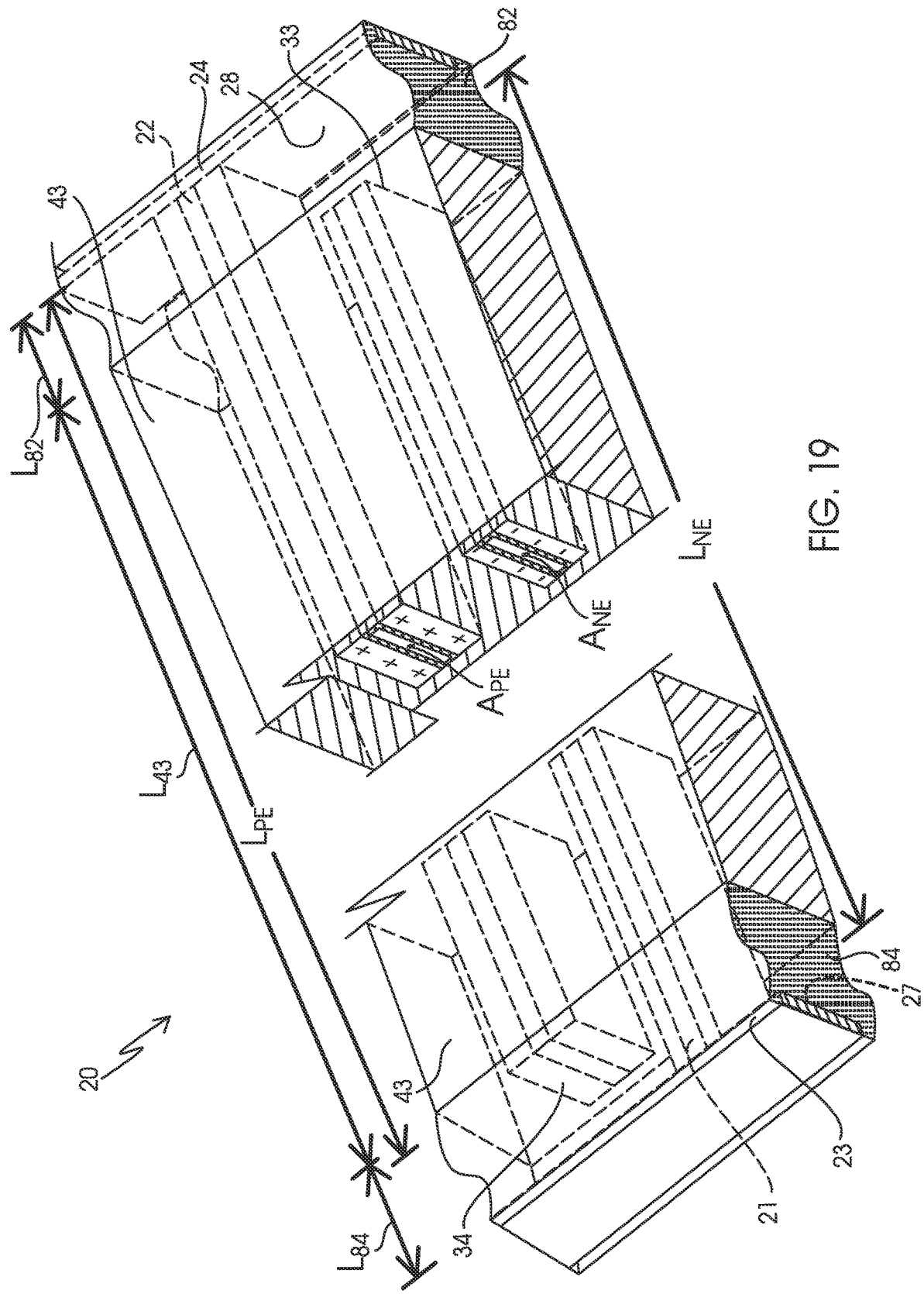
FIG. 19 is a fragmentary perspective view of an alternative embodiment of a subassembly of the electrode structure of FIG. 2 with parts broken away to show internal construction.

Referring now to FIG. 19, in one embodiment, electrically insulating separator layers 43, 82 and 84 surround each member 22 and each member 21 of the population of positive and negative electrodes, respectively. In this embodiment, however, electrically insulating separator layer 43 surrounds axes $A_{PE}$ and $A_{NE}$ of each member 22 and each member 21 for a fraction of lengths $L_{PE}$ and $L_{NE}$ of members 22 and 21, respectively. Stated differently, in this embodiment electrically insulating separator layer 43 is in the region between opposing lateral surfaces of each member 21, 22, electrically insulating separator layer 43 covers front surfaces 65, 66 of each member 21, 22 (see FIG. 3), and electrically insulating separator layer 43 covers back surfaces 67, 68 of each member 21, 22 (see FIG. 3), electrically insulating separator layer 82 is in the region between top 33 of negative electrode 21 and positive electrode bus bar 24, and electrically insulating separator layer 84 is in the region between top 34 of positive electrode 22 and negative electrode bus bar 23. Length $L_{82}$ corresponds to the length of electrically insulating separator layer 82, length $L_{84}$ corresponds to the length of electrically insulating separator layer 84 and $L_{43}$ corresponds to the length of electrically insulating separator layer 43. For example, in this embodiment electrically insulating separator layer 43 surrounds (i) axis $A_{NE}$ of each member 21 of the population of negative electrodes for at least a majority (e.g., at least 70%, at least 75%, at least 80%, at least 85%, at least 90% or even at least 95%) but less than the entirety of length $L_{NE}$ of each member 21 of the negative electrode population. Stated differently, in this embodiment, length $L_{43}$ is at least 70%, at least 75%, at least 80%, at least 85%, at least 90% or even at least 95% but less than the entirety of length $L_{NE}$. Additionally, in this embodiment axis $A_{PE}$ of each member 22 of the population of positive electrodes for at least a majority (e.g., at least 70%, at least 75%, at least 80%, at least 85%, at least 90% or even at least 95%) but less than the entirety of length $L_{PE}$ of each member 22 of the positive electrode population. Stated differently, in this embodiment, length $L_{43}$ is at least 70%, at least 75%, at least 80%, at least 85%, at least 90% or even at least 95% but less than the entirety of length $L_{PE}$. Electrically insulating separator layer 43 comprises microporous separator material (as previously described). Because the primary route for ion transfer between members 21 and members 22 occurs between the lateral surfaces of these members, however, electrically insulating separator layers 82, 84 need not comprise microporous separator material; instead, electrically insulating separator layers 82, 84 may optionally comprise an electrically insulating material that is substantially impermeable to carrier ions (e.g., lithium ions) as more fully described in connection with FIG. 15.

In alternative embodiments, electrically insulating separator layer 82 is in the region between top 33 of negative electrode 21 and positive electrode bus bar 24, and electrically insulating separator layer 84 is in the region between top 34 of positive electrode 22 and negative electrode bus bar 23 as described more fully in connection with FIG. 19, but between these two regions members 21 and 22 may be electrically isolated along their lengths as more fully described in connection with FIGS. 12-Z. Stated differently, in on such alternative embodiment members 21 are surrounded by electrically insulating separator material but members 22 are not as more fully described in connection with FIGS. 12 and 13. In another such alternative embodiment, members 22 are surrounded by electrically insulating separator material but members 21 are not as more fully described in connection with FIG. 14. In another such alternative embodiment, members 21 and 22 are surrounded by electrically insulating separator 43, 86 and 88 as more fully described in connection with FIG. 15. In another such alternative embodiment, members 21 are surrounded by electrically insulating separator material 43, 86 and 88 but not members 22 are not as more fully described in connection with FIG. 16. In another such alternative embodiment, members 22 are surrounded by electrically insulating separator material 43, 86 and 88 but not members 21 are not as more fully described in connection with FIG. 17. In another such alternative embodiment, members 21 and 22 are surrounded by electrically insulating separator 43, 86 and 88 as more fully described in connection with FIG. 18. In each of these embodiments, length $L_{43}$ is at least 70%, at least 75%, at least 80%, at least 85%, at least 90% or even at least 95% but less than the entirety of length $L_{PE}$ and/or $L_{NE}$.

Figure 20:
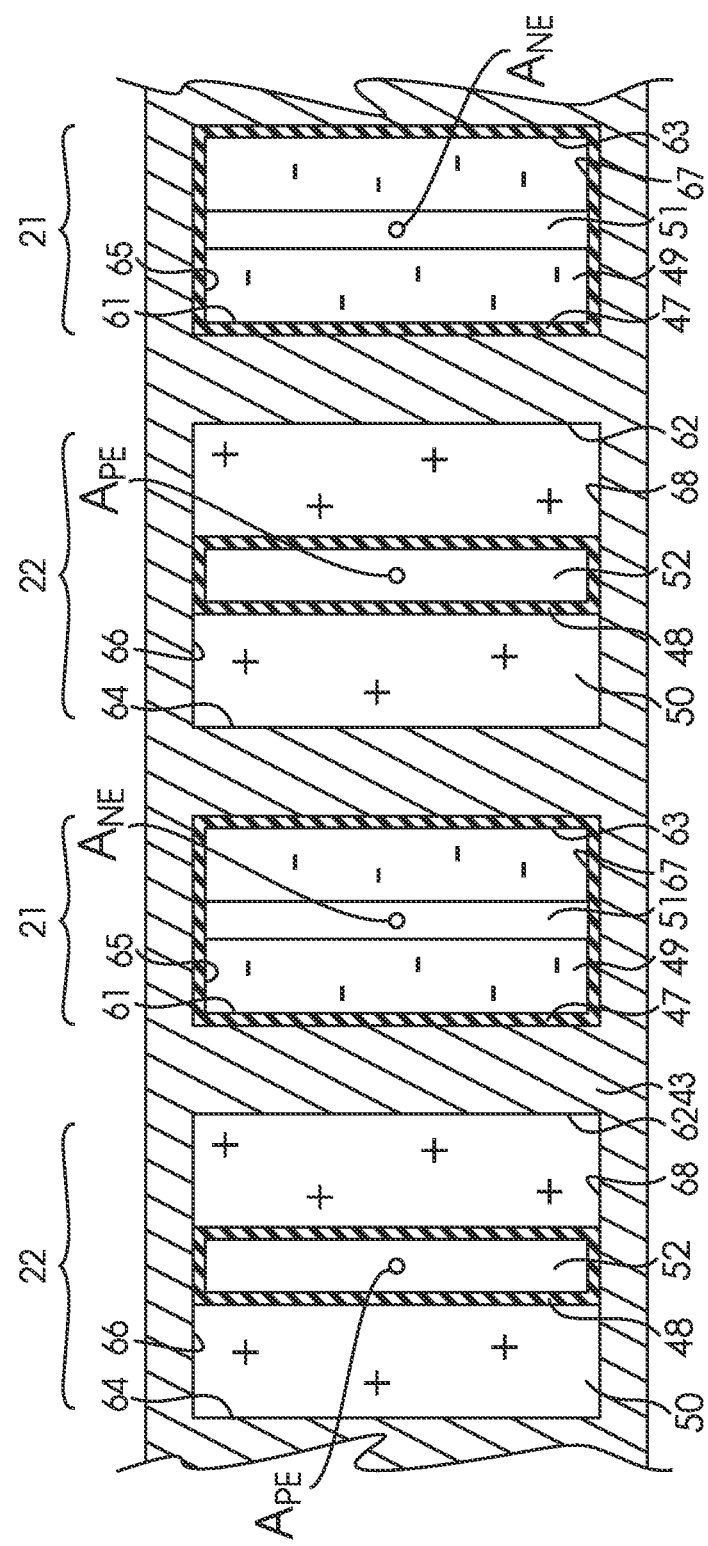
FIG. 20 is a cross-section of an alternative embodiment of the electrode structure of FIG. 2 taken in the plane containing the line 3-3.

Referring now to FIG. 20, in one alternative embodiment, negative electrode active material layer 49 is between negative electrode backbone 51 and negative electrode current collector layer 47. In this embodiment, negative electrode current collector layer 47 comprises an ionically permeable conductor material that is both ionically and electrically conductive. Stated differently, negative electrode current collector layer 47 has a thickness, an electrical conductivity, and an ionic conductivity for carrier ions that facilitates the movement of carrier ions between an immediately adjacent negative electrode active material layer 49 on one side of the ionically permeable conductor layer and an immediately adjacent electrically insulating separator layer 43 on the other side of the negative electrode current collector layer in an electrochemical stack. On a relative basis, the negative electrode current collector layer has an electrical conductance that is greater than its ionic conductance when there is an applied current to store energy in the device or an applied load to discharge the device. For example, the ratio of the electrical conductance to the ionic conductance (for carrier ions) of the negative electrode current collector layer will typically be at least 1,000:1, respectively, when there is an applied current to store energy in the device or an applied load to discharge the device. By way of further example, in one such embodiment the ratio of the electrical conductance to the ionic conductance (for carrier ions) of the negative electrode current collector layer is at least 5,000:1, respectively, when there is an applied current to store energy in the device or an applied load to discharge the device. By way of further example, in one such embodiment the ratio of the electrical conductance to the ionic conductance (for carrier ions) of the negative electrode current collector layer is at least 10,000:1, respectively, when there is an applied current to store energy in the device or an applied load to discharge the device. By way of further example, in one such embodiment the ratio of the electrical conductance to the ionic conductance (for carrier ions) of the negative electrode current collector layer is at least 50,000:1, respectively, when there is an applied current to store energy in the device or an applied load to discharge the device. By way of further example, in one such embodiment the ratio of the electrical conductance to the ionic conductance (for carrier ions) of the negative electrode current collector layer is at least 100,000:

1, respectively, when there is an applied current to store energy in the device or an applied load to discharge the device.

In general, when negative electrode current collector layer 47 is an ionically permeable conductor layer, it will have a thickness of at least about 300 Angstroms. For example, in some embodiments it may have a thickness in the range of about 300-800 Angstroms. More typically, however, it will have a thickness greater than about 0.1 micrometers. In general, an ionically permeable conductor layer will have a thickness not greater than about 100 micrometers. Thus, for example, in one embodiment, negative electrode current collector layer 47 will have a thickness in the range of about 0.1 to about 10 micrometers. By way of further example, in some embodiments, negative electrode current collector layer 47 will have a thickness in the range of about 0.1 to about 5 micrometers. By way of further example, in some embodiments, negative electrode current collector layer 47 will have a thickness in the range of about 0.5 to about 3 micrometers. In general, it is preferred that the thickness of negative electrode current collector layer 47 be approximately uniform. For example, in one embodiment it is preferred that negative electrode current collector layer 47 have a thickness non-uniformity of less than about 25% wherein thickness non-uniformity is defined as the quantity of the maximum thickness of the layer minus the minimum thickness of the layer, divided by the average layer thickness. In certain embodiments, the thickness variation is even less. For example, in some embodiments negative electrode current collector layer 47 has a thickness non-uniformity of less than about 20%. By way of further example, in some embodiments negative electrode current collector layer 47 has a thickness non-uniformity of less than about 15%. In some embodiments the ionically permeable conductor layer has a thickness non-uniformity of less than about 10%.

In those embodiments in which negative electrode current collector layer 47 comprises an ionically permeable conductor material that is both ionically and electrically conductive, negative electrode current collector layer 47 may have an ionic conductance that is comparable to the ionic conductance of an adjacent electrically insulating separator layer 43 when a current is applied to store energy in the device or a load is applied to discharge the device, such as when a secondary battery is charging or discharging. For example, in one embodiment negative electrode current collector layer 47 has an ionic conductance (for carrier ions) that is at least 50% of the ionic conductance of the separator layer (i.e., a ratio of 0.5:1, respectively) when there is an applied current to store energy in the device or an applied load to discharge the device. By way of further example, in some embodiments the ratio of the ionic conductance (for carrier ions) of negative electrode current collector layer 47 to the ionic conductance (for carrier ions) of the separator layer is at least 1:1 when there is an applied current to store energy in the device or an applied load to discharge the device. By way of further example, in some embodiments the ratio of the ionic conductance (for carrier ions) of negative electrode current collector layer 47 to the ionic conductance (for carrier ions) of the separator layer is at least 1.25:1 when there is an applied current to store energy in the device or an applied load to discharge the device. By way of further example, in some embodiments the ratio of the ionic conductance (for carrier ions) of negative electrode current collector layer 47 to the ionic conductance (for carrier ions) of the separator layer is at least 1.5:1 when there is an applied current to store energy in the device or an applied load to discharge the device. By way of further example, in some embodiments the ratio of the ionic conductance (for carrier ions) of negative electrode current collector layer 47 to the ionic conductance (for carrier ions) of the separator layer is at least 2:1 when there is an applied current to store energy in the device or an applied load to discharge the device.

In one embodiment, negative electrode current collector layer 47 also has an electrical conductance that is substantially greater than the electrical conductance of negative electrode active material layer 49. For example, in one embodiment the ratio of the electrical conductance of negative electrode current collector layer 47 to the electrical conductance of negative electrode active material layer 49 is at least 100:1 when there is an applied current to store energy in the device or an applied load to discharge the device. By way of further example, in some embodiments the ratio of the electrical conductance of negative electrode current collector layer 47 to the electrical conductance of the negative electrode active material layer is at least 500:1 when there is an applied current to store energy in the device or an applied load to discharge the device. By way of further example, in some embodiments the ratio of the electrical conductance of negative electrode current collector layer 47 to the electrical conductance of the negative electrode active material layer is at least 1000:1 when there is an applied current to store energy in the device or an applied load to discharge the device. By way of further example, in some embodiments the ratio of the electrical conductance of negative electrode current collector layer 47 to the electrical conductance of the negative electrode active material layer is at least 5000:1 when there is an applied current to store energy in the device or an applied load to discharge the device. By way of further example, in some embodiments the ratio of the electrical conductance of negative electrode current collector layer 47 to the electrical conductance of the negative electrode active material layer is at least 10,000:1 when there is an applied current to store energy in the device or an applied load to discharge the device.

The thickness of negative electrode current collector layer 47 (i.e., the shortest distance between the separator and the negative electrode active material layer between which ionically permeable negative electrode current collector layer 47 is sandwiched) in this embodiment will depend upon the composition of the layer and the performance specifications for the electrochemical stack. In general, when a negative electrode current collector layer is an ionically permeable conductor layer, it will have a thickness of at least about 300 Angstroms. For example, in some embodiments it may have a thickness in the range of about 300-800 Angstroms. More typically, however, it will have a thickness greater than about 0.1 micrometers. In general, an ionically permeable conductor layer will have a thickness not greater than about 100 micrometers. Thus, for example, in one embodiment, negative electrode current collector layer 47 will have a thickness in the range of about 0.1 to about 10 micrometers. By way of further example, in some embodiments, negative electrode current collector layer 47 will have a thickness in the range of about 0.1 to about 5 micrometers. By way of further example, in some embodiments, negative electrode current collector layer 47 will have a thickness in the range of about 0.5 to about 3 micrometers. In general, it is preferred that the thickness of negative electrode current collector layer 47 be approximately uniform. For example, in one embodiment it is preferred that negative electrode current collector layer 47 have a thickness non-uniformity of less than about 25% wherein thickness non-uniformity is defined as the quantity of the maximum thickness of the layer minus the minimum thickness of the layer, divided by the average layer thickness. In certain embodiments, the thickness variation is even less. For example, in some embodiments negative electrode current collector layer 47 has a thickness non-uniformity of less than about 20%. By way of further example, in some embodiments negative electrode current collector layer 47 has a thickness non-uniformity of less than about 15%. In some embodiments the ionically permeable conductor layer has a thickness non-uniformity of less than about 10%.

In one preferred embodiment, negative electrode current collector layer 47 is an ionically permeable conductor layer comprising an electrically conductive component and an ion conductive component that contribute to the ionic permeability and electrical conductivity. Typically, the electrically conductive component will comprise a continuous electrically conductive material (such as a continuous metal or metal alloy) in the form of a mesh or patterned surface, a film, or composite material comprising the continuous electrically conductive material (such as a continuous metal or metal alloy). Additionally, the ion conductive component will typically comprise pores, e.g., interstices of a mesh, spaces between a patterned metal or metal alloy containing material layer, pores in a metal film, or a solid ion conductor having sufficient diffusivity for carrier ions. In certain embodiments, the ionically permeable conductor layer comprises a deposited porous material, an ion-transporting material, an ion-reactive material, a composite material, or a physically porous material. If porous, for example, the ionically permeable conductor layer may have a void fraction of at least about 0.25. In general, however, the void fraction will typically not exceed about 0.95. More typically, when the ionically permeable conductor layer is porous the void fraction may be in the range of about 0.25 to about 0.85. In some embodiments, for example, when the ionically permeable conductor layer is porous the void fraction may be in the range of about 0.35 to about 0.65.

Being positioned between negative electrode active material layer 49 and electrically insulating separator layer 43, negative electrode current collector layer 47 may facilitate more uniform carrier ion transport by distributing current from the negative electrode current collector across the surface of the negative electrode active material layer. This, in turn, may facilitate more uniform insertion and extraction of carrier ions and thereby reduce stress in the negative electrode active material during cycling; since negative electrode current collector layer 47 distributes current to the surface of the negative electrode active material layer facing the separator, the reactivity of the negative electrode active material layer for carrier ions will be the greatest where the carrier ion concentration is the greatest.

Figure 21:
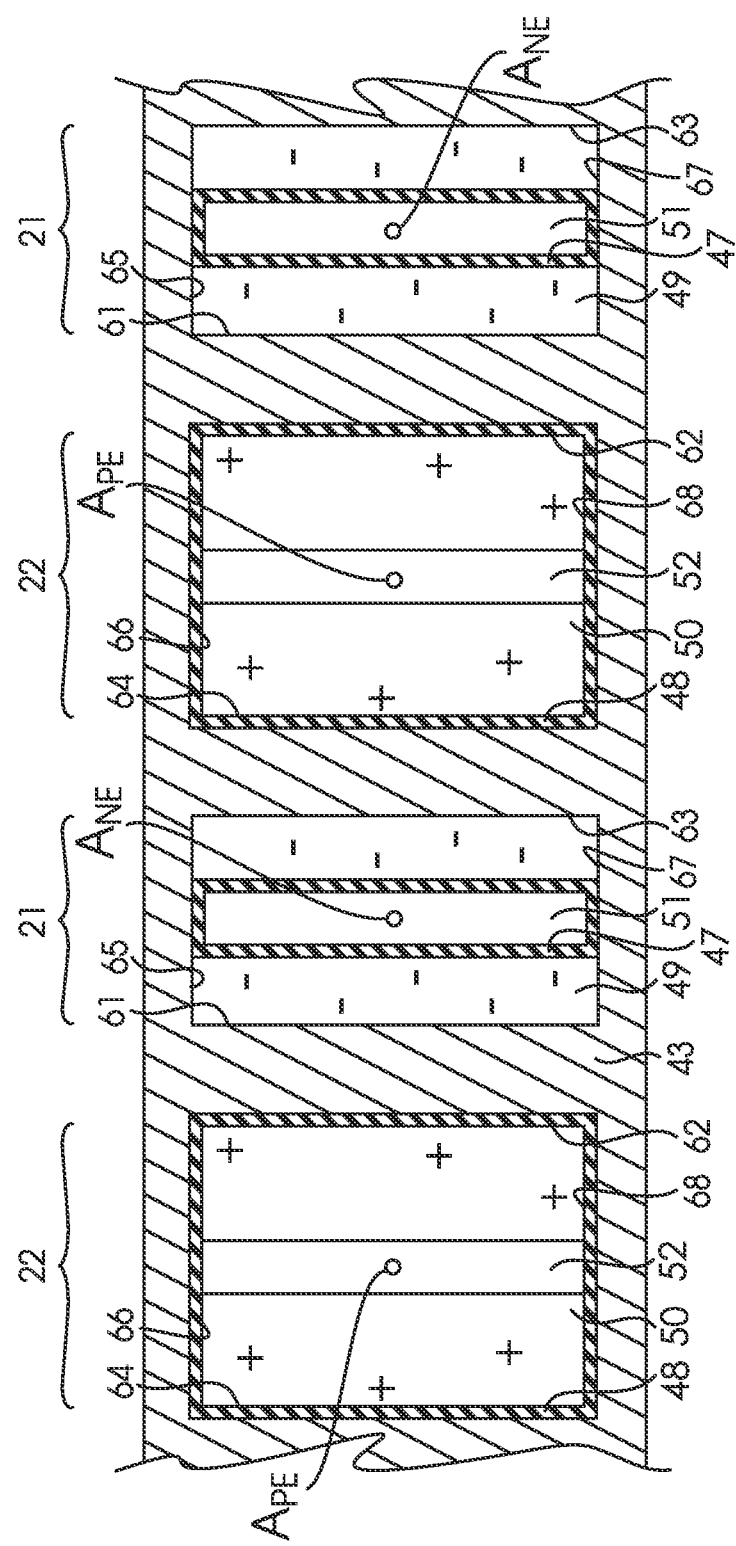
FIG. 21 is of a cross-section of an alternative embodiment of the electrode structure of FIG. 2 taken in the plane containing the line 3-3.

Referring now to FIG. 21, in an alternative embodiment, positive electrode active material layer 50 is between positive electrode backbone 52 and positive electrode current collector layer 48. In this embodiment, positive electrode current collector layer 48 comprises an ionically permeable conductor material that is both ionically and electrically conductive. Stated differently, the positive electrode current collector layer has a thickness, an electrical conductivity, and an ionic conductivity for carrier ions that facilitates the movement of carrier ions between an immediately adjacent positive electrode active material layer 50 on one side of the ionically permeable conductor layer and an immediately adjacent electrically insulating separator layer 43 on the other side of the positive electrode current collector layer in an electrochemical stack. On a relative basis in this embodiment, the positive electrode current collector layer has an electrical conductance that is greater than its ionic conductance when there is an applied current to store energy in the device or an applied load to discharge the device. For example, the ratio of the electrical conductance to the ionic conductance (for carrier ions) of the positive electrode current collector layer will typically be at least 1,000:1, respectively, when there is an applied current to store energy in the device or an applied load to discharge the device. By way of further example, in one such embodiment the ratio of the electrical conductance to the ionic conductance (for carrier ions) of the positive electrode current collector layer is at least 5,000:1, respectively, when there is an applied current to store energy in the device or an applied load to discharge the device. By way of further example, in one such embodiment the ratio of the electrical conductance to the ionic conductance (for carrier ions) of the positive electrode current collector layer is at least 10,000:1, respectively, when there is an applied current to store energy in the device or an applied load to discharge the device. By way of further example, in one such embodiment the ratio of the electrical conductance to the ionic conductance (for carrier ions) of the positive electrode current collector layer is at least 50,000:1, respectively, when there is an applied current to store energy in the device or an applied load to discharge the device. By way of further example, in one such embodiment the ratio of the electrical conductance to the ionic conductance (for carrier ions) of the positive electrode current collector layer is at least 100,000:1, respectively, when there is an applied current to store energy in the device or an applied load to discharge the device.

Figure 22:
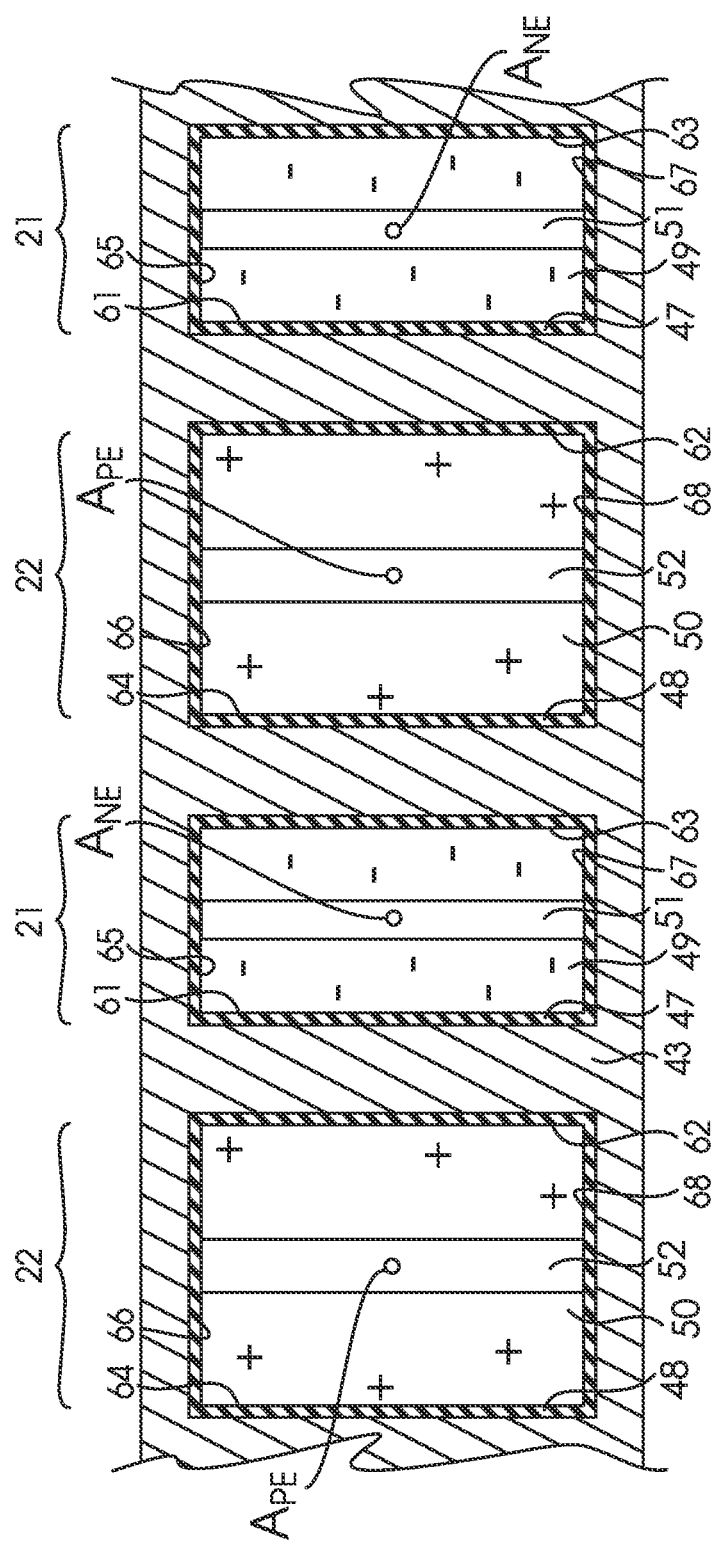
FIG. 22 is an alternative embodiment of a cross-section of the electrode structure of FIG. 2 taken in the plane containing the line 3-3.

Referring now to FIG. 22, in one alternative embodiment, negative electrode active material layer 49 is between negative electrode backbone 51 and negative electrode current collector layer 47 and positive electrode active material layer 50 is between positive electrode backbone 52 and positive electrode current collector layer 48. In this embodiment, negative electrode current collector layer 47 and positive electrode current collector layer 48 comprise an ionically permeable conductor material that is both ionically and electrically conductive. Stated differently, the negative electrode current collector layer and the positive electrode current collector layer each have a thickness, an electrical conductivity, and an ionic conductivity for carrier ions that facilitates the movement of carrier ions between an immediately adjacent positive electrode active material layer 50 and a negative electrode active material layer 49. On a relative basis in this embodiment, the positive electrode current collector layer and the negative electrode current collector layers each have an electrical conductance that is greater than its ionic conductance when there is an applied current to store energy in the device or an applied load to discharge the device as previously described. For example, the ratio of the electrical conductance to the ionic conductance (for carrier ions) of the positive electrode current collector layer and the negative electrode current collector layer in this embodiment will typically be at least 1,000:1, respectively, when there is an applied current to store energy in the device or an applied load to discharge the device.

Referring now to FIGS. 21 and 22, in one alternative embodiment negative electrode 21 comprises negative electrode backbone 51, negative electrode active material layer 49, negative electrode current collector layer 47 and supplemental negative electrode current collector layers 47A, 47B and positive electrode 22 comprises positive electrode backbone 52, positive electrode active material layer 50, positive electrode current collector layer 48 and supplemental positive electrode current collector layers 48A, 48B. Supplemental negative electrode current collectors may be incorporated into the negative electrode population members and/or the positive electrode population members to provide additional electrical conductance.

In certain embodiments, the supplemental negative electrode current collector has an electrical conductance that exceeds the electrical conductance of the negative electrode current collector by a factor of at least 2; in certain embodiments, the electrical conductance of the supplemental negative electrode current collector exceeds the electrical conductance of the negative electrode current collector by a factor of at least 5 or even 10. Advantageously, the additional electrical conductance provided by the supplemental negative electrode current collector allows the overall current collector weight and volume requirement of the negative electrode current collector layer 47. Additionally, when the negative electrode current collector layer is an ionically permeable current collector (as described more fully elsewhere herein), the supplemental negative electrode current collector current collector may carry the majority of the current along the electrode length $L_{NE}$ and the negative electrode current collector layer can function to primarily collect the current from the electrode and provide it to the supplemental negative electrode current collector. This in turn reduces the electronic conductance required from the ionically permeable current collector layer, and allows for the ability to design the ionically permeable layer to have a lower electronic conductivity and higher ionic conductivity for better cell performance.

Figure 23:
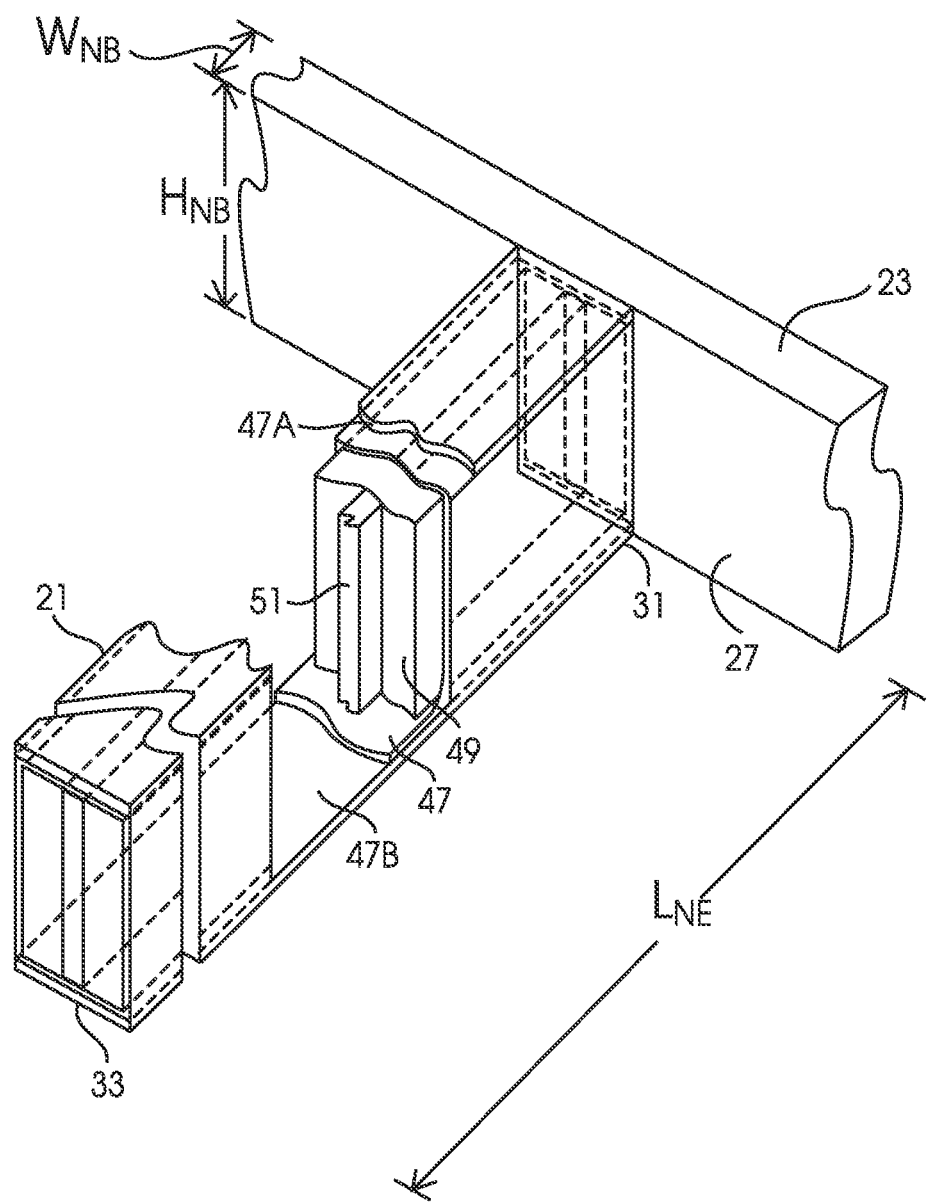
FIG. 23 is a fragmentary perspective view of a subassembly of an alternative embodiment of the electrode structure of FIG. 4 taken along line 5 with parts broken away to show internal construction.

Referring now to FIG. 23, in one embodiment negative electrode current conductor layer 47 comprised by each member 21 of the negative electrode population has length $L_{NC}$ that is at least 50% of the length $L_{NE}$ of the member comprising such negative electrode current collector. By way of further example, in one embodiment negative electrode current conductor layer 47 comprised by each member 21 of the negative electrode population has a length $L_{NC}$ that is at least 60% of the length $L_{NE}$ of the member comprising such negative electrode current collector. By way of further example, in one embodiment the negative electrode current conductor layer 47 comprised by each member 21 of the negative electrode population has a length $L_{NC}$ that is at least 70% of the length $L_{NE}$ of the member comprising such negative electrode current collector. By way of further example, in one embodiment negative electrode current conductor layer 47 comprised by each member 21 of the negative electrode population has a length $L_{NC}$ that is at least 80% of the length $L_{NE}$ of the member comprising such negative electrode current collector. By way of further example, in one embodiment negative electrode current conductor layer 47 comprised by each member 21 of the negative electrode population has a length $L_{NC}$ that is at least 90% of length $L_{NE}$ of the member comprising such negative electrode current collector.

In some embodiments, the supplemental negative electrode current collector can provide a means for blocking the charge/discharge reactions at certain locations along the electrode. Supplemental current collectors 47A, 47B can be designed such that the ionic conductivity of this layer is essentially zero, which inhibits the charge/discharge reaction on the electrode that is directly under the supplemental current collector.

In each of the foregoing embodiments, supplemental negative electrode current collector layers 47A, 47B independently have a length (measured in the same direction as the length $L_{NC}$) that is the same as, a substantial fraction of (e.g., at least 60%, at least 70%, at least 80% or even at least 90% of the length $L_{NC}$ of the negative electrode current collector layer 47. Alternatively, in each of the foregoing embodiments, supplemental negative electrode current collector layers 47A, 47B independently have a length (measured in the same direction as the length $L_{NC}$) that is less than a substantial fraction of (e.g., less than 40%, 30%, 20% or even 10% of the length $L_{NC}$ of the negative electrode current collector layer 47. Length $L_{NE}$ of each of the members 21 of the negative electrode population will vary depending upon the energy storage device and its intended use, but in many embodiments will be within the range of about 5 mm to about 500 mm. For example, in one embodiment, length $L_{NE}$ for each of member 21 will be within the range of about 10 mm to about 250 mm. By way of further example, in one embodiment, length $L_{NE}$ for each of member 21 will be in the range of about 25 mm to about 100 mm.

Supplemental negative electrode current collector layers 47A and 47B may comprise any of the materials previously identified in connection with negative electrode current collector layer 47. Because supplemental negative electrode current collector layers 47A and 47B are not between the negative and positive electrode active material layers, they need not be ionically permeable to carrier ions. Thus, supplemental negative electrode current collector layers 47A, 47B may comprise any metal or other conductor conventionally used as a current collector material for negative electrodes such as carbon, cobalt, chromium, copper, nickel, titanium, or an alloy of one or more thereof. Additionally, in one embodiment, supplemental negative electrode current collector layers 47A, 47B independently have an electrical conductance that exceeds the electrical conductance of negative electrode current collector layer 47. For example, in one embodiment, at least one of supplemental negative electrode current collector layers 47A, 47B has an electrical conductance that is at least 200%, e.g., at least 1000%, of the electrical conductance of negative electrode current collector layer.

Figure 24:
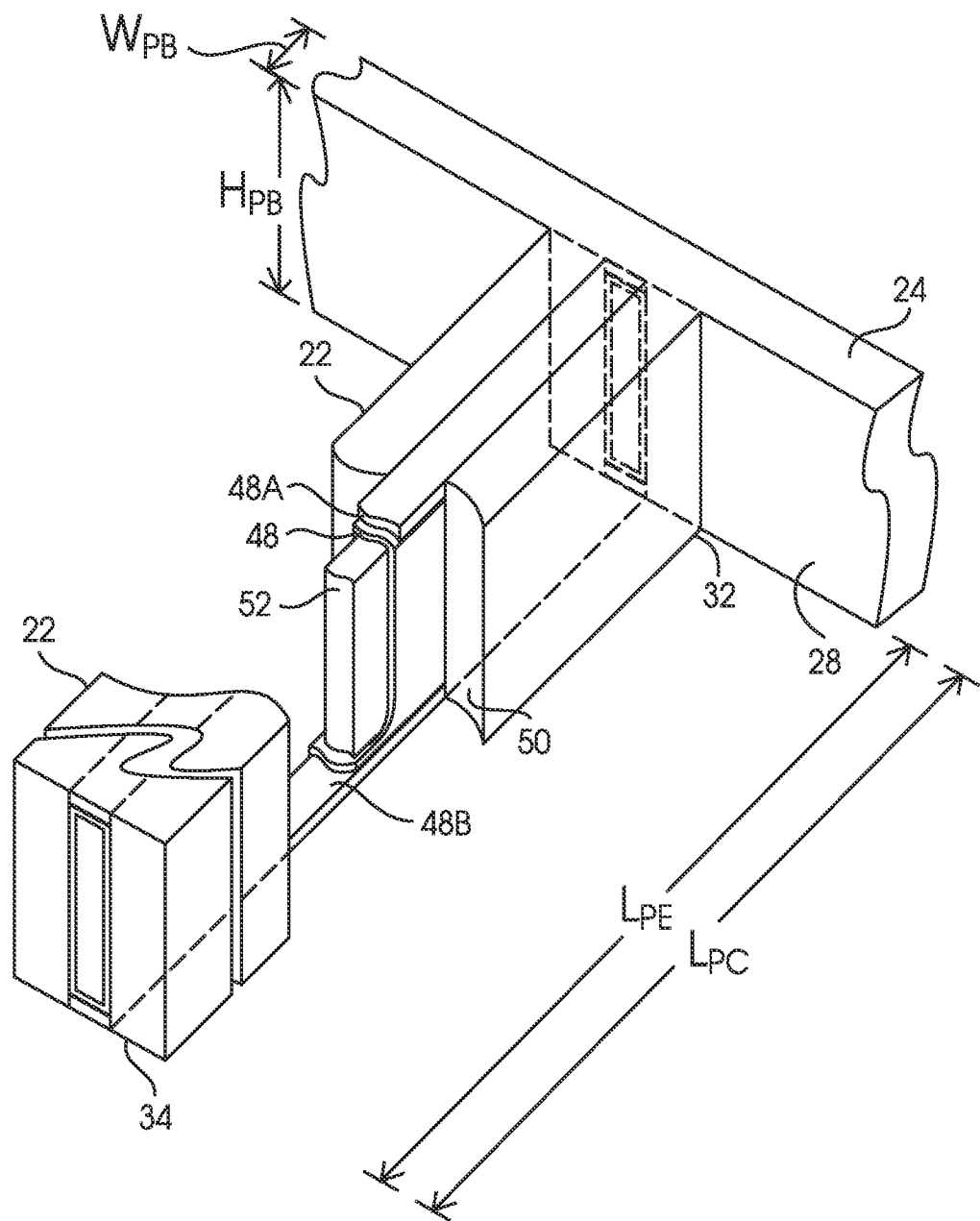
FIG. 24 is a fragmentary perspective view of a subassembly of an alternative embodiment of the electrode structure of FIG. 4 taken along line 6 with parts broken away to show internal construction.

Referring now to FIG. 24, positive electrode backbone 52, positive electrode active material layer 50, and positive electrode current collector layer 48 and supplemental positive electrode current collector layers 48A, 48B preferably extend a majority of the distance from bottom 32 to top 34 of each member 22 of the negative electrode population. Supplemental positive electrode current collectors may be incorporated into the positive electrode population members to provide additional electrical conductance. In certain embodiments, the supplemental positive electrode current collector has an electrical conductance that exceeds the electrical conductance of the positive electrode current collector by a factor of at least 2; in certain embodiments, the electrical conductance of the supplemental positive electrode current collector exceeds the electrical conductance of the positive electrode current collector by a factor of at least 5 or even 10. Advantageously, the additional electrical conductance provided by the supplemental positive electrode current collector allows the overall current collector weight and volume requirement of the positive electrode current collector layer 48 to be reduced. Additionally, when the positive electrode current collector layer is an ionically permeable current collector (as described more fully elsewhere herein), the supplemental positive electrode current collector may carry the majority of the current along the electrode length $L_{PE}$ and the positive electrode current collector layer can function to primarily collect the current from the electrode and provide it to the supplemental positive electrode current collector. This in turn reduces the electronic conductance required from the ionically permeable current collector layer, and allows for the ability to design the ionically permeable layer to have a lower electronic conductivity and higher ionic conductivity for better cell performance.

Supplemental positive electrode current collector layers 48A and 48B may comprise any of the materials previously identified in connection with positive electrode current collector layer 48. Additionally, in one embodiment, at least one of supplemental positive electrode current collector layers 48A, 48B has an electrical conductance that exceeds the electrical conductance of positive electrode current collector layer 48. For example, in one embodiment, at least one of supplemental positive electrode current collector layers 48A, 48B has an electrical conductance that is at least 200-1,000% of the electrical conductance of positive electrode current collector layer.

In some embodiments, the supplemental positive electrode current collector can provide a means for blocking the charge/discharge reactions at certain locations along the electrode. Supplemental current collectors 48A, 48B can be designed such that the ionic conductivity of this layer is essentially zero, which inhibits the charge/discharge reaction on the electrode that is directly under the supplemental current collector.

For example, in one embodiment the positive electrode current conductor layer 48 comprised by each member 22 of the positive electrode population has a length $L_{PC}$ that is at least 50% of the length $L_{PE}$ of the member comprising such positive electrode current collector. By way of further example, in one embodiment the positive electrode current conductor layer 48 comprised by each member 22 of the positive electrode population has a length $L_{PC}$ that is at least 60% of the length $L_{PE}$ of the member comprising such positive electrode current collector. By way of further example, in one embodiment the positive electrode current conductor layer 48 comprised by each member 22 of the positive electrode population has a length $L_{PC}$ that is at least 70% of the length $L_{PE}$ of the member comprising such positive electrode current collector. By way of further example, in one embodiment the positive electrode current conductor layer 48 comprised by each member 22 of the positive electrode population has a length $L_{PC}$ that is at least 80% of the length $L_{PE}$ of the member comprising such positive electrode current collector. By way of further example, in one embodiment the positive electrode current conductor layer 48 comprised by each member 22 of the positive electrode population has a length $L_{PC}$ that is at least 90% of the length $L_{PE}$ of the member comprising such positive electrode current collector. In each of the foregoing embodiments, the supplemental positive electrode current collector layers 48A, 48B independently have a length (measured in the same direction as the length $L_{PC}$) that is the same as, a substantial fraction of (e.g., at least 60%, at least 70%, at least 80% or even at least 90% of the length $L_{PC}$ of the positive electrode current collector layer 48. Alternatively, in each of the foregoing embodiments, the supplemental positive electrode current collector layers 48A, 48B independently have a length (measured in the same direction as the length $L_{PC}$) that is less than a substantial fraction of (e.g., less than 40%, less than 30%, less than 20% or even less than 10% of the length $L_{PC}$ of the positive electrode current collector layer 48. The length $L_{PE}$ of each of the members 22 of the positive electrode population will vary depending upon the energy storage device and its intended use, but in many embodiments will be within the range of about 5 mm to about 500 mm. For example, in one embodiment, length $L_{PE}$ for each of member 21 will be within the range of about 10 mm to about 250 mm. By way of further example, in one embodiment, length $L_{PE}$ for each of member 21 will be in the range of about 25 mm to about 100 mm.

Supplemental negative electrode current collector layers 47A, 47B and/or supplemental positive electrode current collector layers 48A, 48B may provide improved rate performance in certain embodiments. The supplemental positive and/or negative current collectors may be formed on the electrode structure using similar methods as those described in connection with the formation of the positive and negative electrode current collectors. Known methods for masking and patterning may be used to prepare the backbones for selectively depositing the supplemental current collectors at the desired areas. In some instances, the deposition of the current collector would be performed after the active electrode is deposited in order to provide an ionically permeable current collection scheme.

Referring again to FIGS. 4 and 5, in certain embodiments members 21 of the negative electrode population will have straight sides (i.e., each of the sides extending between bottom 31 and top 33 is planar). In other embodiments, the negative electrode population members will have sides that are polygonal or even curved (e.g., the sides extending between bottom 31 and top 33 may be sinusoidal). In each such embodiment, length $L_{NE}$ is the straight-line distance between bottom 31 and top 33.

Referring again to FIGS. 4 and 6, in certain embodiments members 22 of the positive electrode population will have straight sides (i.e., each of the sides extending between bottom 32 and top 34 is planar). In other embodiments, the positive electrode population members will have sides that are polygonal or even curved (e.g., the sides extending between bottom 32 and top 34 may be sinusoidal). In each such embodiment, length $L_{PE}$ is the straight-line distance between bottom 32 and top 34.

In the embodiment illustrated in FIG. 7, negative electrode population members 21 have a constant width $W_{NE}$ and a constant height $H_{NE}$ as a function of length. In other embodiments, the negative electrode population members 21 may have a width $W_{NE}$ or height $H_{NE}$ that varies as a function of position along the negative electrode length or the negative electrode population members may have a cross-section (taken in a plane that is normal to the length direction) that is other than rectangular. In such other embodiments, width $W_{NE}$ and height $H_{NE}$ refer to the maximum width and the maximum height of a projection of the negative electrode population members 21 in a plane that is normal to the length direction of the negative electrode population members 21. Stated differently, width $W_{NE}$ and height $H_{NE}$ correspond to the lengths of two adjacent sides of an imaginary rectangle lying in the plane that has the smallest dimensions but yet contains all of the points of the projection of the negative electrode population members.

In the embodiment illustrated in FIG. 8, positive electrode population members 22 have a constant width $W_{PE}$ and a constant height $H_{PE}$ as a function of length. In other embodiments, the negative electrode population members 22 may have a width $W_{PE}$ or height $H_{PE}$ that varies as a function of position along the negative electrode length or the negative electrode population members may have a cross-section (taken in a plane that is normal to the length direction) that is other than rectangular. In such other embodiments, width $W_{PE}$ and height $H_{PE}$ refer to the maximum width and the maximum height of a projection of the positive electrode population members 22 in a plane that is normal to the length direction of the positive electrode population members 22. Stated differently, width $W_{PE}$ and height $H_{PE}$ correspond to the lengths of two adjacent sides of an imaginary rectangle lying in the plane that has the smallest dimensions but yet contains all of the points of the projection of the positive electrode population members.

Figure 25A:
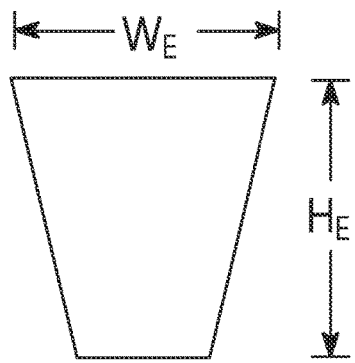
FIGS. 25A-E are cross-sections of alternative embodiments of an electrode (positive electrode or negative electrode) of the present invention.
Figure 25B:
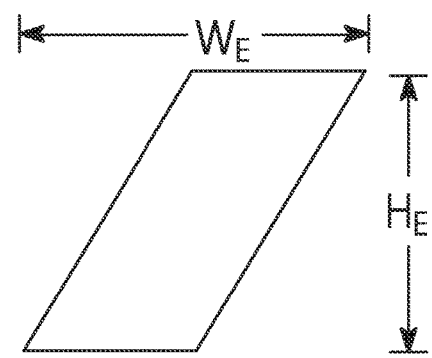
Figure 25C:
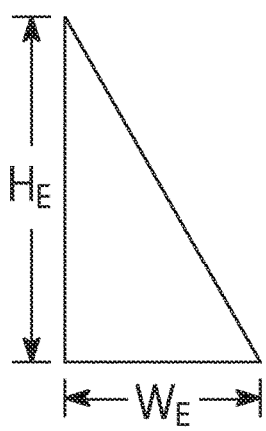
Figure 25D:
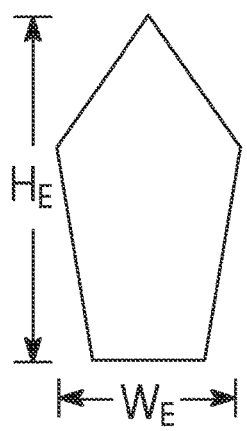
Figure 25E:
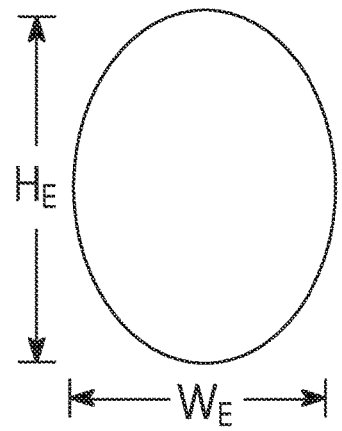

FIGS. 25A-E illustrative several alternative projections of an electrode (positive or negative electrode) in a plane that is normal to the length direction of the electrode. In FIGS. 25A-E, the projection of the electrode traces a trapezoid (FIG. 25A), a parallelogram (FIG. 25B), a triangle (FIG. 25C), a diamond (FIG. 25D), and an oval (FIG. 25E). In each instance, an imaginary rectangle having the smallest dimensions but yet containing all of the points of the projection of the electrode would have width $W_E$ and height $H_E$. In addition, in each of these instances, the electrode would have a perimeter $P_E$ corresponding to the circumference to the geometric figure traced by the projection.

Figure 26:
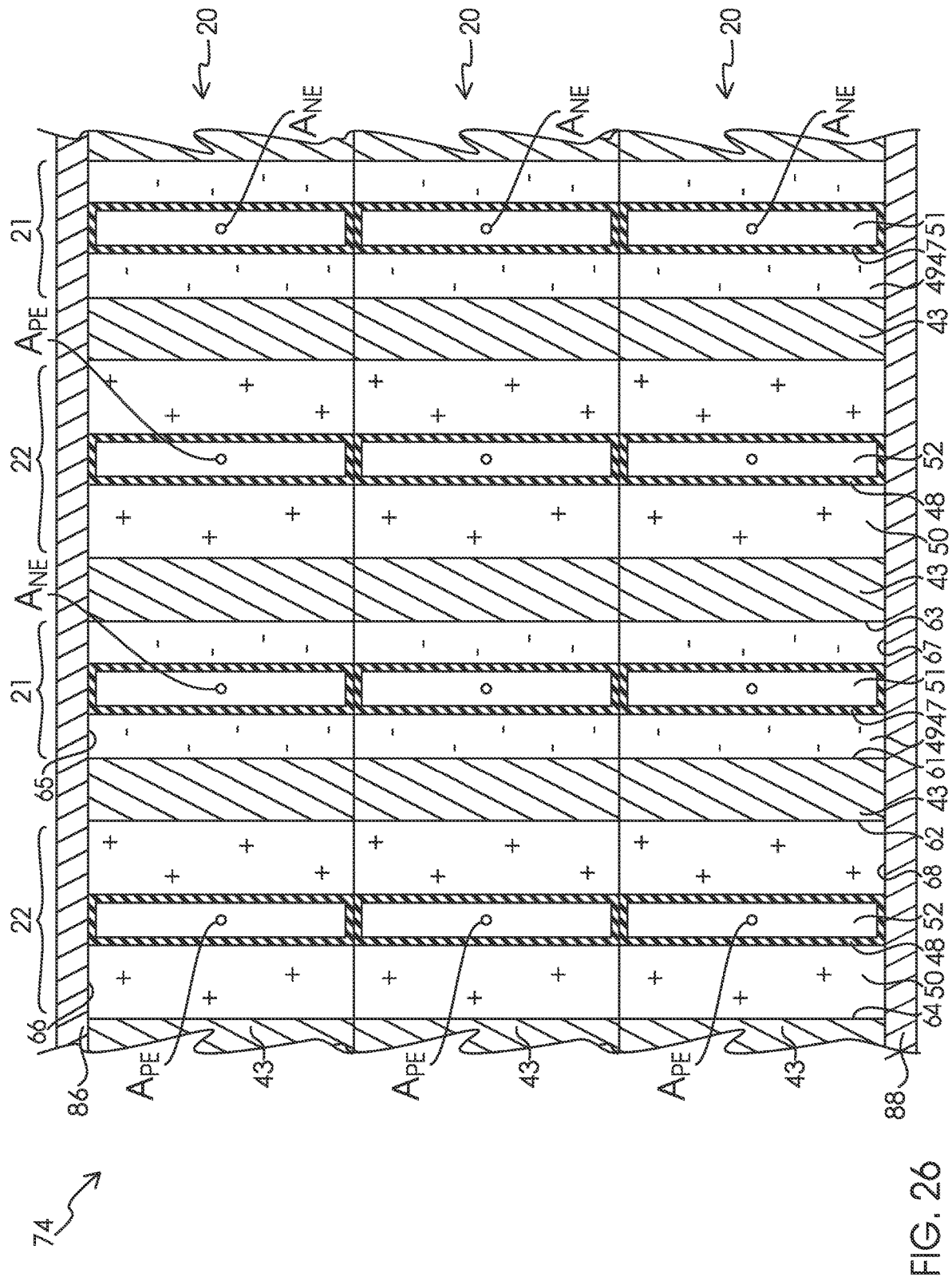
FIG. 26 is a cross-section of an alternative embodiment of an electrode stack of the present invention.

Referring now to FIG. 26, in one alternative embodiment an electrode stack 74 comprises three electrode structures 20 stacked vertically and aligned such that positive electrodes 22 of the three electrodes are aligned and negative electrode structures 21 are aligned. In this embodiment, electrically insulating material layer 86 covers front surfaces 65, 66 of members 21, 22 of the top electrode structure in the stack and electrically insulating material layer 88 covers back surfaces 67, 68 of members 21, 22 of the bottom electrode structure in the stack. As a result, members 21 of different electrode structure are not electrically isolated from each other, but they are electrically isolated from members 22 of the different electrode structures in the stack. As a result, each positive electrode structure 22 is surrounded by electrically insulating material layers 43, 86 and 88 and each negative electrode structure 21 is surrounded by electrically insulating layers 43, 86, and 88. For ease of illustration, electrode stack 74 comprises only three electrode structures. As described in connection with FIG. 10, electrode stack 74 may comprise a lesser or greater number of electrode structures 20.

Figure 27:
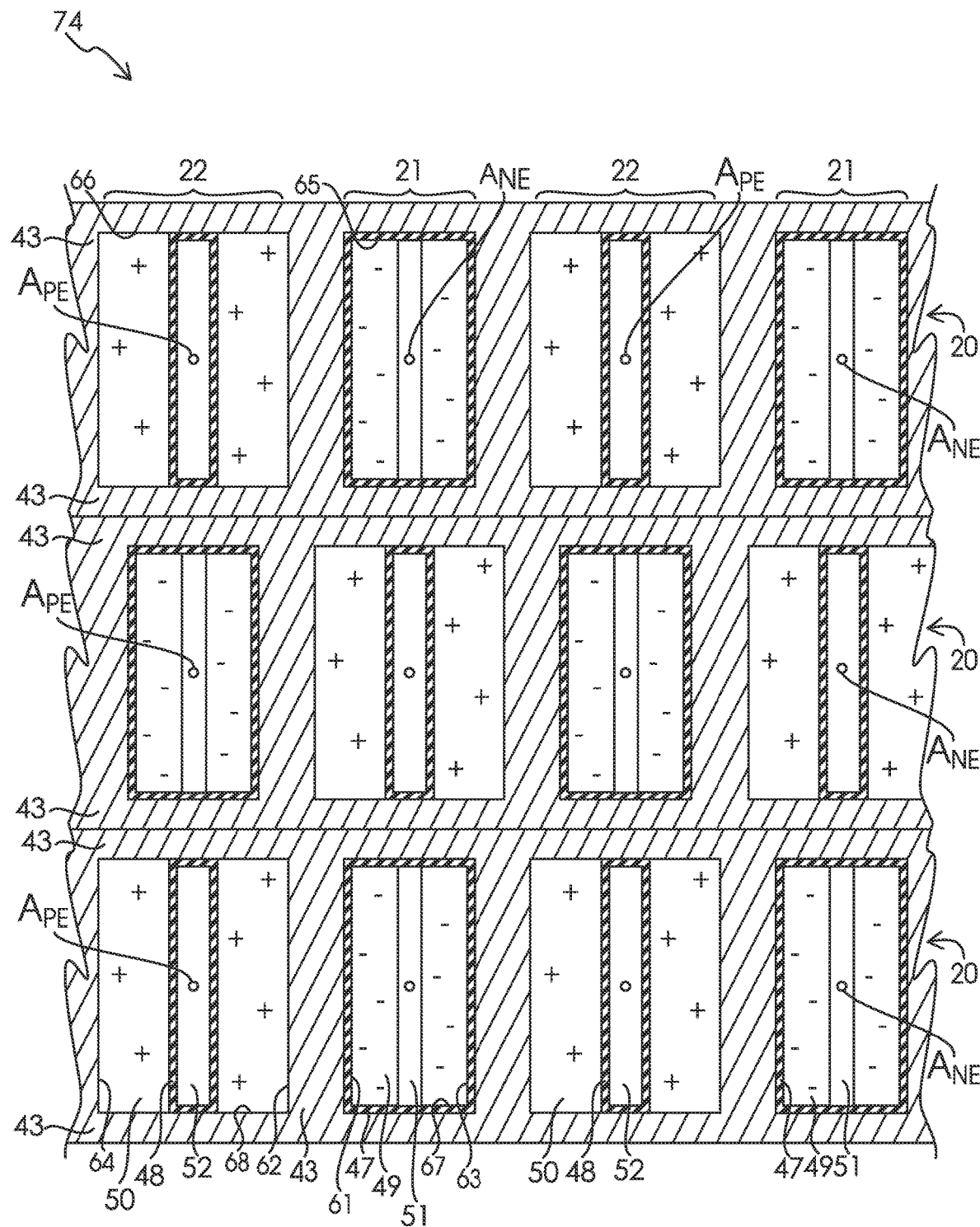
FIG. 27 is a cross-section of an alternative embodiment of an electrode stack of the present invention.

Referring now to FIG. 27, in one alternative embodiment an electrode stack 74 comprises three electrode structures 20 stacked vertically and aligned such that a member 22 of the population of positive electrodes of an electrode structure is aligned with and above and/or below a member 21 of the population of negative electrodes of another electrode structure 20. In this embodiment, each member 21 and each member 22 is surrounded by electrically insulating layer 43. For ease of illustration, electrode stack 74 comprises only three electrode structures. As described in connection with FIG. 10, electrode stack 74 may comprise a lesser or greater number of electrode structures 20.

The following non-limiting examples are provided to further illustrate the present invention.

EXAMPLES

Example 1: 3D Single Cell Fabrication 1

1. Comb Structure Fabrication

A silicon on insulator (SOI) wafer with a layer thickness of 200 μm/3 μm/675 μm (device layer/insulating layer/backing layer) was used as the sample. 1000 Å of Pd was sputter deposited on top of the device layer followed by a hard mask layer of 2000 Å silicon dioxide.

This wafer was then spin coated with 5 μm of resist and patterned with a mask to obtain a comb shaped structure with two interdigitated combs isolated from each other.

The design shows a structure that results in two independent comb shape structures with each structure terminating in a landing pad suitable for making electrical contact. The gap between the adjacent waves was designed at 100 microns. The length of each of the lines was 10000 microns, with an edge to edge spacing of 200 microns on either ends, i.e. between the ends of the comb and the opposing electrode connections. Said differently, the spacing was 200 um between the top of negative electrode comb consituting a part of the negative electrode 21 and the bottom of the positive electrode comb constituting the positive electrode 22 in FIG. 9. The photoresist in this pattern was then used as a photomask to remove the silicon dioxide and Palladium by Ion Milling.

The combination of silicon dioxide, photoresist, and Pd was used as a mask for Silicon removal using Deep Reactive Ion Etching (DRIE) in a Fluoride plasma. The DRIE was performed until the silicon constituting the device layer in the mask gaps was completely removed, stopping on the oxide layer. The overetch time used was 10% of the total DRIE time in order to remove islands of silicon in the trench floor. Any top photoresist was removed by stripping in acetone. At this point the two combs are electrically isolated by the DRIE.

The positive electrode pad and the negative electrode pad were alone immersed in dilute (5:1) Buffered Oxide Etch (BOE) solution for 1 minute to remove the masking oxide layer in order to provide access to the palladium metal to make electrical contact. The comb structure with isolated negative electrode combs and positive electrode combs were used as the base structure for current collector and electrode fabrication.

2. Negative Electrode Current Collector and Negative Electrode Fabrication

One of the isolated pair of comb-like structures (herein named the negative electrode backbone comb) was electrically connected through the palladium conductor and was immersed in a copper plating bath. The copper plating bath conditions were adjusted such that the deposition happened on the silicon layer constituting the comb structure. This Cu layer deposited thusly serves as the negative electrode current collector.

The sample was immersed in an electrophoretic resist bath and the positive electrode backbone comb structure was subsequently energized. A commercially available electrophoretic resist was used (Shipley EAGLE), and the comb was electrophoretically deposited at 50 V for 120 seconds using the Pd conductor to form a resist coating. The die was baked at 120 C for 30 min to harden the resist.

The silicon sample is now inserted into an evaporation chamber, and 20 Å Au is deposited on the sample surface. This Au deposition process results in Au on the top of the honeycomb structures as well as on its sidewalls, as well as on the bottom oxide layer. However, the photoresist being present on the positive electrode backbone comb causes the Au to be in contact with the copper on the negative electrode backbone comb structure only. The silicon backing layer was protected at this time by an adhesive tape mask. The sample is subsequently immersed in acetone for 15 min to remove the electrophoretic resist alongwith the evaporated Au on top of the electrophoretic resist. The sample is then immersed in a solution of dilute (5:1) Buffered Oxide Etch (BOE) to remove the Au clusters and the oxide layer from the front face of the negative electrode comb and the insulating layer at the bottom of the trench. This isolates the Au nanoclusters to the sides of the negative electrode backbone comb only.

Silicon nanowires are then grown on the sides of the negative electrode backbone comb structure by CVD method. The sample is inserted into a CVD chamber and heated to 550 C. Silane gas is introduced into the chamber; the reactor pressure was kept at 10 Torr. The deposition rate was 4 um/hr; and the deposition was done to a target nanowire thickness of 20 um. These nanowires extending out from the sides of the negative electrode backbone comb was to serve as the negative electrode for the lithium-ion battery.

3. Positive Electrode Current Collector and Positive Electrode Fabrication.

The positive electrode backbone comb was then electrically connected through the palladium conductor and was immersed in a gold electroplating bath to plate gold on the palladium and the silicon layer constituting the comb structure. This Au layer surrounding the positive electrode backbone comb will serve as the positive electrode current collector.

The positive electrode backbone comb was electrophoretically deposited with a lithium ion battery positive electrode material. The Electrophoretic deposition solution contained the positive electrode material (LiCoO2), 15 wt % Carbon black, and 150 ppm of Iodine in a solution of acetone. The solution mixture was stirred overnight in order to disperse the particles uniformly. The Pd contact pad was used as the terminal for electrical connection for the positive electrode deposition. A Pt counter electrode was used. The sample was deposited for 3 min at a voltage of 100V to deposit a 40 um thick positive electrode structure. The deposition occurred on both the sidewalls and the front face of the positive electrode comb.

4. Excess Positive Electrode Removal

Any excess positive electrode that was deposited on the front face of the die was removed using mechanical removal processes. The front face was lapped using a polishing pad to expose the positive electrode current collector layer; followed by forced air drying to ensure no loose particles that can cause shorts are present on the die.

5. Separator Layer No. 1 Fabrication

The porous separator is applied into the gap (which is nominally 40 microns) between the positive electrode and the negative electrode by using a slurry comprising fine glass powder (<2 microns in diameter) dispersed in N-methyl pyrollidone along with a PVDF binder of 2 volume percent with a solids content of 60% as made. This slurry is screen printed so as to wet the die and force the particulate matter to go in between the negative electrode and the positive electrode materials. The screen printing is done in multiple passes with an intermediate drying step in between so as to fill the trenches between the negative electrode and positive electrode; and the gaps along the top and the bottom of the device (areas that constitute 82 and 84 in FIG. 19).

Any excess separator that was deposited on the front face of the die was removed using mechanical removal processes. The front face was lapped using a polishing pad to expose the electrode current collector layers; followed by forced air drying to ensure no loose particles that can cause shorts are present on the die.

6. Structural Layer Removal

The top side of the die is subsequently bonded to a sacrificial glass substrate with the aid of a UV release dicing tape. This arrangement is used to mechanically remove the backing silicon layer using conventional wafer lapping techniques. The lapping process is carried on until the backing wafer and the intermediate oxide layer are removed. The UV release is used to remove the active die off the sacrificial glass substrate; thereby making the die ready for subsequent separator fill processing.

7. Separator Layer No. 2 Fabrication

An additional layer of porous separator is applied on the front face and the back face of the die by dip-coating the die in a slurry comprising fine glass powder (<2 microns in diameter) dispersed in N-methyl pyrollidone along with a PVDF binder of 2 volume percent with a solids content of 30% as made. The dip coated die is dried in order to remove the solvent and solidify the binder material (at this stage, the cross section of the device looks like FIG. 15, except for the lack of current collector 47 and 48 on the bottom face of the silicon.) The dip coating thickness on the front face and the back face was targeted to 25 microns each.

Example 2: 3D Single Cell Fabrication 2

1. Comb Structure Fabrication

A silicon wafer with a layer thickness of 200 μm was used as the sample. 1000 Å of Pd was sputter deposited on top of the device layer followed by a hard mask layer of 2000 Å silicon dioxide. The wafer was flipped around and 1500 Å of Cu was deposited on the bottom side.

This sample was then bonded anodically to a borofloat glass substrate using standard anodic bonding techniques.

This wafer was then spin coated with 5 μm of resist and patterned with a mask to obtain a comb shaped structure with two interdigitated combs separated from each other as shown in FIG. 1.

The design shows a structure that results in two independent comb shape structures with each structure terminating in a landing pad suitable for making electrical contact. The gap between the adjacent waves was designed at 100 microns. The length of each of the lines was 10000 microns, with an edge to edge spacing of 200 microns on either ends, i.e. between the ends of the comb and the opposing electrode connections. Said differently, the spacing was 200 um between the top of negative electrode comb consituting a part of the negative electrode 21 and the bottom of the positive electrode comb constituting the positive electrode 22 in FIG. 9. The photoresist in this pattern was then used as a photomask to remove the silicon dioxide and Palladium by Ion Milling.

The combination of silicon dioxide, photoresist, and Pd was used as a mask for Silicon removal using Deep Reactive Ion Etching (DRIE) in a Fluoride plasma. The DRIE was performed until the silicon constituting the device layer in the mask gaps was completely removed, stopping on the oxide layer. The overetch time used was 10% of the total DRIE time in order to remove islands of silicon in the trench floor. Any top photoresist was removed by stripping in acetone. The die was subsequently dipped in 1% nitric acid solution to remove the copper at the bottom of the trenches and expose the anodic glass. At this point the two combs are electrically isolated by the DRIE.

The positive electrode pad and the negative electrode pad were alone immersed dilute (5:1) Buffered Oxide Etch (BOE) solution for 1 minute to remove the masking oxide layer in order to provide access to the palladium metal to make electrical contact. The comb structure with isolated negative electrode combs and positive electrode combs were used as the base structure for current collector and electrode fabrication.

2. Negative Electrode Current Collector and Negative Electrode Fabrication

The negative electrode current collector and negative electrodes were fabricated with a process similar to Example 1.

3. Positive Electrode Current Collector and Positive Electrode Fabrication.

The positive electrode current collector and positive electrodes were fabricated with a process similar to Example 1.

4. Separator Fabrication.

The porous separator is applied into the gap (which is nominally 40 microns) between the positive electrode and the negative electrode by using a slurry comprising fine glass powder (<2 microns in diameter) dispersed in N-methyl pyrollidone along with a PVDF binder of 2 volume percent with a solids content of 60% as made. This slurry is screen printed so as to wet the die and force the particulate matter to go in between the negative electrode and the positive electrode materials. The screen printing is done in multiple passes with an intermediate drying step in between so as to fill the trenches between the negative electrode and positive electrode; and the gaps along the top and the bottom of the device (areas that constitute 82 and 84 in FIG. 19). Subsequently, The porous separator is also applied on the front face of the die by dip-coating the die in a slurry comprising fine glass powder (<2 microns in diameter) dispersed in N-methyl pyrollidone along with a PVDF binder of 2 volume percent with a solids content of 30% as made. The dip coated die is dried in order to remove the solvent and solidify the binder material. The dip coating thickness on the front face was targeted to 25 microns. The resulting die looks similar to FIG. 15 except: (1) there is no current collector on the back face of 51 and 52, (2) anodic glass is 88, and (3) Glass powder with PVDF is 86.

Example 3: 3D Single Cell Fabrication 3

1. Comb Structure Fabrication

The comb structure was fabricated similar to Example 2.

2. Negative Electrode Current Collector and Negative Electrode Fabrication

The negative electrode current collector and negative electrodes were fabricated with a process similar to Example 1.

3. Positive Electrode Current Collector and Positive Electrode Fabrication

The positive electrode current collector and positive electrodes were fabricated with a process similar to Example 1.

4. Separator Layer no. 1 Fabrication

A separator layer was fabricated with a process similar to Example 1.

5. Structural Layer Removal

The structural layer was removed by a process similar to Example 1.

6. Separator Layer No. 2 Fabrication

A second separator layer was fabricated with a process similar to Example 1 to yield an electrode structure of the type illustrated in FIG. 15.

Example 4: 3D Single Cell Fabrication 4

1. Comb Structure Fabrication

The comb structure was fabricated similar to Example 2, except, the anodically bonded glass was a frame that was only contacting the negative electrode and positive electrode combs at the top and bottoms of the die in the longitudinal axis and the contact pad areas. In other words, for the majority of the length along the longitudinal axis $A_E$ in FIG. 4, the comb lines were designed to be freestanding. Said differently, the majority of the back face of the die was accessible to processing as well.

2. Negative Electrode Current Collector and Negative Electrode Fabrication

The negative electrode current collector and negative electrodes were fabricated with a process similar to Example 1.

3. Positive Electrode Current Collector and Positive Electrode Fabrication

The positive electrode current collector and positive electrodes were fabricated with a process similar to Example 1.

4. Excess Positive Electrode and Negative Electrode Material Removal

Any excess positive electrode and negative electrode materials that were deposited on the front and back face of the die were removed using mechanical removal processes. The front face was lapped using a polishing pad to expose the current collector layers. A doctor blade removal process was performed on the back face to remove excess electrode materials; followed by forced air drying to ensure no loose particles that can cause shorts are present on the die.

5. Separator Fabrication

The porous separator is applied into the gap (which is nominally 40 microns) between the positive electrode and the negative electrode, the front face, and the back face, by using a slurry comprising fine glass powder (<2 microns in diameter) dispersed in N-methyl pyrollidone along with a PVDF binder of 2 volume percent with a solids content of 60% as made. This slurry is screen printed so as to wet the die and force the particulate matter to go in between the negative electrode and the positive electrode materials. The screen printing is done in multiple passes with an intermediate drying step in between so as to fill the trenches between the negative electrode and positive electrode; and the gaps along the top and the bottom of the device (areas that constitute 82 and 84 in FIG. 19). Once this is complete, additional layers are added on to provide a separator layer covering the front and back faces of the die as well (see FIG. 3).

Example 5: 3D Single Cell Fabrication 5

1. Comb Structure Fabrication

The comb structure was fabricated as in Example 4.

2. Negative Electrode Current Collector and Negative Electrode Fabrication

The negative electrode current collector and negative electrodes were fabricated with a process similar to Example 1.

3. Positive Electrode Current Collector and Positive Electrode Fabrication

The positive electrode current collector and Positive electrodes were fabricated with a process similar to Example 1.

4. Excess Positive Electrode and Negative Electrode Material Removal

The excess materials were removed with a process similar to Example 4.

5. Separator Fabrication

A commercially available electrically insulating two part epoxy was dispensed with a syringe in order to fill up the top and bottom of the die corresponding to items 82 and 84 in FIG. 19. This provides a non-porous, insulating separator layer between the electrode and its opposing electrode bus.

The porous separator is subsequently applied into the gap (which is nominally 40 microns) between the positive electrode and the negative electrode, the front face, and the back face, by using a slurry comprising fine glass powder (<2 microns in diameter) dispersed in N-methyl pyrollidone along with a PVDF binder of 2 volume percent with a solids content of 60% as made. This slurry is screen printed so as to wet the die and force the particulate matter to go in between the negative electrode and the positive electrode materials. The screen printing is done in multiple passes with an intermediate drying step in between so as to fill the trenches between the negative electrode and positive electrode. Once this is complete, additional layers are added on to provide a separator layer covering the front and back faces of the die as well (see FIG. 3).

Example 6: 3D Single Cell Fabrication 6

1. Comb Structure Fabrication
The comb structure was fabricated as in Example 4.
2. Negative Electrode Current Collector and Negative Electrode Current Collector Fabrication
The two current collectors are fabricated as in example 1; except that the positive electrode current collector was fabricated immediately after the negative electrode current collector.
3. Separator Layer no. 1 Fabrication
A commercially available electrically insulating two part epoxy was dispensed with a syringe in order to fill up the top and bottom of the die corresponding to items 82 and 84 in FIG. 19. However, in this case, the epoxy is coats the negative electrode current collector and the positive electrode current collector instead of the respective electrodes as in Example 5. This provides a non-porous, insulating separator layer between the electrode and its opposing electrode bus.
4. Negative Electrode Fabrication, and Positive Electrode Fabrication
The negative electrodes and Positive electrodes were fabricated with a process similar to Example 4.
5. Excess Positive Electrode and Negative Electrode Removal
The excess materials were removed with a process similar to Example 4.
6. Separator Layer No. 2 Fabrication
A porous separator is subsequently applied into the gap (which is nominally 40 microns) between the positive electrode and the negative electrode, the front face, and the back face, by using a slurry comprising fine glass powder (<2 microns in diameter) dispersed in N-methyl pyrollidone along with a PVDF binder of 2 volume percent with a solids content of 60% as made. This slurry is screen printed so as to wet the die and force the particulate matter to go in between the negative electrode and the positive electrode materials. The screen printing is done in multiple passes with an intermediate drying step in between so as to fill the trenches between the negative electrode and positive electrode; and the gaps along the top and the bottom of the device (areas that constitute 82 and 84 in FIG. 19). Once this is complete, additional layers are added on to provide a separator layer covering the front and back faces of the die as well (See FIG. 3).

Example 7: 3D Single Cell Fabrication 7

1. Comb Structure Fabrication
The comb structure was fabricated as in example 4; except the gaps between the negative electrode comb and the positive electrode comb were reduced to 80 microns instead of 100 microns. The negative electrode comb layer was widened by 40 microns as well.
2. Negative Electrode and Negative Electrode Current Collector Fabrication
One of the isolated comb structures (herein named the positive electrode backbone comb) was immersed in an electrophoretic resist bath. A commercially available electrophoretic resist was used (Shipley EAGLE), and the positive electrode backbone comb was electrophoretically deposited at 50 V for 120 seconds using the Pd conductor to form a resist coating. The die was baked at 120 C for 30 min to harden the resist.

The silicon sample is now inserted into an evaporation chamber, and 100 Å Au is deposited on the sample surface. This Au deposition process results in Au on the top of the comb, its sidewalls, and on the bottom oxide layer. However, the photoresist being present on one of the combs causes the Au to be in contact with the silicon on only one of the two comb structures. The silicon backing layer was also protected at this time by an adhesive tape mask. This sample is subsequently immersed in a solution of 1:1 by volume of hydrofluoric acid (49%) and hydrogen peroxide (30%), at 30 C to form a porous silicon layer. The porous silicon depth was tailored by varying the etching time. The approximate rate of formation of porous silicon was 750-1000 nm/min. The parts were removed and dried when a the target pore depth of 20 μm was reached.

The porous silicon is only formed on the comb-set that did not have the electrophoretic resist patterned onto it. The porous silicon set is used as the negative electrode in a lithium ion battery. The electrophoretic resist was subseqently stripped in acetone for 15 minutes.

The negative electrode backbone comb was subsequently electrically connected through the palladium conductor and was immersed in a copper plating bath consisting of very dilute (10 mM) copper sulfate and sulfuric acid. The copper plating bath conditions were adjusted such that the deposition happened both on the palladium and the porous silicon. The copper concentration was kept low so that the copper deposition was transport limited and porous along the outer layer of the porous silicon. This Cu layer will serve as the negative electrode current collector that is also ionically permeable due to its porosity. The copper on the Pd layer, however, was thicker and non-porous to act as a secondary bussing collector for the negative electrode
3. Positive Electrode Current Collector and Positive Electrode Fabrication
The positive electrode current collector and positive electrodes were fabricated with a process similar to Example 1.
4. Excess Positive Electrode and Negative Electrode Removal
The excess materials were removed with a process similar to Example 4.
5. Separator Fabrication
The porous separator is subsequently applied into the gap (which is nominally 40 microns) between the positive electrode and the negative electrode, the front face, and the back face, by using a slurry comprising fine glass powder (<2 microns in diameter) dispersed in N-methyl pyrollidone along with a PVDF binder of 2 volume percent with a solids content of 60% as made. This slurry is screen printed so as to wet the die and force the particulate matter to go in between the negative electrode and the positive electrode materials. The screen printing is done in multiple passes with an intermediate drying step in between so as to fill the trenches between the negative electrode and positive electrode; and the gaps along the top and the bottom of the device (areas that constitute 82 and 84 in FIG. 19). Once this is complete, additional layers are added on to provide a separator layer covering the front and back faces of the die as well (see FIG. 20).

Example 8: 3D Single Cell Fabrication 8

1. Comb Structure Fabrication

The comb structure was fabricated as in example 4.

2. Negative Electrode and Negative Electrode Current Collector Fabrication

The negative electrode current collector was fabrication using a process similar to Example 1.

The negative electrode backbone comb was used to electrophoretically deposit graphite particles onto the comb surface using a non-aqueous electrophoretic deposition slurry. The deposition slurry consisted of graphite particles (mesocarbon microbeads, 95% by weight) and carbon black (5% by weight) dispersed in acetone with 25 ppm of iodine as the charging agent. Electrophoretic deposition was done with a platinum counter electrode at 100 V for 180 s to deposit a 60 micron average film thickness.

Any excess negative electrode on the front and back face of the negative electrode comb was removed by mechanical grinding prior to proceeding to the next step.

3. Separator Fabrication

A electrophoretic deposition slurry for aluminum oxide particles was prepared as shown below. 3 wt % of sub-micron aluminum oxide particles were added to an equivalent of 97 wt % of ethanol and stirred for 2 hours. 0.05 wt % of polyvinyl butyral (calculated from the total weight of aluminum oxide and ethanol) was added to the above slurry. Hydrochloric acid was used to adjust the pH of the solution to 1.5. The resultant mixture was stirred overnight.

The comb structure assembly was subsequently immersed this electrophoretic deposition bath and an electric field was applied between the negative electrode comb and the positive electrode comb. The Au plated positive electrode current collector comb served as the counter electrode for the electrophoretic deposition process. The working electrode for the deposition of the separator was the negative electrode comb with the negative electrode on top The deposition current was kept constant at 2 mA/cm2 of current collector area; and the current was turned on for a period of 1800 seconds. This resulted in a 40 micron thick layer of aluminum oxide and polyvinyl butyral around the electrophoretically deposited negative electrode.

4. Positive Electrode Current Collector Fabrication

The positive electrode current collector was fabricated with a process similar to Example 1.

5. Positive Electrode Fabrication

The die was subsequently coated with a slurry of a lithium ion positive electrode material of the following composition: Lithium Cobalt oxide 80 g; graphite 5 g, carbon black 5 g, and PVDF 10 g; all mixed in N-Methyl Pyrollidone and acetone as the quick-drying solvent with a volume ratio of 1:2. The slurry was dried and the solvent was evaporated to leave conductive positive electrode material behind. This material was then lapped to the comb surface in order to expose the separator material on the front and back faces of the samples.

Example 9: 3D Battery Fabrication 1

1. Single Die Preparation

The contact pads that were used to process the dies in Examples 1-8 were removed by dicing using a dicing saw, while leaving the negative electrode and positive electrode bus connections intact. Any separator material covering the edges of the dies and overhanging the bus lines were cleaned out to remove and expose the current collector material, Cu in the case of the negative electrode and Au in case of the positive electrode.

2. Tab Extension Connection

Tab extensions were connected onto the negative electrode bus and the positive electrode bus following the current collector exposure. The gold bus line was connected to aluminum tab using a commercially available carbon glue (DAG-T-502). A thin layer of carbon was coated on the tab extension and glued to the side of the gold bus. A Nickel tab extension was glued to the copper current collector bus using the same commercially available carbon glue. The glue was baked at 120 C for 1 hr to harden. The tab extensions also included the tab that was to come out of the package. This tab extension was bent and flattened horizontally and was ready for packaging.

3. Battery Packaging and Electrolyte Fill

The die with the two tab extensions was inserted into a commercially available battery pouch packaging material. The pouch material was sealed on the tab side through the tabs. One of the other three sides was left open to provide aport for electrolyte filling. Vacuum was applied and a conventional electrolyte comprising propylene carbonate, ethylene carbonate, and ethyl methyl carbonate in a ratio of 1:1:3 and a lithium hexafluorophosphate salt (1 M) was added to the cell while in a glove box. The last side of the pouch was also subsequently sealed when the die is inside the glove box in order to prevent moisture and oxygen from ingressing into the pouch and causing loss of battery life. The battery was then subsequently charge-discharged using a commercially available battery cycler.

Example 10: 3D Stack Battery Fabrication 1

1. Single Die Preparation:

The Single die preparation process was performed identical to Example 5; except on three different dies separately. The contact pads on each of the dies were removed similar to example 9. The dies were subsequently stacked one on top of other so that the electrodes were aligned.

2. Tab Extension Connection:

Tab extensions were connected onto the negative electrode buses and the positive electrode buses following the current collector exposure. The gold bus lines were connected to aluminum tab using a commercially available carbon glue (DAG-T-502). A thin layer of carbon was coated on the tab extension and glued to the side of the gold bus. A Nickel tab extension was glued to the copper current collector buses using the same commercially available carbon glue. The glue was baked at 120 C for 1 hr to harden. The tab extensions also included the tab that was to come out of the package. This tab extension was bent and flattened horizontally and was ready for packaging.

3. Battery Packaging and Electrolyte Fill:

Battery Packaging and electrolyte fill was carried out as in Example 9

Example 11: 3D Tiled Battery Fabrication 1

1. Single Die Preparation:

The Single die preparation process was performed identical to Example 5; except on two different dies separately 2. Tab Extension Connection:

The tab extension was connected with conductive glue similar to example 9. However, the dies were tiled with the positive electrode bus connections abutting each other connected by a single tab extension in between.

3. Battery Packaging and Electrolyte Fill:

Battery Packaging and electrolyte fill was carried out as in Example 9

In view of the above, it will be seen that the several objects of the invention are achieved and other advantageous results attained.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above articles, compositions and methods without departing from the scope of the invention, it is intended that all matter contained in the above description and shown in the accompanying drawings shall be interpreted as illustrative and not in a limiting sense.

What is claimed is:

1. An electrode structure comprising a population of electrodes comprising an electrode active material layer and a population of counter-electrodes comprising a counter-electrode active material layer wherein the population of electrodes is arranged in alternating sequence with the population of counter-electrodes along a first direction, each member of the electrode population has a bottom, a top, a length $L_E$, a width $W_E$, a height $H_E$, and a longitudinal axis $A_E$ extending from the bottom to the top of each such member and in a direction that is transverse to the first direction, the length $L_E$ of each member of the electrode population being measured in the direction of its longitudinal axis $A_E$, the width $W_E$ of each member of the electrode population being measured in the first direction, and the height $H_E$ of each member of the electrode population being measured in a direction that is perpendicular to the longitudinal axis $A_E$ of each such member and the first direction, the ratio of $L_E$ to each of $W_E$ and $H_E$ of each member of the electrode population being at least 5:1, respectively, the ratio of $H_E$ to $W_E$ for each member of the electrode population being between 0.4:1 and 1000:1, respectively, the longitudinal axis $A_E$ of each member of the population of electrodes is surrounded by an electrically insulating separator layer, the electrically insulating separator layer comprising:

(i) a first insulating material comprising a microporous separator material disposed in regions between opposing lateral surfaces of adjacent members of the electrode and counter-electrode populations, and (ii) a second insulating material along surfaces of one or more of the top and bottom of the members of the electrode population, the second insulating material comprising a lower conductivity for carrier ions than the first insulating material, and the microporous separator material comprises a particulate material and a binder, and has a void fraction of at least 20 vol %.

2. The electrode structure of claim 1 wherein between members of the electrode population and members of the counter-electrode population the microporous separator material constitutes at least 70 vol % of the electrically insulating separator layer.

3. The electrode structure of claim 1 wherein the microporous separator material has a conductivity for carrier ions of less than $1 \times 10^{-4}$ S/cm.

4. The electrode structure of claim 1 wherein the electrically insulating separator layer surrounds the longitudinal axis $A_E$ of each member of electrode population for at least 70% of the length $L_E$ of each member of the electrode population.

5. The electrode structure of claim 1 wherein each of the electrode and counter-electrode populations comprise at least 50 members.

6. The electrode structure of claim 1 wherein $L_E$ has a value in the range of about 10 mm and about 250 mm, $W_E$ has a value in the range of about 0.01 mm and 2.5 mm, and $H_E$ has a value in the range of about 0.05 mm to about 10 mm.

7. The electrode structure of claim 1 wherein the ratio of $L_E$ to each of $W_E$ and $H_E$ for each member of the electrode population is at least 10:1, respectively.

8. The electrode structure of claim 1 wherein a cross-section of each member of the electrode population has a perimeter $P_E$ and the ratio of $L_E$ to $P_E$ for each member of the electrode population is at least 1.25:1, respectively.

9. The electrode structure of claim 1 wherein each member of the counter-electrode population comprises a bottom, a top, a length $L_{CE}$, a width $W_{CE}$, a height $H_{CE}$, and a longitudinal axis $A_{CE}$ extending from the bottom to the top of each such member and in a direction that is transverse to the first direction, the length $L_{CE}$ of each member of the electrode population being measured in the direction of its longitudinal axis $A_{CE}$, the width $W_{CE}$ of each member of the electrode population being measured in the first direction, and the height $H_{CE}$ of each member of the electrode population being measured in a direction that is perpendicular to the longitudinal axis $A_{CE}$ of each such member and the first direction, the ratio of $L_{CE}$ to each of $W_{CE}$ and $H_{CE}$ of each member of the electrode population being at least 5:1, respectively, the ratio of $H_{CE}$ to $W_{CE}$ for each member of the electrode population being between 0.4:1 and 1000:1, respectively.

10. The electrode structure of claim 9 wherein $L_{CE}$ has a value in the range of about 10 mm and about 250 mm, $W_{CE}$ has a value in the range of about 0.01 mm and 2.5 mm, and $H_{CE}$ has a value in the range of about 0.05 mm to about 10 mm.

11. The electrode structure of claim 9 wherein the ratio of $L_{CE}$ to each of $W_{CE}$ and $H_{CE}$ for each member of the electrode population is at least 10:1, respectively.

12. The electrode structure of claim 1 wherein a cross-section of each member of the counter-electrode population has a perimeter $P_{CE}$ and the ratio of $L_{CE}$ to $P_{CE}$ for each member of the counter-electrode population is at least 1.25:1, respectively.

13. The electrode structure of claim 1 wherein each member of the population of electrodes further comprises an electrode backbone.

14. The electrode structure of claim 1 wherein each member of the population of electrodes comprises an electrode current collector layer.

15. The electrode structure of claim 14 wherein the electrode current collector layer and the electrode active material layer have an electrical conductance and the ratio of the electrical conductance of the electrode current collector layer to the electrical conductance of the electrode active material layer is at least 100:1, respectively, for each member of the population of electrodes.

16. The electrode structure of claim 14 wherein the population of electrodes is a population of negative electrodes, the population of counter-electrodes is a population of positive electrodes, the electrode active material layer is a negative electrode active material layer and the electrode current conductor layer is a negative electrode current conductor layer.

17. The electrode structure of claim 16 wherein the negative electrode active material layer comprises carbon, aluminum, tin, silicon or an alloy thereof.

18. The electrode structure of claim 16 wherein the negative electrode active material layer comprises nanowires of silicon or an alloy thereof, or porous silicon or an alloy thereof.

19. The electrode structure of claim 1 wherein the electrode structure further comprises an electrode substrate having a surface to which each member of the electrode population is directly attached and a counter-electrode substrate having a surface to which each member of the counter-electrode population is attached, the electrode substrate surface and the counter-electrode substrate surface being opposing surfaces that are substantially parallel to the first direction.

20. The electrode structure of claim 1 wherein the population of electrodes is a population of negative electrodes, the population of counter-electrodes is a population of positive electrodes, each member of the population of negative electrodes comprises a negative electrode active material layer and a negative electrode current conductor layer, each member of the population of negative electrodes has a bottom, a top, a length $L_{NE}$, a width $W_{NE}$ and a height $H_{NE}$, the length $L_{NE}$ being measured from the bottom to the top of each such negative electrode, the width $W_{NE}$ and the height $H_{NE}$ being measured in directions that are perpendicular to each other and to the direction of measurement of the length $L_{NE}$, the ratio of $L_{NE}$ to each of $W_{NE}$ and $H_{NE}$ being at least 5:1, respectively, the ratio of $H_{NE}$ to $W_{NE}$ being between 0.4:1 and 1000:1, the negative electrode current collector layer of each member of the population having a length $L_{NC}$ that is measured in the same direction as and is at least 50% of $L_{NE}$.

21. The electrode structure of claim 1 wherein the population of electrodes is a population of positive electrodes, the population of counter-electrodes is a population of negative electrodes, each member of the population of positive electrodes comprises a positive electrode active material layer and a positive electrode current conductor layer, each member of the population of positive electrodes has a bottom, a top, a length $L_{PE}$, a width $W_{PE}$ and a height $H_{PE}$, the length $L_{PE}$ being measured from the bottom to the top of each such positive electrode, the width $W_{PE}$ and the height $H_{PE}$ being measured in directions that are perpendicular to each other and to the direction of measurement of the length $L_{PE}$, the ratio of $L_{PE}$ to each of $W_{PE}$ and $H_{PE}$ being at least 5:1, respectively, the ratio of $H_{PE}$ to $W_{PE}$ being between 0.4:1 and 1000:1, respectively, the positive electrode current collector layer of each member of the positive population having a length $L_{PC}$ that is measured in the same direction as and is at least 50% of $L_{PE}$.

22. An electrode stack, the stack comprising at least two electrode structures, each of the electrode structures comprising an electrode structure of claim 1.

23. The electrode stack of claim 22 wherein the electrode structures are stacked vertically whereby the populations of positive and negative electrodes comprised by a first electrode structure in the electrode stack lie in a different plane than the populations of positive and negative electrodes comprised by a second electrode structure in the electrode stack.

24. The electrode stack of claim 22 wherein the electrode structures are arranged horizontally whereby the populations of positive and negative electrodes comprised by a first electrode structure in the electrode stack lie in substantially the same plane as the populations of positive and negative electrodes comprised by a second electrode structure in the electrode stack.

25. A secondary battery comprising a battery enclosure, a non-aqueous electrolyte and an electrode structure of claim 1.

* * * * *